(12) United States Patent
Krog et al.

(10) Patent No.: US 11,927,968 B2
(45) Date of Patent: Mar. 12, 2024

(54) AUTONOMOUS AGRICULTURE PLATFORM

(71) Applicant: Salin 247, Inc., Ames, IA (US)

(72) Inventors: David Russell Krog, Des Moines, IA (US); Benjamin Lee Krog, Des Moines, IA (US); Saeed Arabi, Ames, IA (US)

(73) Assignee: SALIN 247, INC., Ames, IA (US)

( * ) Notice: Subject to any disclaimer, the term of this patent is extended or adjusted under 35 U.S.C. 154(b) by 0 days.

(21) Appl. No.: 17/938,112

(22) Filed: Oct. 5, 2022

(65) Prior Publication Data
US 2023/0112003 A1 Apr. 13, 2023

Related U.S. Application Data

(60) Provisional application No. 63/262,222, filed on Oct. 7, 2021.

(51) Int. Cl.
*A01B 79/00* (2006.01)
*A01B 59/06* (2006.01)
(Continued)

(52) U.S. Cl.
CPC ........... *G05D 1/0225* (2013.01); *A01B 59/06* (2013.01); *A01B 79/005* (2013.01); *A01B 79/02* (2013.01); *A01C 7/042* (2013.01); *B60K 1/02* (2013.01); *B60L 53/80* (2019.02); *B60L 58/12* (2019.02); *B62D 21/14* (2013.01); *H01M 10/425* (2013.01); *H01M 10/446* (2013.01); *H01M 10/48* (2013.01); *A01B 63/1006* (2013.01);
(Continued)

(58) Field of Classification Search
CPC ....... A01B 59/06; A01B 79/005; A01B 79/02; A01C 7/042; B62D 49/0678
See application file for complete search history.

(56) References Cited

U.S. PATENT DOCUMENTS 3,216,739 A * 11/1965 Drenter ................. B60B 35/003
280/771
3,802,716 A * 4/1974 Wiers ..................... B62D 53/06
280/407.1
(Continued)

FOREIGN PATENT DOCUMENTS

DE 102017007265 A1 2/2019
WO 2020102763 A1 5/2020

*Primary Examiner* — Jamie L McGowan
(74) *Attorney, Agent, or Firm* — BOOKOFF MCANDREWS, PLLC

(57) ABSTRACT

A device for performing autonomous agricultural operations may include a toolbar to which a plurality of implements may be interchangeably coupled, and a pair of parallel chassis beams mounted perpendicularly on the toolbar. At least a portion of each of the chassis beams may be telescopic and configured to be extended outward from, and retracted inward towards, the toolbar. The device may also include a plurality of drive assemblies each mounted on one of the chassis beams, and a plurality of motors corresponding to the drive assemblies and configured to drive the drive assemblies in accordance with one or more drive parameters to move the device throughout a site. The device may further include a computing device configured to automatically determine the drive parameters, and cause the plurality of motors to drive the corresponding drive assemblies in accordance with the drive parameters.

20 Claims, 24 Drawing Sheets

(51) Int. Cl.
*A01B 79/02* (2006.01)
*A01C 7/04* (2006.01)
*B60K 1/02* (2006.01)
*B60L 53/80* (2019.01)
*B60L 58/12* (2019.01)
*B62D 21/14* (2006.01)
*G05D 1/00* (2006.01)
*H01M 10/42* (2006.01)
*H01M 10/44* (2006.01)
*H01M 10/48* (2006.01)
*A01B 63/10* (2006.01)
*H02J 7/00* (2006.01)

(52) U.S. Cl.
CPC ... *G05D 1/0231* (2013.01); *H01M 2010/4271* (2013.01); *H01M 2220/20* (2013.01); *H02J 7/0048* (2020.01)

(56) References Cited

U.S. PATENT DOCUMENTS

| | | | | |
|---|---|---|---|---|
| 3,820,616 A * | 6/1974 | Juergens | B66C 23/62 | 180/9.48 |
| 4,350,222 A * | 9/1982 | Lutteke | B62D 49/0678 | 180/209 |
| 4,611,683 A * | 9/1986 | Hilmer | B62D 7/1509 | 180/209 |
| 5,039,129 A * | 8/1991 | Balmer | B60G 3/04 | 180/209 |
| 5,083,630 A * | 1/1992 | Zaun | B60B 35/109 | 180/209 |
| 5,249,823 A * | 10/1993 | McCoy | B62B 3/02 | 280/87.01 |
| 5,293,949 A * | 3/1994 | Zimmermann | B62D 55/084 | 280/781 |
| 5,638,908 A * | 6/1997 | Masumoto | E02F 9/024 | 280/638 |
| 5,901,800 A * | 5/1999 | Wilson | B62D 55/084 | 180/327 |
| 6,176,334 B1 * | 1/2001 | Lorenzen | B62D 21/14 | 464/134 |
| 6,199,769 B1 * | 3/2001 | Weddle | F16F 9/06 | 180/906 |
| 6,206,125 B1 * | 3/2001 | Weddle | B62D 49/0607 | 301/128 |
| 6,715,576 B2 * | 4/2004 | Filho | B60B 35/1036 | 180/209 |
| 6,827,176 B2 * | 12/2004 | Bean | B60B 35/109 | 180/906 |
| 7,163,227 B1 * | 1/2007 | Burns | B62D 49/0607 | 301/128 |
| 7,387,314 B2 * | 6/2008 | White | B60G 9/02 | 280/781 |
| 7,780,197 B2 * | 8/2010 | White | B60G 9/02 | 280/781 |
| 7,963,361 B2 * | 6/2011 | Coers | B62D 9/00 | 180/906 |
| 8,262,101 B2 * | 9/2012 | Madler | B60G 21/026 | 180/251 |
| 8,376,078 B2 * | 2/2013 | Hiddema | B60B 35/001 | 180/209 |
| 8,662,216 B2 * | 3/2014 | Roucka | B62D 49/0678 | 180/9.46 |
| 8,978,806 B2 * | 3/2015 | Zhang | B62K 15/00 | 296/26.05 |
| 9,346,497 B2 * | 5/2016 | Dames | B62D 49/0678 | |
| 9,352,782 B2 * | 5/2016 | Tollefsrud | B60B 35/109 | |
| 9,358,836 B2 * | 6/2016 | David | B60B 35/10 | |
| 9,795,077 B2 | 10/2017 | Hahn et al. | | |
| 9,968,023 B2 * | 5/2018 | Brooks | B60N 2/002 | |
| 10,080,321 B2 | 9/2018 | Blackwell et al. | | |
| 10,104,824 B2 | 10/2018 | Blackwell et al. | | |
| 10,111,373 B2 | 10/2018 | Blackwell et al. | | |
| 10,112,661 B2 * | 10/2018 | Shan | B62D 55/04 | |
| 10,130,022 B2 | 11/2018 | Blackwell et al. | | |
| 10,368,473 B2 * | 8/2019 | Treinen | A01M 7/0082 | |
| 10,512,209 B2 | 12/2019 | Hahn et al. | | |
| 10,549,579 B1 * | 2/2020 | Boe | B60B 35/10 | |
| 10,575,453 B2 | 3/2020 | Blackwell et al. | | |
| 10,703,409 B2 * | 7/2020 | Umemoto | B60G 9/02 | |
| 10,798,863 B2 * | 10/2020 | Hafvenstein | A01M 7/0082 | |
| 11,173,971 B2 * | 11/2021 | Kautsch | B62D 21/14 | |
| 11,279,400 B1 * | 3/2022 | Eaton | B60B 35/1054 | |
| 2005/0189730 A1 * | 9/2005 | White | B60G 9/02 | 280/6.154 |
| 2009/0038186 A1 * | 2/2009 | Osswald | B62D 49/085 | 37/468 |
| 2009/0206589 A1 * | 8/2009 | Osswald | B62D 21/14 | 187/234 |
| 2010/0283218 A1 * | 11/2010 | Coers | B60B 35/1063 | 701/41 |
| 2015/0105965 A1 * | 4/2015 | Blackwell | A01B 79/00 | 701/28 |
| 2016/0095276 A1 * | 4/2016 | Roberge | A01C 7/081 | 239/654 |
| 2019/0133022 A1 | 5/2019 | Connell et al. | | |
| 2020/0120858 A1 | 4/2020 | Hahn et al. | | |
| 2020/0170169 A1 | 6/2020 | Blackwell et al. | | |

* cited by examiner

AUTONOMOUS AGRICULTURE PLATFORM

CROSS-REFERENCE TO RELATED APPLICATION(S)

This application claims priority to U.S. Provisional Application No. 63/262,222 filed Oct. 7, 2021, the entirety of which is incorporated herein by reference.

TECHNICAL FIELD

Various embodiments of this disclosure relate generally to systems, devices, and methods for autonomous platforms. More specifically, aspects of the disclosure pertain to a platform and methods for operating various systems and devices of the platform, the platform including an autonomous drive unit to which one or more different types of implements may be interchangeably attached to perform field operations, a docking station for recharging and/or refilling products of the autonomous drive unit and/or attached implements, and transport equipment for transport of the platform components.

BACKGROUND

Agricultural machines such as tractors, planters, tillage equipment, sprayers, harvesters, and other machines have contributed significantly to increasing agricultural crop productivity in the United States and around the world. Over time, these machines have improved in terms of performance and size. With an increase in size and capacity, farmers have been able to increase the scale of their operations and increase labor productivity. Increasing machinery size, however, has led to increasing weight of the machines being operated on farm fields. For example, larger planters can weigh several thousand pounds, and the tractors that pull the planters can weigh more than 30,000 pounds. Increased weight of these machines, in turn, has led to an increase in soil density (e.g., soil compaction). Soil compaction occurs throughout the soil profile. While tillage and seasonal freeze and thaw in some regions can help reduce compaction close to the soil surface, soil compaction lower in the soil profile is more difficult to remedy. Soil compaction is a reduction in soil porosity that leads to reduced water infiltration, lower water-holding capacity, higher water runoff, higher soil erosion, reduced root growth, reduced nutrient uptake, reduced plant growth, and lower crop yields. Academic research has estimated crop yield losses ranging from 9% to 55% depending on soil and weather conditions.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems, devices, and methods are disclosed for autonomous agricultural (e.g., field) operations, including crop production.

According to some examples, devices for autonomous agricultural operations are described herein. An exemplary device may include a toolbar to which a plurality of implements are interchangeably coupled, and a pair of parallel chassis beams mounted perpendicularly on the toolbar. At least a portion of each of the chassis beams may be telescopic and configured to be extended outward from, and retracted inward towards, the toolbar. The device may also include a plurality of drive assemblies each mounted on one of the chassis beams, and a plurality of motors corresponding to the plurality of drive assemblies and configured to drive the corresponding drive assemblies in accordance with one or more drive parameters to move the device throughout a site. The device may further include a computing device comprising at least one memory storing instructions, and at least one processor operatively connected to the at least one memory and configured to execute the instructions to perform operations, including automatically determining the one or more drive parameters, and causing the plurality of motors to drive the corresponding drive assemblies in accordance with the one or more drive parameters.

According to other examples, autonomous vehicles for performing agricultural operations are described herein. An exemplary autonomous vehicle may include an implement for performing agricultural operations at a site, and a drive unit. The drive unit may include a toolbar to which the implement is coupled, and a pair of parallel chassis beams mounted perpendicularly on the toolbar. At least a portion of each of the chassis beams may be telescoping and configured to be extended outward from and retracted inward towards the toolbar to raise and lower the implement. The drive unit may also include a plurality of drive assemblies each mounted on one of the chassis beams, and a plurality of motors corresponding to the plurality of drive assemblies and configured to drive the corresponding drive assemblies in accordance with one or more drive parameters to move the autonomous vehicle throughout the site along a predefined path. The drive unit may further include a computing device comprising at least one memory storing instructions, and at least one processor operatively connected to the at least one memory and configured to execute the instructions to perform operations, including automatically determining the one or more drive parameters, and causing the plurality of motors to drive the corresponding drive assemblies in accordance with the one or more drive parameters.

According to further examples, methods for operating an autonomous vehicle to perform agricultural operations are described herein. An exemplary method may include automatically coupling an implement configured to perform agricultural operations at a site to a drive unit, and navigating the drive unit along a predefined path within the site to enable the implement to complete the agricultural operations. The predefined path may be based on one or more attributes of the drive unit, the implement, and the site. The method may also include automatically determining one or more drive parameters associated with the drive unit, including one or more of speed parameters or turning parameters of drive assemblies of the drive unit, as the drive unit is navigating along the predefined path, and causing the drive unit to be moved along the predefined path in accordance with the one or more drive parameters.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
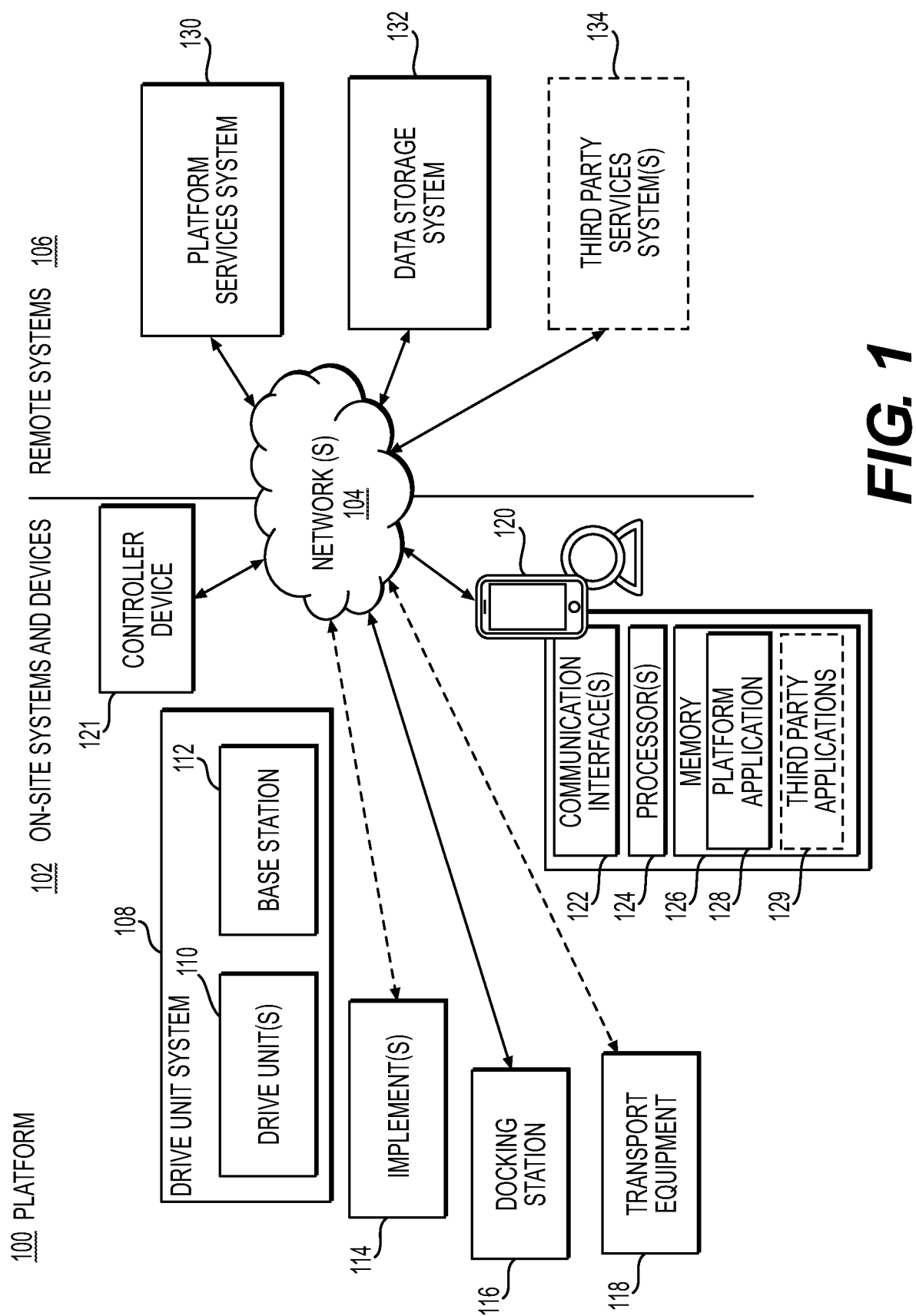
FIG. 1 depicts an exemplary platform for autonomous field operations, according to certain embodiments.

According to certain aspects of the disclosure, systems, devices, and methods are disclosed for autonomous platforms. As described briefly above, there is a need for smaller, lighter weight machines for raising crops or performing other field operations to reduce harmful impacts to soil conditions leading to lower crop productivity (e.g., to mitigate soil compaction). As will be discussed in more detail below, in various embodiments, a platform for autonomous crop production or other field operations is provided that employs small, light-weight, electric-powered, autonomous machines, as well as services related to the operation of such machines. An exemplary platform may include at least one drive unit, implements to be interchangeably used on and/or with the drive unit, a docking station for autonomously refilling crop inputs (e.g., seed, fertilizer, and/or crop protection chemicals) and/or charging the drive unit, and/or a transport (e.g., a trailer or other similar vehicle) for transporting some or all of the other components of the platform.

Various components of the platform may include on-board computing devices configured to enable communication of data between the components of the platform, as well as execute various computer programs (e.g., software) for operating and/or monitoring operations of the respective components. For example, the drive unit may be a fully autonomous machine having an on-board computing device configured to perform navigational operations of the drive unit, control mechanical operations of the drive unit (and optionally the implement being used on and/or with the drive unit), and monitor data associated with the operations and a surrounding field site. Additionally, the platform may include a platform application that may be accessible to a user (e.g., a farmer) for consuming platform services. For example, among other things, the user may be enabled to set up, manage, and/or monitor the components of the platform.

Based on a type of implement being used on and/or with the drive unit, the drive unit and the implement may form an autonomous machine for performing pre-planting, planting, or post-emerge tasks. The drive unit of the platform may have significantly lower pounds per square inch of pressure under drive assemblies (e.g., tracks, tires, and/or wheels) of the drive unit than conventional machines used to pull or push implements. Resultantly, soil compaction may be reduced, levels of carbon in the soil may be increased, less nitrous oxide may be lost from the soil, soil may be capable of holding more water, and crop plant root growth may be increased, all resulting in higher crop productivity.

Reference to any particular crop production-related activity is provided in this disclosure only for convenience and is not intended to limit the disclosure. A person of ordinary skill in the art would recognize that the concepts underlying the disclosed systems, devices, and methods may be utilized in any suitable crop production-related activity. For example, it should be understood that techniques according to this disclosure may be adapted to any type of implement used for crop production-related activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise. Relative terms, such as, "substantially" and "generally," are used to indicate a possible variation of ±10% of a stated or understood value.

The term "application" may be used interchangeably with other terms like "program," or the like, and generally encompasses software that is configured to interact with, modify, override, supplement, or operate in conjunction with other software. As used herein, a "machine learning model" generally encompasses instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

FIG. 1 depicts an exemplary platform 100, according to certain embodiments, and which may be used with the techniques presented herein. The platform 100 may include a plurality of on-site systems and devices 102 that may communicate with one or more of the other components of the platform 100 across one or more electronic network(s) 104, including one or one more remote systems 106.

The on-site systems and devices 102 of platform 100 may include a drive unit system 108 including one or more drive unit(s) 110 and a base station 112, one or more implements 114, a docking station 116, transport equipment 118, a user device 120, and a controller device 121. The remote systems 106 may include a platform services system 130 for providing services related to the operation of the platform 100 and a data storage system 132 for storing data associated with the platform 100. In some embodiments, the platform services system 130 and the data storage system 132 may be associated with a common entity, e.g., a provider of the platform services, or the like. In such embodiments, the platform services system 130 and the data storage system 132 may be part of a cloud service computer system (e.g., in a data center). In other embodiments, data storage system 132 may be associated with a different entity than the platform services provider associated with the platform services system 130. For example, data storage system 132 may be associated with a third party that provides data storage services to the platform services provider or a user of the platform 100. The remote systems 106 may also optionally include the one or more third party services systems 134 providing services that enhance or work in conjunction with the platform services. Example third party services systems 134 may be associated with third parties providing services associated with one or more of the implements 114. The systems and devices of the platform 100 may communicate in any arrangement. As will be discussed herein, systems and/or devices of the platform 100 may communicate in order to enable autonomous crop production, among other activities.

The drive unit 110 of drive unit system 108 may be an autonomous, electric-powered vehicle to which a variety of different implements 114 may be removably attached or coupled to for use across a plurality of field operations associated with autonomous crop production. In some examples, multiple drive unit(s) 110 having the same or different implements attached may work together in a same field or in different fields of a same agricultural site. The base station 112 of drive unit system 108 may be positioned in-field within a communication range of the drive unit 110. One base station 112 may serve multiple drive units 110 within the communication range (e.g., may serve each drive unit 110 within a same field in which base station 112 is positioned). As described in more detail below with reference to FIG. 5, the base station 112 may communicate base corrections data to the drive unit 110 that is utilized by the drive unit 110 to perform real-time kinematic (RTK) techniques that yield more accurate position determinations of the drive unit 110 to facilitate, e.g., autonomous navigation of the drive unit.

The implements 114 may include tools that may be used on or with (e.g., may be attached or coupled to) the drive unit(s) 110 for performing a variety of different agricultural operations, including but not limited to planting, spraying, side dressing, cover crop seeding, soil or field maintenance, and/or crop scouting. In some examples, one or more of the implements 114 may include an onboard computing device configured to store and execute one or more programs (e.g., software) for controlling operations of the implement 114 and/or monitoring data associated with the operations of the implement 114 or other data collected by one or more components (e.g., sensors) of the implement 114. In some examples, these programs may be provided by an entity that is providing the platform services, also referred to herein as a platform services provider. In other examples, these programs may be provided by a third party.

The docking station 116 may comprise a plurality of components, described in detail below with reference to FIGS. 10-12, to support autonomous docking of the drive unit 110 with or without an attached implement 114 to the docking station 116. Once docked, the docking station 116 may be configured to recharge and/or perform a battery swap for the drive unit 110. Additionally or alternatively, the drive unit 110 or the attached implement 114 may include one or more components containing dry or liquid products that are consumed as field operations are performed. When the products are determined to be below a threshold level, the drive unit 110 may dock to the docking station 116, and the docking station 116 may be configured to autonomously refill the products.

The transport equipment 118 may include at least a vehicle, such as a trailer. The vehicle may be powered. Alternatively, the vehicle may be unpowered and pulled by another powered vehicle, such as an automobile (e.g., a pickup truck). The transport equipment 118 may be configured for long and/or short distance transporting of one or more other components of the platform 100, such as the drive unit(s) 110, base station 112, implements 114, docking station 116, and/or individual components thereof. In some examples, the transport equipment 118 may include one or more sensors for assisting in the loading and/or unloading of platform components to or from the vehicle, and/or collecting other data associated with the vehicle prior to and/or during transport.

Dimensions and a weight of the transport equipment 118 with the components of the platform loaded thereon may be in compliance with legal requirements for transporting the transport equipment 118, e.g., on roadways. As described in detail elsewhere herein, various capabilities of the drive unit 110 facilitate the loading process to meet the legally required dimensions, such as the swiveling capabilities of drive assemblies of the drive unit 110 and the extension and retraction capabilities of frame components of the drive unit 110. Alternatively, if dimensions and/or weight are not an issue, straddle loading of multiple drive units 110 may be implemented to increase a number of drive unit(s) 110 and/or other components that may be loaded on the vehicle.

The user device 120 may be associated with a user (e.g., a farmer, a field operations manager, etc.) that is consuming or subscribing to the platform services for autonomous crop production or field operations. The user may also optionally consume or subscribe to one or more third party services that are associated with particular components of the platform 100 and/or work in conjunction with the platform services. While the user device 120 is described as being on-site (e.g., as one of the on-site systems and devices 102), the user device 120 does not have to be physically located at or near the field on which the other on-site systems and devices 102 of the platform 100 are located. Rather the user device 120 need only be located in an area in which one of networks 104 is configured to provide access to the remote systems 106.

The user device 120 may be configured to enable the user to access and/or interact with other systems or devices in the platform 100. For example, the user device 120 may be a computer system such as, for example, a desktop computer, a laptop computer, a tablet, a smart cellular phone (as illustrated in FIG. 1), a smart watch or other electronic wearable, etc. The user device 120 may include one or more communication interfaces 122. The one or more communication interfaces 122 may include one or more cellular radios, Bluetooth, WiFi, near-field communication radios, or other appropriate communication devices for transmitting and receiving information. The one or more communication interfaces 122 facilitate communication between user device 120 and network 104. Multiple communication interfaces 122 may be included in user device 120 for providing multiple forms of communication between user device 120 and other components of the platform 100 via network 104. For example, communication may be achieved with network 104 through wireless communication (e.g., WiFi, radio communication, NFC, Bluetooth, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

In some embodiments, the user device 120 may include one or more electronic application(s), e.g., a program, plugin, browser extension, etc., installed on a memory 126 of the user device 120. In some embodiments, the electronic application(s) may be associated with one or more of the other system components in the platform 100. For example, the electronic application(s) may include one or more of system control software, system monitoring software, software development tools, etc. In some examples, the applications may include web-based applications accessed through a web browser of the user device 120 via the network 104. In other examples, the applications may be mobile applications or other local applications that are run on user device 120.

As shown in FIG. 1, at least a portion of one or more instructions stored in the memory 126 of the user device 120 may be associated with a platform application 128 that is configured to communicate with the platform services system 130. For example, the platform application 128, when executed by one or more processors 124 of the user device 120, may provide information (e.g., profile and/or settings information associated with the site and/or one or more components of the platform 100, operational commands associated with one or more components of the platform 100, and/or data requests) to the platform services system 130, as well as receive information (e.g., monitored data associated with the one or more components of the platform 100) from the platform services system 130.

Optionally, a portion of the instructions stored in the memory 126 of the user device 120 may also be associated with one or more third party applications 129 that are configured to communicate with the corresponding third party services systems 134. To provide an illustrative example, one third party services system 134 may be configured to provide implement-related services (e.g., process and/or analyze data associated with and/or captured by one of the implements 114). Continuing the example, the third party application 129 corresponding to the third party services system 134, when executed by one or more processors 124 of the user device 120, may provide information (e.g., data requests associated with the implement 114) to the third party services system 134, as well as receive information (e.g., monitored data from the implement 114 that is processed and/or analyzed) from the third party services system 134. Additionally or alternatively, in some examples, the information from the third party services system 134 may be accessible via an application programming interface integrated within the platform application 128.

Additionally, one or more components of the user device 120 may generate, or may cause to be generated, one or more graphical user interfaces (GUIs) based on instructions/information stored in the memory, instructions/information received from the other systems in the platform 100, and/or the like and may cause the GUIs to be displayed via a display of the user device 120. The GUIs may be, e.g., mobile application interfaces or browser user interfaces (e.g., associated with the platform application 128 and/or the third party applications 129) and may include text, input text boxes, selection controls, and/or the like. Exemplary GUIs of the platform application 128 are shown and described with reference to FIGS. 15A and 15B. The display may include a touch screen or a display with other input systems (e.g., a mouse, keyboard, etc.) for the user of the user device 120 to control the functions of the user device 120.

The controller device 121 may be, e.g., a handheld controller for the drive unit 110 that may allow the user to manually control operations of the drive unit 110 in addition or alternatively to the user device 120. The controller device 121 may be communicatively coupled to the drive unit 110 over the network 104.

The platform services system 130 may include one or more server devices (or other similar computing devices) for executing platform services of the provider for autonomous crop production or field operations. For example, via the platform application 128 executing on the user device 120, the platform services system 130 may enable the user to set up a profile for one or more agricultural sites that identify and include settings of the systems and devices included therein (e.g., on-site systems and devices 102), adjust any settings for any of the on-site systems and devices 102, modify automatically generated tasks, control operations of one or more of the on-site systems and devices 102, and/or view monitored data collected from one or more of the on-site systems and devices 102 that have been processed and/or analyzed by the platform services system 130, and/or the like.

The data storage system 132 may include a server system or computer-readable memory such as a hard drive, flash drive, disk, etc. In some embodiments, the data storage system 132 includes and/or interacts with an application programming interface for exchanging data to other systems, e.g., one or more of the other components of the environment, such as at least the platform services system 130. In some examples, the data storage system 132 may be a sub-system or component of the platform services system 130 (e.g., when the data storage system 132 is also provided by the platform services provider rather than a third party). The data storage system 132 may include and/or act as a repository or source for various types of platform-related data. The platform-related data may include, for each agricultural site, site profile data, profile and/or settings data for the on-site systems and devices 102, monitoring data collected by one or more of the on-site systems and devices 102 or other third party services systems 134, and/or historical operations data, among other similar data. In some examples, the data for each agricultural site may be stored in association with an identifier generated for the site. Further, if a same user is associated with more than one agricultural site, in some examples, the data for each agricultural site of the same user may be further grouped and associated with an identifier generated for the user (e.g., an account holder or subscriber to the platform services) for storage.

Each of the optional one or more third party services systems 134 may include one or more server devices (or other similar computing devices) for executing respective third party services, such as implement-related services. As described elsewhere herein, example implement-related services may include enabling operational control of the implement 114, as well as processing and/or analyzing data associated with operations of the implement and/or environmental conditions monitored by components of the implement 114. Other example third party services provided by one or more of third party services system 134 may include any other data service useful for agricultural operations. For example, soil survey data from the United States Department of Agriculture (USDA) Soil Survey Geographic (SSURGO) database may be used for variable rate fertilizer applications and/or historical cropping data from the USDA CropScape database may be used for assessing land use, among other data sources from the USDA. Additionally, weather-related data services from one or more weather platforms may be used for, among other things, spraying applications, where weather can influence whether to spray or not spray due to wind or other weather-related factors.

The one or more networks 104 over which the one or more components of the platform 100 communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. One or more components of the platform 100 may be connected to one another (e.g., may transmit and receive communications) via one or more of the networks 104, using one or more standard communication protocols.

Although depicted as separate components in FIG. 1, it should be understood that a component or portion of a component of the exemplary platform 100 may, in some embodiments, be integrated with or incorporated into one or more other components. For example, data storage system 132 may be integrated with the platform services system 130 or the like. In some embodiments, operations or aspects of one or more of the components discussed above may be distributed amongst one or more other components. Any suitable arrangement and/or integration of the various systems and devices of the exemplary platform 100 may be used.

In the following disclosure, various acts may be described as performed or executed by a component from FIG. 1, such as one or more of the on-site systems and devices 102, one or more of the remote systems 106, or components thereof. However, it should be understood that in various embodiments, various components of the exemplary platform 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
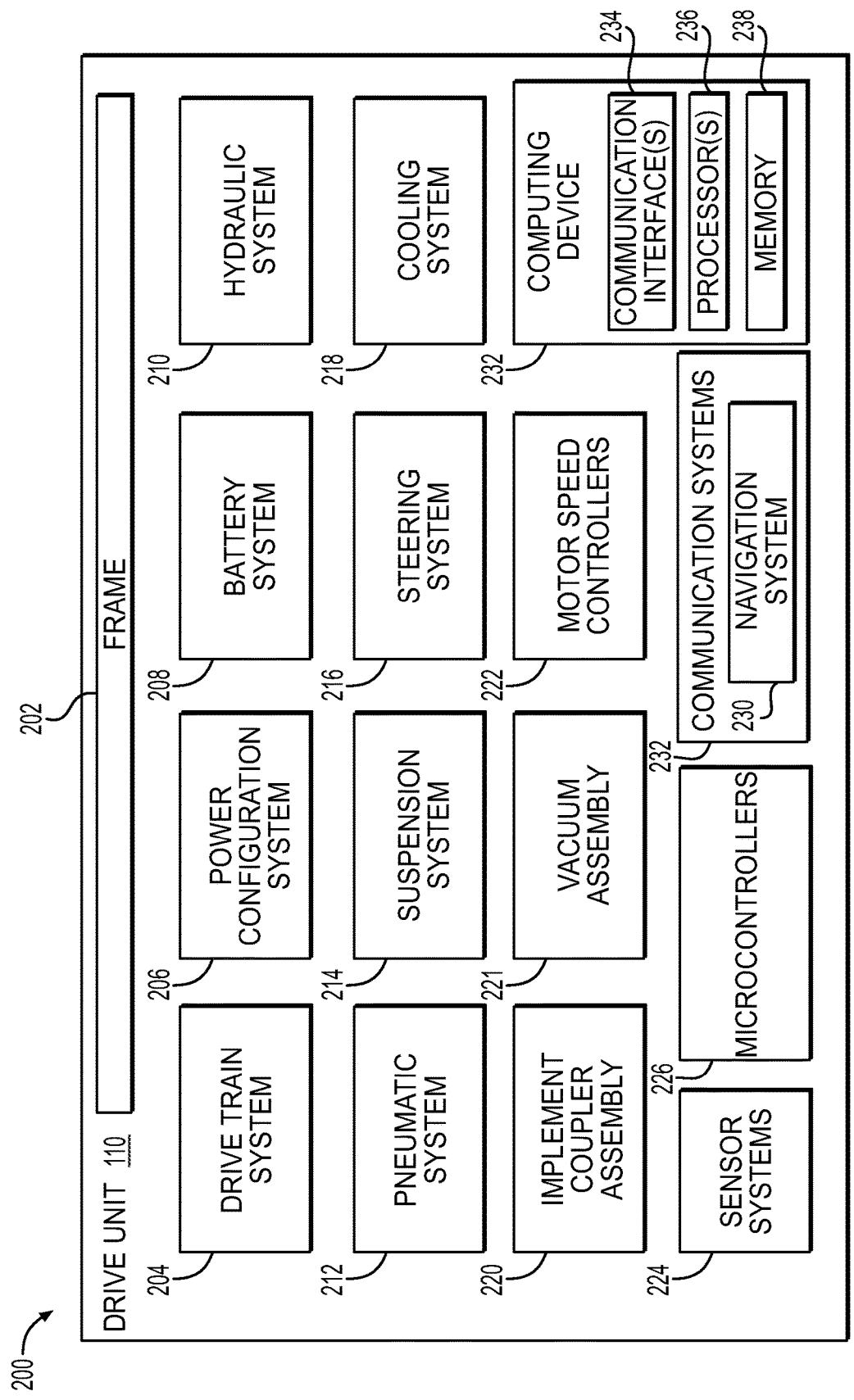
FIG. 2 depicts a block diagram of components of an exemplary drive unit, according to certain embodiments.

FIG. 2 depicts a block diagram 200 of components of an exemplary drive unit 110 of the platform 100. Components of the drive unit 110 may include a combination of one or more of the following: a frame 202, a drive train system 204, a power configuration system 206, a battery system 208, a hydraulic system 210, a pneumatic system 212, a suspension system 214, a steering system 216, a cooling system 218, an implement coupler assembly 220, a vacuum assembly 221, one or more motor speed controllers 222, one or more sensor systems 224, one or more microcontrollers 226, a plurality of communication systems 228 including a navigation system 230, and/or a computing device 232. Each of the components are addressed in turn below. Although systems and devices 202-232 are illustrated in the diagram 200 as separate systems and/or devices of the drive unit 110, one or more of the systems and devices 202-232 may be integrated into a single system or device and/or a given system or device may be reliant on components of another system or device to function.

The frame 202 may provide structural support for the drive unit 110. As described in more detail elsewhere herein, the frame 202 may include components, such as a toolbar, a pair of chassis beams, and/or drive leg pairs to which other systems or components of the drive unit 110 may be mounted or otherwise attached to. One or more components of the frame 202 may be manually or automatically adjustable to vary the dimensions of the frame 202.

For example, one or more of the chassis beams and/or drive legs of the drive leg pairs may include telescoping beams or legs having one or more arms that may automatically extend and retract to adjust a width or height of the drive unit 110 via actuators (e.g., a hydraulic, electric, or electro-hydraulic actuator) positioned on or in the toolbar. Additionally or alternatively, a length of the drive unit 110 may be similarly adjusted to, among other things, facilitate the coupling or decoupling of implements 114 to the drive unit 110 and/or assist with vehicle stability if high clearance operations are being performed, for example. These actuators may be controlled with directional control valves and/or one of the motor speed controllers 222 that are each communicatively coupled to the computing device 232, and configured to receive extension and retraction instructions from the computing device 232 to cause the arms of the telescoping beams to extend and retract, respectively. Width and/or height adjustments may provide clearance for all-wheel steering during field operations, facilitate the attachment and detachment of implements 114 of varying types and dimensions, and/or facilitate the loading and unloading of the drive unit 110 onto and off of the transport equipment 118. Additionally, the retraction of the telescoping beams to reduce the drive unit 110 to a smallest width dimension may help ensure that the drive unit 110 may meet legal width requirements for transport on the transport equipment 118.

In other examples, one or more of the components of the frame 202, such as the toolbar, chassis beams, and/or drive legs, may be manually adjustable. For example, a position of one of the chassis beams relative to the toolbar may be shifted to allow for alternative configurations for straddling different types of implements 114 for attachment and detachment. Additionally and/or alternatively, the toolbar, and/or chassis beams may be manually adjusted to adjust a width of the drive unit 110 to accommodate different crop row widths of a planter implement, including a 2-row male-row planter configuration. Further, the toolbar, chassis beams, and/or drive legs may be manually adjusted to increase stability of the drive unit 110 when performing particular field operations (e.g., adjusted such that the drive unit 110 has higher clearance). As another example, brackets mounting the chassis beams to the toolbar may be manually adjusted (e.g., unbolted, repositioned, and bolted) to shift a position of chassis beams to allow for rear loading of the drive unit 110 onto the transport equipment 118 and/or to provide further width adjustments (e.g., to extend even beyond the width of the telescoping beams when extended via the actuators).

As a further example, drive leg brackets coupling the drive legs to other components of the drive unit 110 (e.g., to the chassis beams) may be manually adjustable and/or removable to allow adjustment and/or replacement (e.g., swapping) of the drive legs. For example, a height of the drive unit 110 may be altered (e.g., increased or decreased) by adjusting the drive leg bracket to accommodate a particular type of implement 114 and/or to facilitate a particular field operation. As another example, the drive leg bracket may be adjusted to allow for extension toolbars to be mounted to the chassis beams. Additionally or alternatively, the drive leg bracket may be removed to replace one drive leg type for another drive leg type. As one example, a non-steerable drive leg may be replaced with a steerable drive leg or vice versa. As another example, a passive suspension drive leg may be replaced with a semi-active suspension drive leg or vice versa.

The drive train system 204 may include drive assemblies, such as track assemblies and/or wheels, enabling mobilization of the drive unit 110 when the device unit 110 is operating (e.g., when powered by power configuration system 206). The drive train system 204 may include a variety of configurations. A first exemplary configuration may include two-wheel drive (2WD), two caster wheels, and skid steer drive assemblies. A second exemplary configuration may include 2WD, two caster wheels, and front wheel independent steering for the drive assemblies. A third exemplary configuration may include four-wheel drive (4WD) and skid steer drive assemblies. A fourth exemplary configuration may include 4WD and all wheel steering for the drive assemblies. In some examples, swiveling capabilities of the drive train system 204 may enable a 90-degree turn of the drive assemblies to facilitate loading and/or unloading of drive unit 110 on or off of the transport equipment 118 (e.g., to allow the drive unit 110 to rotate and move sideways). For example, each drive assembly may include a turning mechanism comprising a microcontroller (e.g., one of microcontrollers 226), an electric hydraulic cylinder, and a rotation arm. The microcontroller may receive and execute instructions from the computing device 232 to cause the electric hydraulic cylinder to extract the rotation arm for enabling the 90-degree wheel turn and retract the rotation arm upon completion.

The power configuration system 206 provides power for the drive unit 110 to enable the drive unit 110 to operate. In some examples, the power configuration system 206 may be an electric power configuration system. An exemplary electric power configuration system may include an electric motor and a gearbox attached to each drive assembly of the drive train system 204, a rechargeable battery, a generator powering charger, and/or a charger for charging batteries. In other examples, the power configuration system 206 may be a hydrostatic power configuration system. An exemplary hydrostatic power configuration system may include a hydraulic motor and gearbox attached to each drive assembly of the drive train system 204, a hydraulic system, an engine powering a hydraulic pump of the hydraulic system, and an alternator for powering electrical components of the drive unit 110.

The battery system 208 may include one or more batteries and one or more battery management systems (BMS) connected to each of the one or more batteries housed in a battery case mounted to the frame 202. Each battery may be a rechargeable, modular battery configured to provide energy for the electrical components of the drive unit 110. In some examples, the battery may be a lithium battery (e.g., a LiFePO4 battery). The state (e.g., level) of charge of the battery may be continuously monitored by the BMS connected to each battery. The BMS may also monitor current, temperature, and/or an overall state of health (SOH) of the battery. In some examples, the BMS may provide at least some of the monitored data, such as a state of charge, a discharge current level, and a charge current level to the computing device 232 of the drive unit 110. Once the battery reaches a threshold state of charge, the computing device 232 may instruct the drive unit 110 to navigate to the docking station 116 (or the nearest docking station 116 if more than one) and/or initiate recharging of the battery via the on-board generator (e.g., a diesel generator such as a biodiesel generator) that is part of the power configuration system 206. In further examples, based on the monitored discharge current level and the charge current level, the BMS may throttle charge and discharge current to prevent damage to the battery cell.

The hydraulic system 210 may be configured to perform a plurality of different operations, where the components of the hydraulic system and the types of operations performed may be dependent on whether the power configuration system 206 is an electric power configuration or a hydrostatic power configuration. If the power configuration system 206 is an electric power configuration, the hydraulic system 210 may include an electric motor, a pump, an oil reservoir, one or more hydraulic actuators, one or valves (e.g., directional control valve, a counterbalance valve, etc.), and a controller (e.g., one of microcontrollers 226) for controlling the operation of the electric motor. The motor controller may be communicatively coupled to the computing device 232 of the drive unit 110. Exemplary operations performed by the hydraulic system 210 may include adjusting size dimensions (e.g., a height and/or width) of the frame 202 of the drive unit 110. As another example, the hydraulic system 210 may be configured to adjust (e.g., raise, lower, and/or rotate) an implement 114 attached to the drive unit 110. When the implement 114 is a crop row planter, the hydraulic system 210 may provide a hydraulic downforce on each row unit of the planter. When the implement 114 is a post-emerge applicator, the hydraulic system 210 may adjust a boom of the post-emerge applicator. As a further example, the hydraulic system 210 may be used to operate the vacuum assembly 221 of the drive unit 110 and/or for hydraulic latching and/or clamping in conjunction with the implement coupler assembly 220 to, e.g., couple an implement 114 to the drive unit 110.

Alternatively, if the power configuration system 206 is a hydrostatic power configuration, the hydraulic system 210 may include one or more pumps powered by an engine (e.g., a diesel engine, an oil reservoir, one or more hydraulic actuators), one or valves (e.g., directional control valve, a counterbalance valve, etc.), and a cooling system. In addition to performing the above-described operations, when the power configuration system 206 is the hydrostatic power configuration, the hydraulic system 210 may also drive the motor (e.g., a hydrostatic motor) attached to each drive assembly of the drive train system 204.

The pneumatic system 212 may use pressurized air to provide energy (e.g., power) to move various components of the drive unit 110 and/or the implement 114 attached to the drive unit. For example, the pneumatic system 212 may include an air compressor that forces air into a container (e.g., a tank) and pressurizes the air to be released as energy. The pressurized air may be used for an air bag down force mechanism to, e.g., provide pneumatic downforce on the attached implement 114, an air bag suspension system of the suspension system 214 to raise or lower the drive unit 110, a pneumatic row cleaner down force on planter-type implements 114, a pneumatic latching and/or clamping of one or more implements 114 to the frame 202, a pneumatic closing system down force on planter-type implements 114, and/or a pneumatic quick coupling for a refill coupler assembly or connectors of the docking station 116 to the drive unit 110 and/or the implement 114 attached to the drive unit 110.

The suspension system 214 includes a plurality of components for absorbing energy from bumps or rocks and/or other kinetic impacts (e.g., including vibrations from the drive unit 110 and/or the implement 114) that the drive unit 110 encounters as the drive unit 110 is navigating throughout a site, which provides for improved path following during navigation. The suspension system 214 may also be configured to adjust a height of the drive unit 110 to facilitate attachment of the implement 114 to the drive unit 110. Further, in some examples, the suspension system 214 may also provide steering capabilities.

At least a portion of the components of the suspension system 214 may be dependent on whether the suspension system includes a spring configuration or an air bag configuration. For example, regardless of the configuration, the suspension system 214 may include telescoping arms (e.g., square or round telescoping tubes), one or more bearings and/or bushings, and a limit block. If the suspension system 214 includes a spring configuration, the suspension system 214 may further include a coil over, a spring, a dampener and a frame. In one exemplary suspension system 214 with a spring configuration, the coil over, spring, and dampener may be integrated into the telescoping arms. In another exemplary suspension system 214 with a spring configuration, the coil over, spring, and dampener may be positioned about the telescoping arms via a bearing (e.g., a thrust bearing) to allow for steering.

Alternatively, if the suspension system 214 includes an air bag configuration, the suspension system 214 may further include one or more air bags, one or more height sensors, a pressure regulator, one or more pneumatic directional control, check, and/or vent valves, a microcontroller (e.g., one of the microcontrollers 226), and a frame. The one or more height sensors may determine a height of the drive unit 110 relative to the ground, an implement 114 to be attached, and/or to a default height when the air bag is deflated. The pressure regulator may regulate inflation pressure in the air bag, and the microcontroller may control the opening and closing of the valves to regulate flow of pressurized air from air compressor into and out of the air bag to, e.g., facilitate raising and/or lowering the height of the drive unit 110. In one exemplary suspension system 214 with an air bag configuration, the air bag may be positioned above the telescoping arms via a bearing (e.g., a thrust bearing) to allow for steering and adjustment of inflation pressure within the air bag based on a current field condition and a weight of the drive unit when the given implement 114 is attached. In another exemplary suspension system 214 with an air bag configuration, the air bag may be positioned directly above the motor attached to each drive assembly of the drive train system 204, and may have dual guide arms to allow for steering.

The steering system 216 may be configured to allow for zero-radius turning (e.g., point turning), crab steering, all-wheel steering, skid steering, front-wheel independent steering, and/or rear-wheel independent steering, among other examples. The variation in types of steering enabled may reduce crop run-down in post-emerge fields and facilitate path convergence for path-following. Additionally, the steering system 216 may facilitate the positioning and/or straddling of the drive unit 110 relative to: the implement 114 to attach and detach the implement from the drive unit 110; the transport equipment 118 to load and unload the drive unit 110 to and from the transport equipment 118; and the docking station 116 to dock and undock the drive unit 110 to and from the docking station 116.

The steering system 216 may include a variety of different configurations. For example, the steering system 216 may include a hydraulic-driven configuration or an electric-driven configuration. Regardless of the configuration, the steering system 216 may include a steering knuckle, an angle sensor, one or more adjustable brackets, and a frame. For a hydraulic-driven configuration, the steering system 216 may also include a hydraulic actuator, such as a linear hydraulic actuator or a helical hydraulic actuator, directional control values, a pump, a pump speed sensor, one or more temperature sensors, one or more pressure sensors, and a microcontroller (e.g., one of the microcontrollers 226) for controlling the control valves and/or the pump. For an electric-driven configuration, the steering system 216 may also include an electric actuator, such as an electric servo actuator, an electric motor with a gearbox, or an electro-hydraulic linear actuator, and a microcontroller (e.g., one of the microcontrollers 226) for controlling the electric actuator. In some examples, the microcontroller in either configuration may include a proportional-integral-derivative (PID) algorithm, a model predictive control (MPC) algorithm, or a linear-quadratic regulator (LQR) algorithm.

The cooling system 218 may be configured to maintain a predefined temperature range for one or more systems and/or devices of the drive unit 110. An exemplary cooling system 218 may include a radiator, a water pump, a cold plate, and liquid reservoir. In some examples, temperatures of the systems and/or devices of the drive unit 110 may be monitored by one or more sensors of the sensor systems 224, and based on the monitored temperatures, a controller of the cooling system 218 (e.g., one of microcontrollers 226) may adjust a flow rate of the cooling system, if necessary, to maintain the predefined temperature range.

As described in more detail with reference to FIG. 3C, the implement coupler assembly 220 may be configured to couple or attach an implement 114 to the drive unit 110. The implement coupler assembly 220 may reduce an amount of time and a complexity associated with attaching and detaching an implement 114 to and from the drive unit 110. Additionally, the implement coupler assembly 220 may be configured to be universal to receive all type of implements, e.g., by universalizing one or more components of the implement coupler assembly 220 that attach to the implement 114. Therefore, a plurality of different types of implements 114 may be interchangeably attached to the drive unit 110 via the implement coupler assembly 220. In some examples, the implement coupler assembly may be operated manually, semi-automatically, and/or automatically to couple or attach the implement 114 to the drive unit 110.

In further examples, the implement coupler assembly 220 may also facilitate rotation of a toolbar of the implement 114 attached to the drive unit 110 via the implement coupler assembly 220 to, e.g., raise and lower the attached implement 114. For example, one or more actuators may be attached to the implement coupler assembly 220 that extend and retract to cause the toolbar of the implement 114 to rotate, which in turn causes the implement 114 to be raised and lowered. The computing device 232 may generate and send instructions to one or more microcontrollers of the actuators (e.g., of the microcontrollers 226) to cause extension and/or retraction to a certain extent based on values determined by computing device 232. In some examples, the values may be based on data received from a sensor (e.g., from one of the sensor systems 224) that indicates a position and/or angle of the toolbar of the implement 114 prior to and/or during rotation.

The vacuum assembly 221 may be configured to provide suction to facilitate seed distribution by a planter implement 114, for example, attached to the drive unit 110, as described in detail elsewhere herein.

The one or more motor speed controllers 222 may be configured to control the speed of the drive assemblies of the drive train system 204. For example, the motor speed controllers 222 may receive position and/or temperature feedback, among other data, from one or more sensors mounted on the motor attached to each of the drive assemblies. Based on the data received from the sensors, each of the motor speed controllers 222 may be configured to automatically throttle for over-temperature, over-current, under-voltage, and/or over-voltage conditions. Additionally, in some examples, each of the motor speed controllers 222 may be configured to store (e.g., in a memory of the respective controller) and execute anti-slip control software to provide the drive assemblies improved traction for acceleration in various conditions.

The motor speed controllers 222 may be communicatively coupled to the computing device 232 of the drive unit 110 to exchange data. For example, each of the motor speed controllers 222 may provide a duty cycle of the motor, electronic revolutions per minute (ERPMs) of the motor, a current, a motor temperature, a controller temperature, an error status, and/or battery voltage data to the computing device 232. The computing device 232 may process the data received, and generate commands based on the processing to transmit back to the motor speed controllers 222. For example, the commands may include duty cycle and current commands that the motor speed controllers 222 may execute to adjust the duty cycle and/or current accordingly.

The sensor systems 224 may include a plurality of sensors for monitoring various types of data associated with the drive unit 110. At least a portion of the sensors may be integrated into and/or function with one or more of the other systems of the drive unit 110. For example, sensors for monitoring a pose, configuration, and/or dimensions of the drive unit 110, as well as sensors for monitoring heading data of the drive unit 110, may be integrated with or mounted on the frame 202. Sensors for monitoring position and/or statuses of valves may be integrated into the power configuration system 206, the hydraulic system 210, and/or the pneumatic system 212. Sensors for monitoring a pressure, a temperature, a motor speed, a motor duty cycle, and/or current of the hydraulic system 210 may be integrated with the hydraulic system 210. Additionally, sensors for monitoring a temperature, a speed, and/or a status of the engine powering the pump of the hydraulic system 210 may be integrated into the hydraulic system 210 when the power configuration system 206 is a hydrostatic power configuration. Sensors for monitoring suspension-related pressure, travel, and/or position may be integrated into the suspension system 214. Sensors for monitoring a pressure, temperature, and/or a pump speed of the cooling system 218 may be integrated into the cooling system 218.

The sensor systems 224 may also include a plurality of sensors configured to monitor data associated with the implement 114 attached to the drive unit 110. For example, one or more sensors mounted on the frame 202 near a position to which the implement 114 is to be attached may monitor a position and/or angle of a toolbar of the implement 114 that is to be received by the frame 202 to attach the implement 114 to the drive unit 110, and/or detect a coupling status (e.g., attached or detached). Also, one or more sensors may be configured to monitor subsystem pressures and/or flow rates of the implement 114 (e.g., via a flowmeter). Additionally, one or more sensors may be configured to monitor a position and/or status of hydraulic, pneumatic, and/or electric valves of a system and/or subsystem of the implement 114. Further, one or more sensors may be configured to monitor a speed, temperature, and/or duty cycle of motors and/or pumps of the implement 114.

The sensor systems 224 may also include a plurality of sensors configured to monitor data associated with the docking station 116 as the drive unit 110 docks and/or undocks to and from the docking station 116. For example, one or more sensors may monitor a proximity of the drive unit 110 to various components or locations of the docking station 116. Additionally, one or more sensors may monitor a status of one or more coupling assemblies of the docking station 116 (e.g., coupled or not coupled) to the drive unit 110 and/or the implement 114 attached to the drive unit 110.

The exemplary types of sensors described above are non-limiting, and non-exhaustive. Other types of sensors may be incorporated into the drive unit 110 independently or integrated with the other systems and devices of the drive unit 110 to monitor data associated with one or more of the drive unit 110, the implement 114, and/or the docking station 116.

The microcontrollers 226, similar to the sensors of the sensor systems 224, may be integrated into one or more of the other systems and/or devices of the drive unit 110. One exemplary microcontroller 226 may include an engine control unit (ECU) for controlling the engine powering the pump of the hydraulic system 210 (e.g., when the power configuration system 206 is a hydrostatic power configuration). Other exemplary microcontrollers 226 may control hydraulic valves of the hydraulic system 210, including hydraulic valves for: extending and/or retracting components of the frame 202; automatically latching and/or clamping an implement 114 to attach the implement to the drive unit 110; raising and lowering an attached implement 114; controlling hydrostatic drive pump(s) and motors (e.g., when the power configuration system 206 is a hydrostatic power configuration); hydraulic steering; and/or controlling other components such as fans, implement downforce assemblies, compressors, etc. Further exemplary microcontrollers 226 may control pneumatic valves of the pneumatic system 212 for: automatically latching and/or clamping an implement 114 to attach the implement to the drive unit 110; automatically coupling one or more coupling assemblies of the docking station 116 to the drive unit 110; and/or applying downforce.

The microcontrollers 226 may be configured to control liquid cooling pumps and/or cooling fans (e.g., of a cooling system of the power configuration system 206 when in a hydrostatic power configuration and/or cooling system 218), vacuum impellers (e.g., of vacuum assembly 221), other pumps, compressors, and/or other actuators of the systems and devices of the drive unit 110.

The communication systems 228 may include the navigation system 230. The navigation system 230 may be a satellite-based communication system, such as a global positioning system (GPS). The navigation system 230 may include a GPS antenna and receiver for receiving positional data (e.g., GPS coordinate data) for the drive unit 110, as described in more detail with reference to FIG. 4. The navigation system 230 may further include an inertial measurement unit (IMU) configured to measure a specific force, angular rate, and/or orientation of the drive unit 110 using a combination of accelerometers, gyroscopes, and sometimes magnetometers. The communication systems 228 may also include one or more of a radio communication system, a cellular communication system, and/or a wireless communication system to allow communication with the base station 112, other drive unit(s) 110, and/or user devices.

The computing device 232 may be configured to receive, process, and transmit data to and from other systems and devices of the drive unit 110, as well as devices external to the drive unit 110. For example, the computing device 232 may be configured to receive data from internal components, such as the motor speed controllers 222, the sensor systems 224, the microcontrollers 226, and the navigation system 230, as well as external components, such as the base station 112 and/or controllers of the implement 114 attached to the drive unit 110 via one or more communication interfaces 234 of the computing device 232. The memory 238 of the computing device 232 may store one or more programs (e.g., software), described in detail with reference to FIG. 13, that are accessible and executable by one or more processors 236 of the computing device 232 to process the data. Data processing may include generating commands for transmission to one or more of the microcontrollers 226 and/or controllers of the implement 114 to execute the commands. Additionally, the computing device 232 may be configured to exchange data with the one or more remote systems 106 over the network 104 via at least one of the communication interfaces 234. For example, the computing device 232 can provide real-time latitude and longitude coordinates of the drive unit 110, as well as operations data, image data, and/or or field-related data captured by sensors of the drive unit 110.

In some examples, the operations of the drive unit 110 may be performed automatically utilizing the programs stored on and executed by the computing device such that the drive unit 110 is entirely autonomous. In other examples, for one or more operations, the drive unit 110 may be at least partially user-operated via the platform application 128 executing on the user device 120 and/or the controller device 121. For example, the user my provide input via the platform application 128 or the controller device 121 to control a speed of the drive unit 110. The input may be transmitted directly to the computing device 232 and/or indirectly via the platform services system 130 over the network 104. Based on the input, the computing device 232 may generate and transmit instructions to the motor speed controllers 222 that control the speed of the motor attached to each drive assembly. As another example, the user may provide input for a turning configuration of the drive unit 110. Exemplary types of operations for which the user may provide speed and/or turn-related input for may include for loading and unloading the drive unit 110 (with or without an attached implement 114) onto and off of the transport equipment 118 and/or for positioning of the drive unit 110 (with or without an attached implement 114) at a particular location within the site.

In further examples, the drive unit 110 may have a manual control element (e.g., a kill switch or emergency stop button) that when actuated causes the power supplied by the battery system 208 to other components of the drive unit 110 to be discontinued. Resultantly, the drive unit 110 may be inoperable when the manual switch is actuated or engaged. Additionally or alternatively, the user may provide input through the platform application 128 and/or the controller device 121 to power off the drive unit 110. In other examples and as described in more detail elsewhere herein, drive unit 110 may automatically power off upon the detection of a trigger event. For example, upon detecting a loss of RTK, loss of communication with one or more particular systems (e.g., motor speed controllers 222), and/or implement specific faults (e.g., a hardware error received from an implement 114), among other similar events, drive unit 110 may automatically power off.

The above-described components 202-232 of the drive unit 110 are a non-limiting and non-exhaustive listing of components. Some drive unit(s) 110 may include more or fewer components, and/or different components that have the same capabilities (e.g., are equivalent in function) to the components 202-232.

Figure 3A:
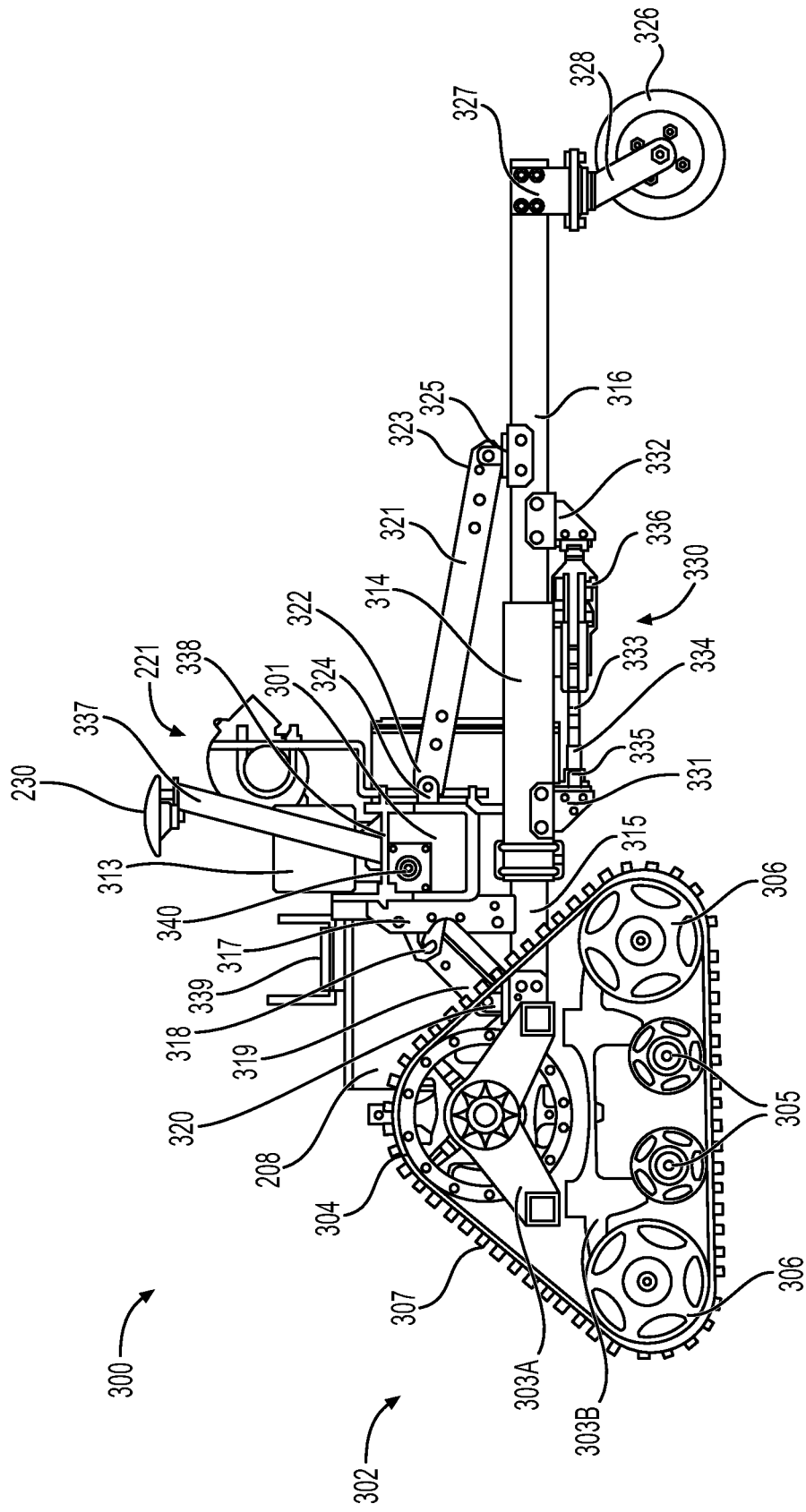
FIGS. 3A-3C depict a first configuration of an exemplary drive unit and components thereof, according to certain embodiments.
Figure 3B:
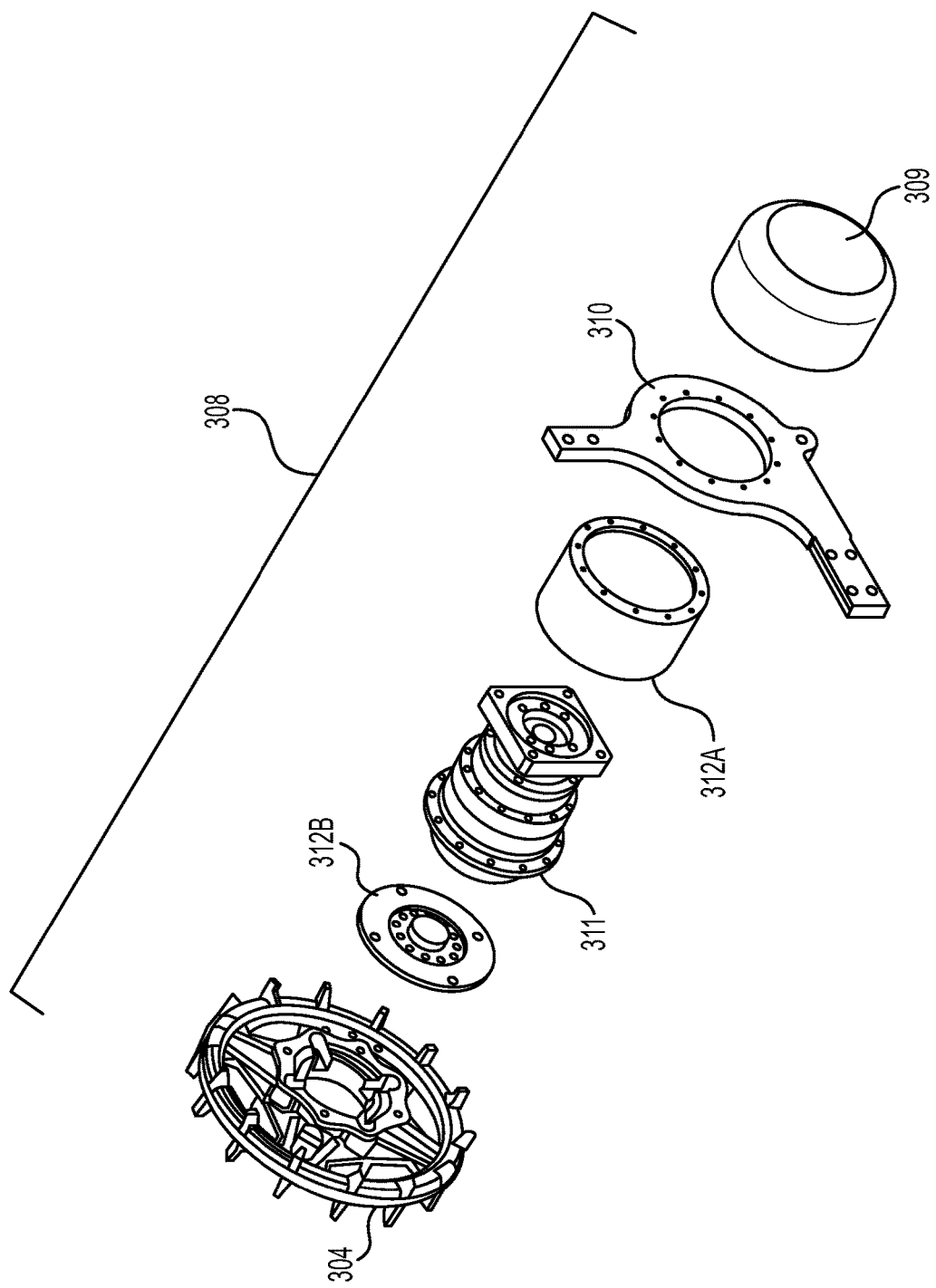
Figure 3C:
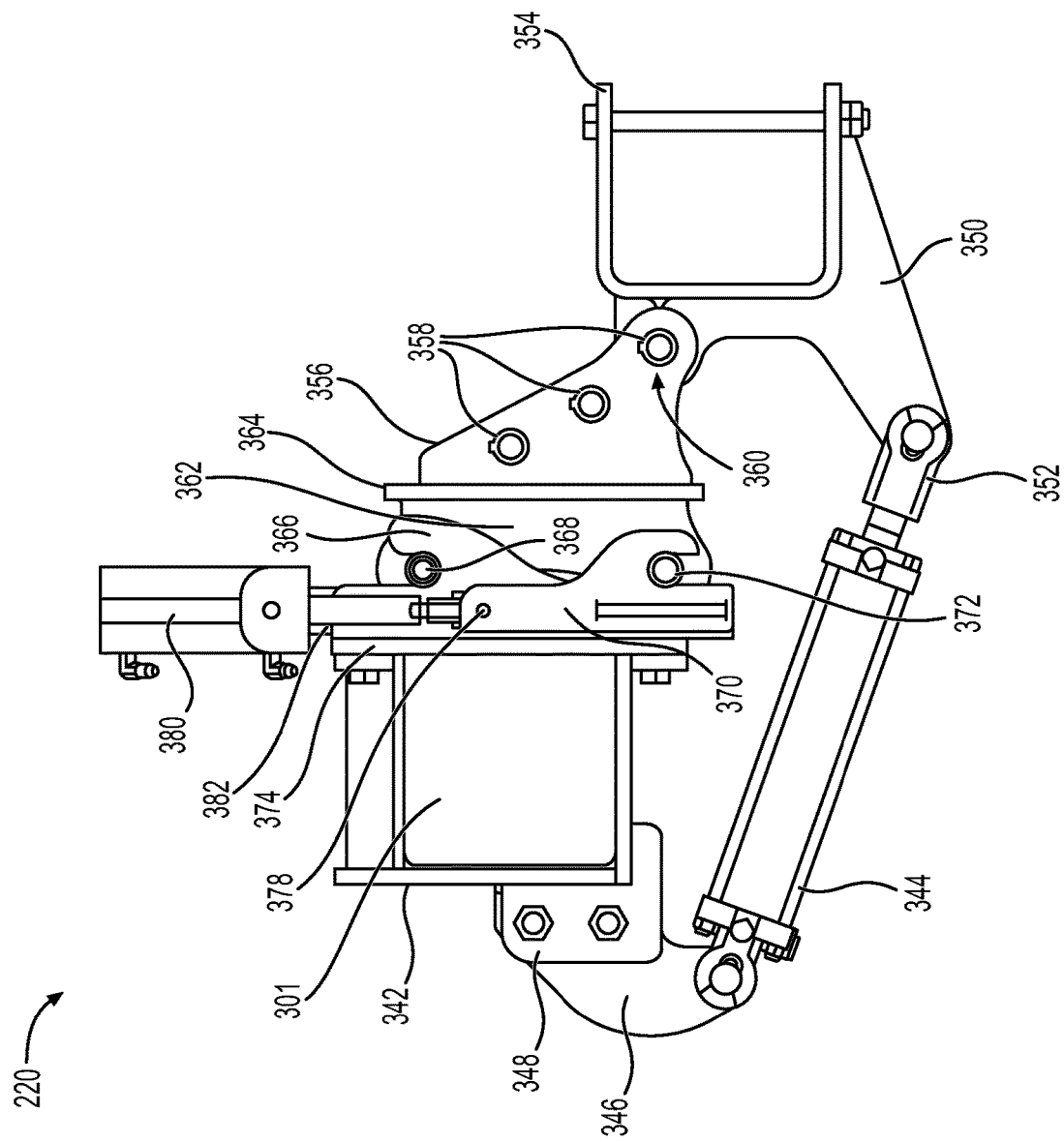
Figure 6A:
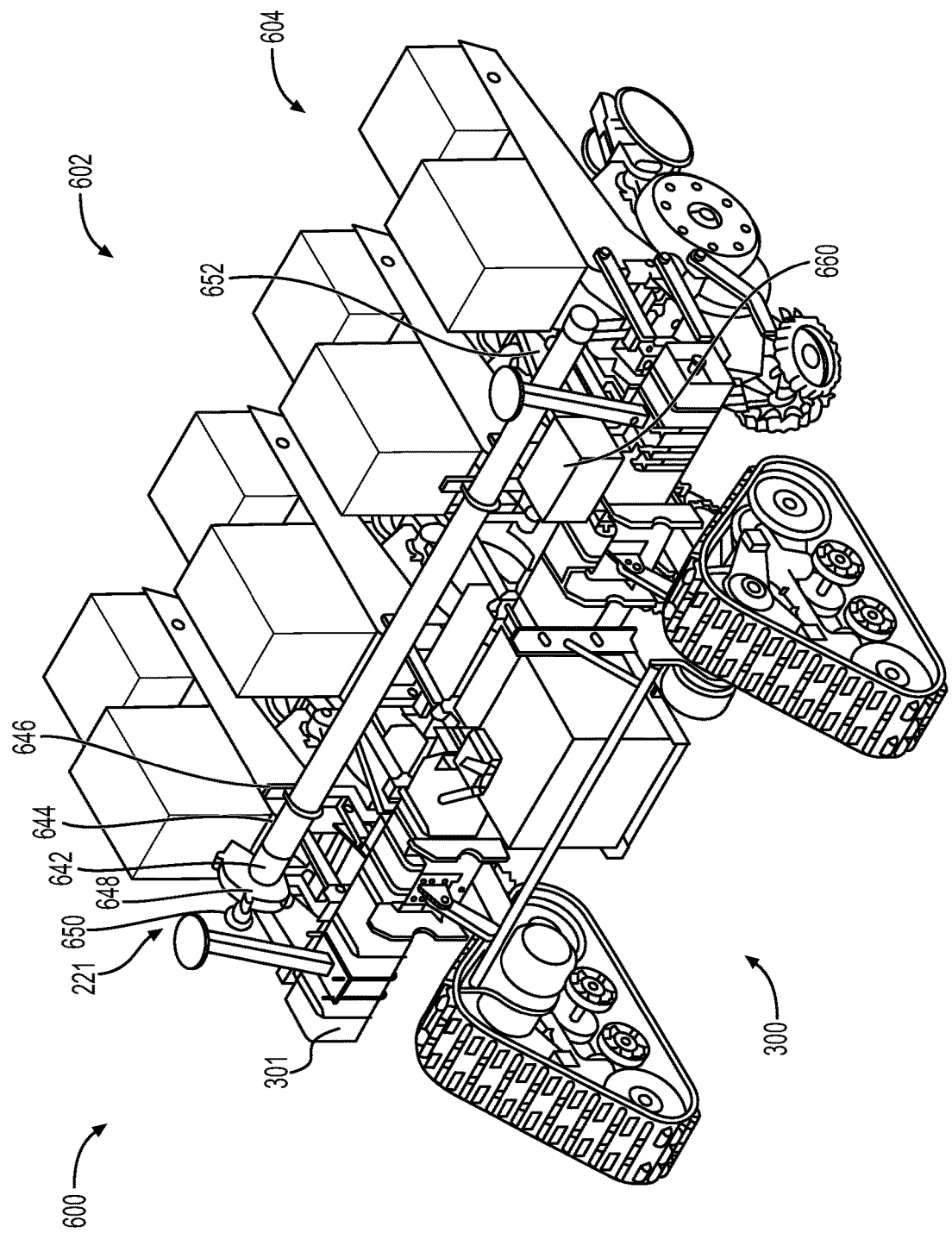
FIGS. 6A-6C depict an exemplary autonomous planter, according to certain embodiments.

FIGS. 3A-3C depict a first configuration 300 of an exemplary drive unit 110 and components thereof. FIG. 3A depicts a side perspective view of the first configuration 300 of the drive unit 110. The frame 202 of the drive unit 110 may include a toolbar 301. The drive train system 204 may include one or more track assemblies 302 that are attached to the toolbar 301 directly and/or indirectly via other components of the frame 202, as described in more detail below. The track assemblies 302 may be configured to drive the drive unit 110 and any implement 114 attached to the drive unit 110 in one or more directions (e.g., at least forward and backward, and optionally left and right). Each track assembly 302 may include a top track frame 303A, a bottom track frame 303B, a sprocket 304, one or more rollers 305, one or more idlers 306, and/or a track 307 (e.g., a rubber track). While only a single track assembly 302 is visible in FIG. 3A, it is understood that the drive unit 110 may include two track assemblies 302 (e.g., a first track assembly 302 shown in FIG. 3A and a second track assembly 302 located directly behind the first track assembly 302 in the view shown in FIG. 3A). That is, the track assemblies 302 may be positioned parallel to another and thus only one track assembly 302 is visible in the side perspective view. FIG. 6A provides an isometric view of the first configuration 300 of the drive unit 110 in which each track assembly 302 is visible. However, in other examples, the drive unit 110 may have more or fewer track assemblies 302. Additionally or alternatively, the drive unit 110 may include one or more wheels (e.g., rims and tires) or a combination of track assemblies 302 and wheels for moving the drive unit 110.

Referring now to FIG. 3B, the power configuration system 206 of the drive unit 110 may be an electric power configuration, and the drive unit 110 may include an electric motor assembly 308 mounted onto each of the track assemblies 302 via the sprocket 304. FIG. 3B depicts an exploded view of the electric motor assembly 308. As shown in FIG. 3B, the electric motor assembly 308 may include an electric motor 309 (e.g., a brushless direct current (BLDC) electric motor), a motor bracket 310, a gearbox 311, a first adapter 312A to couple the gearbox 311 to the motor 309 via the motor bracket 310, and a second adapter 312B to couple the gearbox 311 to the sprocket 304 of the track assembly 302. The motor bracket 310 may also be configured to attach the motor assembly 308 and the corresponding track assembly 302 to the frame 202 of the drive unit (e.g., to one of the front chassis beams 315 or telescoping chassis beams 316 described below). In some examples, one of the motor speed controllers 222 (referred to hereinafter as a track assembly motor controller) may be connected to each electric motor 309, and each track assembly motor controller may be connected to the computing device 232. In other examples, the power configuration system 206 of the drive unit 110 may instead be a hydrostatic power configuration, and the drive unit 110 may include hydraulic motor assemblies mounted on the track assemblies 302. The hydraulic motor assembly may be similar to the motor assembly described in FIG. 3B, except that the motor is a hydraulic motor.

Referring concurrently to FIGS. 3A and 3B, each track assembly motor controller may be powered by the one or more batteries of the battery system 208. The toolbar 301 may have one or more enclosures that are mounted to the toolbar 301 for housing various components. One enclosure may house the battery system 208. Another enclosure 313 may house electronics, such as the computing device 232. The computing device 232 may send instructions or commands to the track assembly motor controllers that indicate the rotation speed for each electric motor 309, and thus the rotation speed and/or turning parameters for each track assembly 302. A speed of the drive unit 110 may be based on the rotation speed of the track assemblies 302. A direction of the drive unit 110 may be based on a differential turning of the track assemblies 302 (i.e., the track assemblies 302 can each turn at a different rate).

In some examples, the track assemblies 302 may only be positioned on one side of the toolbar 301, such as a front or forward side of the toolbar 301 opposite the side of the toolbar 301 to which the implement 114 is to be attached. The track assemblies 302 may be mounted directly or indirectly (e.g., via one or more chassis beams) to the toolbar 301.

Figure 4:
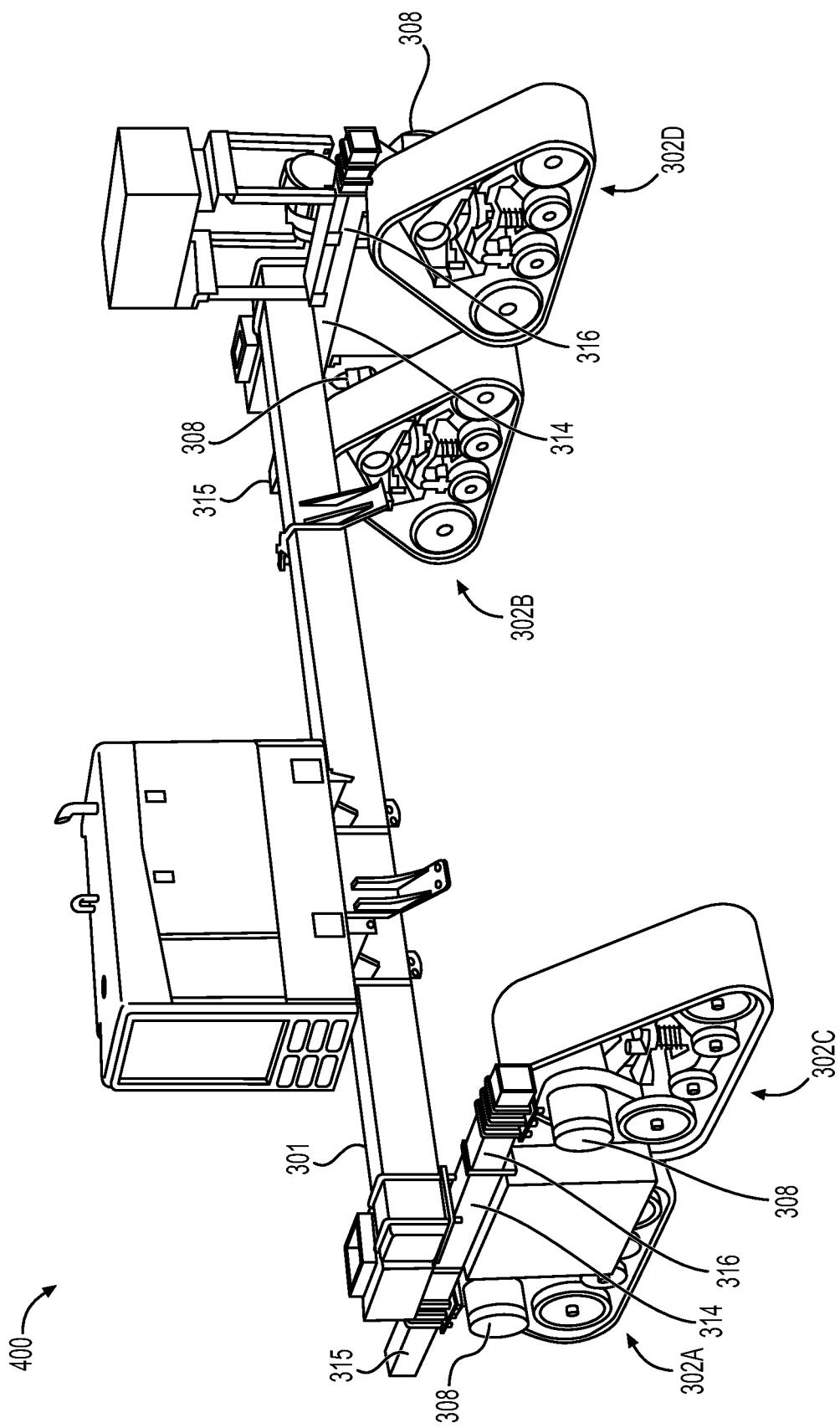
FIG. 4 depicts an isometric view of a second configuration of an exemplary drive unit, according to certain embodiments.

The frame 202 may include a pair of parallel chassis beams, e.g., first and second main chassis beams 314, that are each mounted perpendicularly to an underside of the toolbar 301 at opposite ends of the toolbar 301 (shown more clearly in FIG. 4). One or more lateral braces connected to the main chassis beams 314 may provide additional stability to the machine. The main chassis beams 314 may each have a first end forward of the toolbar 301 and a second end rearward of the toolbar 301. Front chassis beams 315 may be attached to the first end of each of the main chassis beams 314 and extend outward from the front or forward side of the toolbar 301. Each front chassis beam 315 may also be connected to the toolbar 301 via a w-bracket 317, an adjustable toolbar diagonal bracket 318, and a front diagonal beam 319, where the front diagonal beam 319 may be fixed to the adjustable toolbar diagonal bracket 318. For example, the w-bracket 317 may be attached to the toolbar 301, and the adjustable toolbar diagonal bracket 318 and/or the front diagonal beam 319 may extend from the w-bracket 317 to the front chassis beam 315. At least the front diagonal beam 319 may be secured to the front chassis beam 315 by a front diagonal bracket 320.

Telescoping chassis beams 316 may be attached to the second end opposite the first end of the main chassis beams 314 and extend outward from the back or rear side of the toolbar 301. The telescoping chassis beam 316 may also be connected to the toolbar 301 via a rear diagonal beam 321. For example, the rear diagonal beam 321 may be connected to a toolbar diagonal beam lug 322 and/or a rear diagonal beam lug 323. The toolbar diagonal beam lug 322 may be pinned to a toolbar diagonal bracket 324 that is mounted to the toolbar 301. The rear diagonal beam lug 323 may be pinned to a rear diagonal bracket 325 that is mounted to the telescoping chassis beam 316.

Each telescoping chassis beam 316 may include one or more arms that are arranged telescopically with one another. The one or more arms of the telescoping chassis beam 316 may be configured to extend outward from the back or rear side of the toolbar 301 and retract inward toward the toolbar 301. The telescoping chassis beams 316 may be extended to a variable length based on a type of implement 114 attached to the back side of the toolbar 301 to provide additional support for the implement 114. Additionally or alternatively, extension and retraction of the telescoping chassis beams 316 may be used to raise and/or lower the implement 114, as described with respect to FIGS. 6A-6C. In some examples, the telescoping chassis beam 316 may be retracted to a most inward position when transporting the drive unit 110 to e.g., meet legal width restrictions for transport.

Additionally or alternatively, the frame 202 of the drive unit 110 may include telescoping drive legs (shown in FIG. 7A) attached to the frame 202 that may be extended and retracted to raise and lower (e.g., adjust a height of) the drive unit 110.

In some examples, each track assembly 302 may be attached to the toolbar 301, the main chassis beam 314, the front chassis beam 315, and/or the telescoping chassis beam 316, dependent on the position of the track assembly 302 within the drive unit 110. As illustrated in FIG. 3A, the track assemblies 302 may be attached to the front chassis beam 315. In addition to the track assemblies 302, the drive unit 110 may include one or more wheels, such as caster wheels 326, to provide support for an implement 114 that may be coupled to the toolbar 301. For example, a distal portion of each telescoping chassis beam 316 may include a bracket 327 that attaches to the caster wheel 326 on a pivoting arm 328. In other configurations of the drive unit 110, the caster wheels 326 may be replaced by additional track assemblies 302 to provide more torque or power to the drive unit 110 (shown in FIG. 4). Alternatively, the track assemblies 302 and/or the caster wheels 326 may be replaced by rims and tires (shown in FIG. 7A). In some examples, rim and tires may be used in place of the track assemblies 302 in environments where flotation is less of a concern.

As previously described, the telescoping chassis beams 316 may be extended and retracted relative to the main chassis beams 314. The telescoping chassis beams 316 can be extended and retracted using an electric-powered, hydraulic cylinder assembly 330 for each telescoping chassis beam 36. For example, the hydraulic cylinder assembly 330 may be attached to the main chassis beam 314 and the telescoping chassis beam 316 with a front hydraulic bracket 331 and a rear hydraulic bracket 332, respectively. A rod 333 may be connected to the front hydraulic bracket 331 (e.g., via a rod end 334 and a pin 335). A hydraulic body 336 may be connected to the rear hydraulic bracket 332 (e.g., with a pin). Longitudinal movement of the main chassis beam 314 and telescoping chassis beam 316 may cause the toolbar 301 to rotate about the front diagonal bracket 320, and the rear diagonal beam 321 may pivot about its respective brackets 324, 325. The adjustable toolbar diagonal bracket 318 may enable a default height of the toolbar 301 to be set, where the default height may be adjustable.

Power for the hydraulic cylinder assembly 330 may be provided by the one or more batteries of the battery system 208. A controller (e.g., one or microcontrollers 226) communicatively coupled to the computing device 232, may receive commands from the computing device 232 to control the hydraulic cylinder assembly 330. In some examples, the controller may be contained in the electronics enclosure 313.

The drive unit 110 may include the vacuum assembly 221 to function with planter implements 114, described in detail with reference to FIGS. 6A-6C.

The drive unit 110 may also include a navigation system 230 that, among other things, allows the drive unit 110 to autonomously navigate along predefined paths of a field path plan through the field. The navigation system 230 may be mounted to the toolbar 301 via an arm 337 and a bracket 338, where the bracket 338 may be connected to the toolbar 301 and the arm 337 may extend from the bracket 338 to the navigation system 230. Prior to and/or during operation of the drive unit 110, a field path plan may be developed and/or adjusted (e.g., using path planning software executed by the computing device 232). The path planning software may define waypoint paths through the field and identify permanent obstacles and/or areas of the field to be excluded (e.g., areas of the field where crops are not to be planted and/or are not present). Based on the waypoint paths, obstacles, and/or excluded areas, the path planning software may define an optimal route for the drive unit 110 as part of the field path plan. The drive unit 110 may use the navigation system 230 to collect positional data for use in conjunction with one or more path tracking algorithms executed by the computing device 232 to ensure the drive unit 110 is following the path. The computing device 232 of the drive unit 110 may receive and/or store data from various systems and/or components of the device unit 110. The computing device 232 may further communicate or exchange the data with one or more of the other on-site systems and devices 102 and/or remote systems 106 via a communications hub 339 housing one or more of the communication systems 228.

Additionally, the drive unit 110 may have a manual control element 340 (e.g., a kill switch or emergency stop button) positioned on the toolbar 301 that when actuated causes the power supplied by the battery system 208 to other components of the drive unit 110 to be discontinued. Resultantly, operations of the drive unit 110 may be halted.

Turning now to FIG. 3C, the drive unit 110 may also include the implement coupler assembly 220 that is removably attached to the toolbar 301 and is configured to enable coupling of one or more of the implements 114 to the toolbar 301. In some examples, the implement coupler assembly 220 may be configured to couple any type of implement 114 to the toolbar 301 (e.g., the implement coupler assembly 220 is universal). In other examples, the implement coupler assembly 220 may be configured to couple a particular one or more types of implement 114 to the toolbar 301 (e.g., planter implements vs. fluid applicator implements).

The implement coupler assembly 220 may include components 342-382, each described in turn below. A toolbar coupler bracket 342 may interface and attach to at least the underside and the front or forward side of the toolbar 301. A first end of a tilt actuator 344 may be attached to the toolbar coupler bracket 342 via a cylinder lug 346 and lug bracket 348 assembly. A second end of the tilt actuator 344 opposite the first end may be attached to an implement tilt arm 350 via a tilt arm bracket 352. The tilt actuator 344 may enable the implement 114, once attached to the toolbar 301 via the implement coupler assembly 220, to articulate as the drive unit 110 is moving (e.g., pulling) the implement 114. The implement tilt arm 350 may include an implement bracket 354 that is formed as part of or mounted to the surface of the implement tilt arm 350.

The implement bracket 354 may be configured to couple to a receiving component on the implement 114, such as an implement toolbar. The implement bracket 354 may be coupled to an implement pin plate 356. The implement pin plate 356 may have one or more througholes 358. An implement pivot pin 360 may be inserted through at least one of the througholes 358 and into a corresponding throughole (not shown) of the implement bracket 354 to pivotally attach the implement bracket 354 to the implement pin plate 356. The throughole 358 through which the implement pivot pin 360 is inserted may be based on a type of implement 114 to be attached (e.g., based on a height, weight, or other characteristics of the implement 114). For example, if the implement 114 is a planter implement, the planter implement may be rotatable about the implement pivot pin 360 via the implement tilt arm 350. In other examples, if the implement 114 is a liquid applicator implement that does not need to be rotated, the implement coupler assembly 220 may not include the implement tilt arm 350, and the tilt actuator 344 and cylinder lug 346 may instead be attached to the implement pin plate 356 via a pin extended through one of the through holes 358.

The implement pin plate 356 may be attached to a coupler pin plate 362 via a coupler plate 364. The implement pin plate 356, the coupler pin plate 362, and the coupler plate 364 may form a universal bracket that may be used with any type of implement. A static hook arm 366 may be attached to the coupler pin plate 362 via a first latch pin 368, and a dynamic hook arm 370 may be attached to the coupler pin plate 362 via a second latch pin 372. The static hook arm 366 may be attached to a toolbar coupler bolt plate 374. The toolbar coupler bolt plate 374 may interface with and attach to the back side of the toolbar 301. A latching actuator 380 may be attached to the static hook arm 366 via a latching actuator bracket 382. The dynamic hook arm 370 may be attached to the latching actuator 380 via a pin 378 that enables the dynamic hook arm 370 to move relative to the latching actuator 380. For example, as shown in FIG. 3C, the dynamic hook arm 370 is in a first position where the second latch pin 372 that is attaching the dynamic hook arm 370 and the coupler pin plate 362 is secured by the dynamic hook arm 370. Alternatively, in a second position the dynamic hook arm 370 may be pulled upward, causing the dynamic hook arm 370 to be released from the second latch pin 372.

To provide an illustrative example, to couple the implement 114 to the drive unit 110, one or more air bags of the suspension system 214 may be deflated to an implement loading position, and the latching actuator 380 may be retracted. The drive unit 110 may be manually or automatically navigated to position the drive unit 110 relative to the implement 114 for loading. At this point in time, the static hook arm 366 and the dynamic hook arm 370 may pass between the first latch pin 368 and the second latch pin 372. Once the drive unit 110 is positioned relative to the implement 114, the air bags may then be inflated to a default position, which causes the static hook arm 366 to raise into and be secured by the first latch pin 368. In some examples, inflation of the air bags may be monitored using sensors (e.g., of sensor systems 224) and automatically adjusted to align the drive unit 110 with the implement 114. Each air bag may be adjusted independently to account for uneven ground or a tilt of the implement 114, among other examples. The latching actuator 380 may then be extended automatically or manually to pull the dynamic hook arm 370 upward and engage the second latch pin 372. During loading of the implement 114, implement pin plate 356 and the components attached thereto, may be fixed relative to the implement toolbar.

The above example describes a scenario when the suspension system 214 of the drive unit is an air bag suspension system. In another example, when the suspension system 214 has a spring configuration, the latching actuator 380 may be configured in a different orientation (e.g., rotated 180 degrees from the latching actuator 380 shown in FIG. 3C). In such examples, the implement 114 may be lowered manually onto the second latch pin 372 using a jack or other similar mechanism and, once lowered, the latching actuator 380 may be actuated to cause the static hook arm 366 to extend upward into and be secured by the first latch pin 368.

Although not shown in FIG. 3C, in some examples, the implement coupler assembly 220 may also include one or more sensors (e.g., from sensor systems 224). One exemplary sensor may be configured to monitor a position and/or angle of the toolbar of the implement 114 to facilitate coupling and/rotation of the toolbar of the implement 114. Another exemplary sensor may be configured to detect a coupling status of the implement (e.g., attached or detached).

In one exemplary configuration, attachment of the implement 114 to the drive unit 110 via the implement coupler assembly 220 may be manual. For example, a user may provide input to via the platform application 128 executing on the user device 120 and/or the controller device 121 on user device 120 to control the positioning of the drive unit 110 relative to the implement 114 for coupling. The user may then manually actuate the latching actuator 380 to facilitate the raising or lowering of the implement 114 onto the implement coupler assembly 220, and release the latching actuator 380 to lock the implement 114 to the drive unit 110 (e.g., once the toolbar of the implement is engaged by the implement bracket 354). In another exemplary configuration, attachment of the implement 114 to the drive unit 110 via the implement coupler assembly 220 may be semi-automated. For example, the drive unit 110 may automatically navigate to a position relative to the implement 114 for coupling. The user may then manually actuate the latching actuator 380 to facilitate the raising or lowering of the implement 114 onto the implement coupler assembly 220, and release the latching actuator 380 to lock the implement 114 to the drive unit 110. In a further exemplary configuration, attachment of the implement 114 to the drive unit 110 via the implement coupler assembly 220 may be entirely automated. For example, the drive unit 110 may automatically navigate to a position relative to the implement 114 for coupling. The computing device 232 of the drive unit 110 may transmit instructions to the pneumatic system 212 to cause the one or more air bags of the suspension system 214 to raise the drive unit 110. As the drive unit 110 is raised, the computing device 232 may transmit commands to the pneumatic system 212 to cause automatic actuation of the latching actuator 380 to enable the implement coupler assembly 220 to engage the implement 114 via the implement bracket 354, and a subsequent release to lock the implement to the drive unit 110. In some examples, a safety latch may engage in an even of a loss of power to the drive unit 110 that prevents the latching actuator 380 from being actuated.

The components of the drive unit 110 shown and described with reference to FIG. 3A-3C are non-limiting and non-exhaustive. Various other components may be mounted on the toolbar 301 with toolbar U-bolts.

FIG. 4 depicts an isometric view of a second configuration 400 of an exemplary drive unit 110. The second configuration 400 may be similar to the first configuration 300 described with reference to FIGS. 3A-3C, except for the caster wheels 326, the bracket 327, and the pivoting arm 328 may be replaced with track assemblies 302. Resultantly, the second configuration 400 may include four track assemblies 302A, 302B, 302C, 302D. As shown in FIG. 4, first and second track assemblies 302A, 302B may be positioned on the front or forward side of the toolbar 301, the front side being the side opposite of the side of the toolbar 301 to which one of the implements 114 may be attached. Third and fourth track assemblies 302C, 302D may be positioned on the back or rear side of the toolbar 301 to which one of the implements 114 may be attached. More specifically, the third and fourth track assemblies 302C, 302D may be attached to a distalmost portion of the telescoping chassis beams 316 (e.g., attached to an arm of the telescoping chassis beam 316 that will extend the furthest outward when each of the arms is in a fully extended positioned) such that the third and fourth track assemblies 302C, 302D may extend outward and retract inward as the telescoping chassis beams 316 are respectively extended outward and retracted inward.

Additionally, the second configuration 400 of the drive unit may include different and/or fewer components mounted to the toolbar 301, the main chassis beams 314, the front chassis beams 315, and/or the telescoping chassis beams 316.

Figure 5:
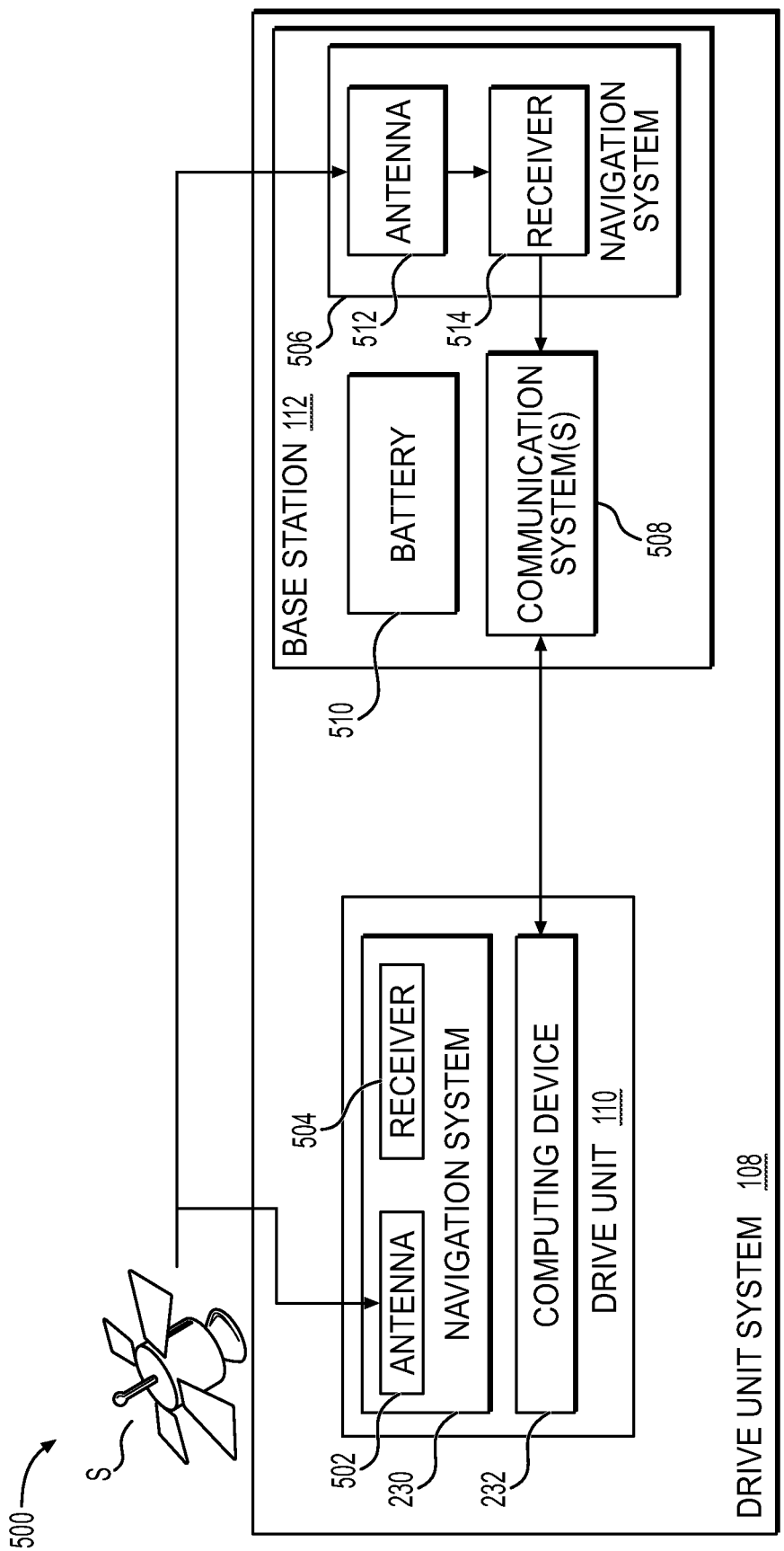
FIG. 5 depicts a flow diagram of exemplary interactions between a drive unit and a base station, according to certain embodiments.

FIG. 5 depicts an exemplary flow diagram 500 of interactions between the drive unit 110 and the base station 112 of the drive unit system 108. As briefly described with reference to FIG. 2, the drive unit 110 may include the navigation system 230. The navigation system 230 may be a GPS system (e.g., a satellite-based navigation system). For example, the navigation system 230 may include an antenna 502 and a receiver 504. The antenna 502 and the receiver 504 may be connected by a coaxial cable. The antenna 502 may receive signals from a satellite S at varying frequencies. The antenna 502 may expand the signals and convert the expanded signals into electronic signals that are interpretable by the receiver 504 to generate observed satellite data. The observed satellite data may be provided to the computing device 232 of the drive unit 110 for further processing to generate positional data and/or provided as input into one or more navigational programs (e.g., software) to e.g., enable automatic navigation of the drive unit 110.

However, as the signals travel from the satellite S to the receiver 504, the signal's propagation is effected, which introduces measurement errors that reduce accuracy of positional data calculated based on the signal that a single receiver (e.g., the receiver 504) on its own may not be able to resolve. Therefore, the drive unit system 108 may also include the base station 112 to enable implementation of Real-Time Kinematic (RTK) GPS techniques to improve the accuracy of the positional data (e.g., to achieve a centimeter level position accuracy).

The base station 112 may be an enclosure comprising a navigation system 506 for providing base corrections data, one or more communication systems 508 for communicating the base corrections data to other devices, such as the drive unit 110, and a battery 510 for powering the systems of the base station 112. The base station 112 may be a stationary device positioned at a location within an agricultural site (e.g., in-field) that is within a predefined communication range of the drive unit 110. Resultantly, the coordinates of the location of the base station 112 are fixed and known.

Similar to navigation system 230 of drive unit 110, the navigation system 506 may be a GPS system that includes an antenna 512 and a receiver 514. The antenna 512 and the receiver 514 may be configured to perform the same or similar operations to the antenna 502 and the receiver 504 of the drive unit 110. Based on the proximity of the base station 112 to the drive unit 110, the navigation system 506 may observe the same satellite as the navigation system 230. When a signal is received by navigation system 506, the receiver 514 may transmit the known location of the base station 112 and observed satellite data (e.g., base corrections data) to the drive unit 110 via one or more of the communication systems 508. The communication systems 508 may, in some examples, include cellular and/or radio communication systems.

The computing device 232 of the drive unit 110 may receive and utilize the base corrections data and one or more RTK algorithms to exclude errors from the position calculation determined based on the observed satellite data from the receiver 504.

While the base station 112 described herein is an enclosure that is part of the drive unit system 108 of the platform 100. In other examples, the base station 112 may be separate from and used in conjunction with the platform 100, such as a base station of a local service provider that can provide correction data over the Internet through, e.g., Networked Transport of RTCM via Internet Protocol (NTRIP).

FIGS. 6A-6C, 7A, and 7C depict exemplary planter implements. Conventionally, planters are pulled through the field by tractors of various sizes and weights depending on the size of the planter and number of row units. Pull-type planters have a tongue that is attached to the tractor rear hitch. Three-point hitch planters attach to the three-point hitch of the tractor. The planters are pulled through the field with a tractor of sufficient size and horsepower for both pull-type and three-point hitch planters. Large planters are required to have the capability to fold to a narrower width in order to be transported on commercial roadways. Large planters can weigh several thousand pounds, and the tractors required to pull them can weigh more than 30,000 pounds.

Figure 6B:
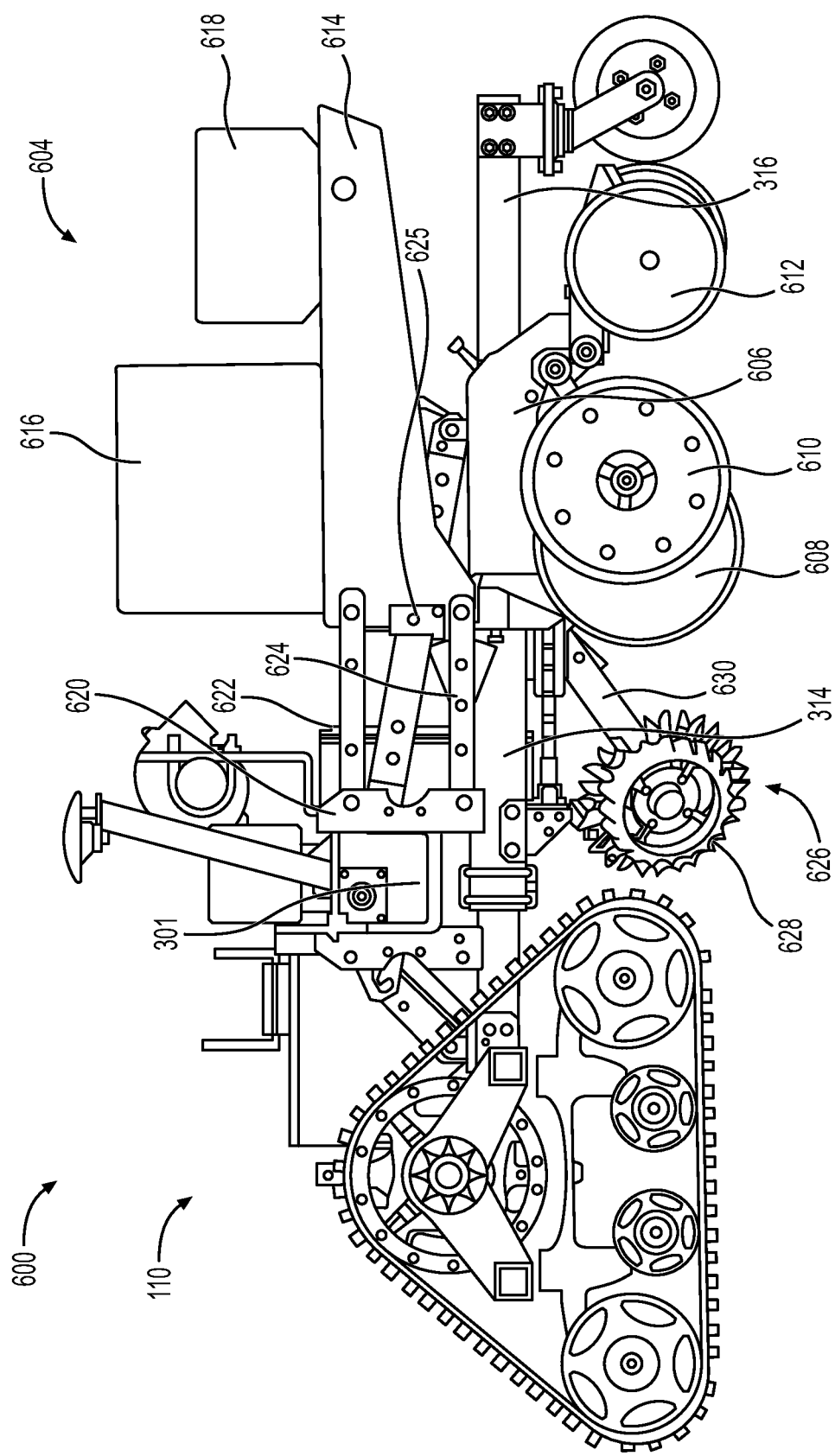
Figure 6C:
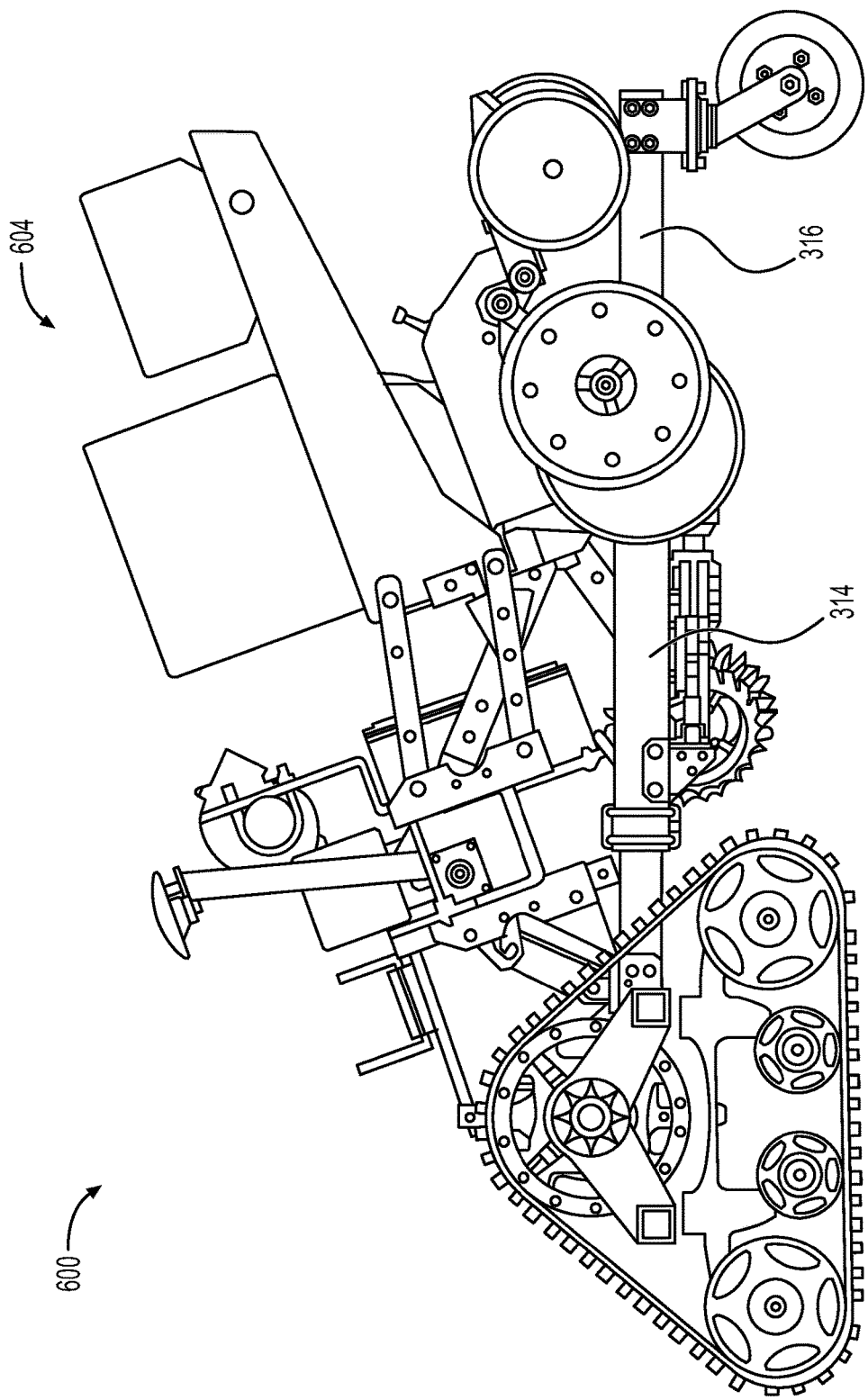

FIGS. 6A-6C depict an autonomous planter 600. FIG. 6A is an isometric view of the autonomous planter 600. The autonomous planter 600 may include the first configuration 300 of the drive unit 110 described above with reference to FIG. 3A, and a planter implement 602 removably attached to the toolbar 301 of the drive unit 110. The planter implement 602 may include one or more planter row units 604. While four planter row units are illustrated herein, the planter implement 602 may include more or fewer planter row units 604. For example, a typical number of planter row units may vary from about 4 to about 48 row units. A spacing between row units may also vary with more typical spacing being about 15, about 20, or about 30 inches between the row units. Row units may include a range of components depending on farmer preferences and management practices.

Referring now to FIG. 6B, which depicts a side view of the autonomous planter 600 of FIG. 6A, each row unit 604 may include a shank 606 to which double disk openers 608, gauge wheels 610, a closing system with press wheels 612, and/or a fin 614 may be attached. The double disk openers 608 may form a shallow furrow for seed placement, the gauge wheels 610 may control a depth of the furrow formed, and the closing system with press wheels 612 may close the furrow to promote seed to soil contact, as well as reduce sidewall compaction caused by the double disk openers 608. Although not shown here, the row unit 604 may also include seed firmer attachments that are designed to push the seed to the bottom of the furrow prior to closure of the furrow to further promote optimal seed to soil contact.

The fin 614 may support one or more other components of the row unit 604. For example, each row unit 604 may include a seed box 616 for holding seed and an additive box 618 for holding any other additive that may be helpful for crop production that are each mounted to the shank 606 via the fin 614. As shown in FIGS. 6A-6C, the seed box 616 may be an individual seed box for each row. In other examples, the planter implement 602 may include as plurality of miniature seed boxes that are fed from a central seed storage system (shown in FIGS. 7A and 7B). Each row unit 604 may also include a seed tube (not shown) for directing seed from the seed box 616 to the furrow formed by the double disk openers 608 and a seed meter (not shown) for controlling the movement of seed via the seed tube. In some examples, the seed meters may be driven by electric motors, which may be controlled by one or more motor controllers of the planter implement 602. The seed meters may have spinning disks with holes near an outer circumference of the disks. The holes of the spinning disks attract individual seeds that are held on the holes by suction generated by the vacuum assembly 221 that is attached to the seed meter devices. As the disk spins, individual seeds are knocked off the disk as the seed reaches the bottom of the disk. Once knocked off the disk, the seed falls down the seed tube and into the seed furrow.

A planter w-bracket 620 attached to the toolbar 301 of the drive unit 110 may connect upper parallel arms 622 and/or lower parallel arms 624 to the fin 614 (e.g., mounted on the shank 606) of each row unit 604 to secure the row unit 604 to the drive unit 110. The planter w-bracket 620 may also be configured to connect a further arm to a lift shim 625 that allows for fine tuning a lift height of the drive unit 110 as the drive unit 110 is raised or lowered. In some examples, the drive unit 110 may include a row cleaner 626 for each row unit 604. The row cleaner 626 may include a wheel 628 attached to the shank 606 of the row unit 604 via a row cleaner arm 630. The row cleaner 626 moves crop residue from the path of the double disk openers 608 in order to increase planting depth consistency and prevent or inhibit an accumulation of crop residue at the front edge of the double disk openers 608.

As described in detail above with reference to FIG. 3A, when the telescoping chassis beams 316 are extended and retracted relative to the main chassis beams 314, each row unit 604 may be correspondingly raised and lowered based on the rotation of the toolbar 301. FIG. 6B depicts the autonomous planter 600 in a lowered position (e.g., where each row unit 604 is lowered) when the telescoping chassis beams 316 are extended. FIG. 6C depicts the autonomous planter 600 in a raised positioned (e.g., where each row unit 604 is raised) when the telescoping chassis beams 316 are retracted.

Referring back to FIG. 6A, the seed meters of the row units 604 that distribute seed to the seed tubes may require suction in order to hold individual seeds on each of the seed meter disks. The vacuum assembly 221 may provide vacuum suction to the drive unit 110 via a manifold adapter 642 and a manifold 644 that are attached to the toolbar 301 via a bracket 646. The vacuum assembly 221 may include an impeller fan within a fan casing 648 and a vacuum motor 650 for powering the impeller fan. The motor 650 may be powered by one or more batteries (e.g. of battery system 208) of the drive unit 110. Each vacuum motor 650 may be connected to a vacuum controller (e.g., one or microcontrollers 226) that is connected to the computing device 232. The computing device 232 may generate and transmit commands to the vacuum controllers for turning the vacuum motors 650 on and off. In some examples, the vacuum assemblies may also include a pressure transducer sensor (e.g., one of sensor systems 224) that monitors and provides pressure feedback to the vacuum controllers, which may be further transmitted to the computing device 232.

The planter implement 602 may also include a plurality of sensors of varying types. Exemplary sensors may include gauge wheel weight sensors, optical sensors attached to the seed firmer, and/or optical sensors inside the seed tube. Gauge wheel weight sensors may measure the weight on the gauge wheels 610. A lower weight (e.g., a weight below a predefined threshold weight) may be an indication of higher soil compaction and a higher weight (e.g., a weight above a predefined threshold weight) may be an indication of lower soil compaction. Data from the gauge wheel weight sensor readings may trigger an adjustment of an automated downforce provided to the row units 604 by a downforce assembly 652. For example, in highly compacted areas of a field, row units 604 may be forced upwards and result in shallow planting depth. Automated downforce may be used to help ensure uniform planting depth. Optical sensors attached to the seed firmer may measure soil temperature, moisture content, and/or organic matter level, among other similar data. Optical sensors in the seed tube may measure seed singulation and seed doubles to e.g., identify the frequency of skips and/or doubles, which provide indicators of seed spacing in the furrow.

As the autonomous planter 600 is operating within the field to plant seed, planting-related data can be collected using the sensors. Data collected by the planter sensors may be sent to a central planter control unit (e.g., a Precision Planting Gen 3 20/20 unit) of the planter implement 602, where data may be stored and/or used for operation of the autonomous planter 600 (e.g., automated down force control). The data may also be transmitted to one or more of the remote systems 106 over the network 104. In some examples, one or more sensors and/or systems of the planter implement 602 and/or the drive unit 110 may be powered with a planter power distribution module 660.

Figure 7A:
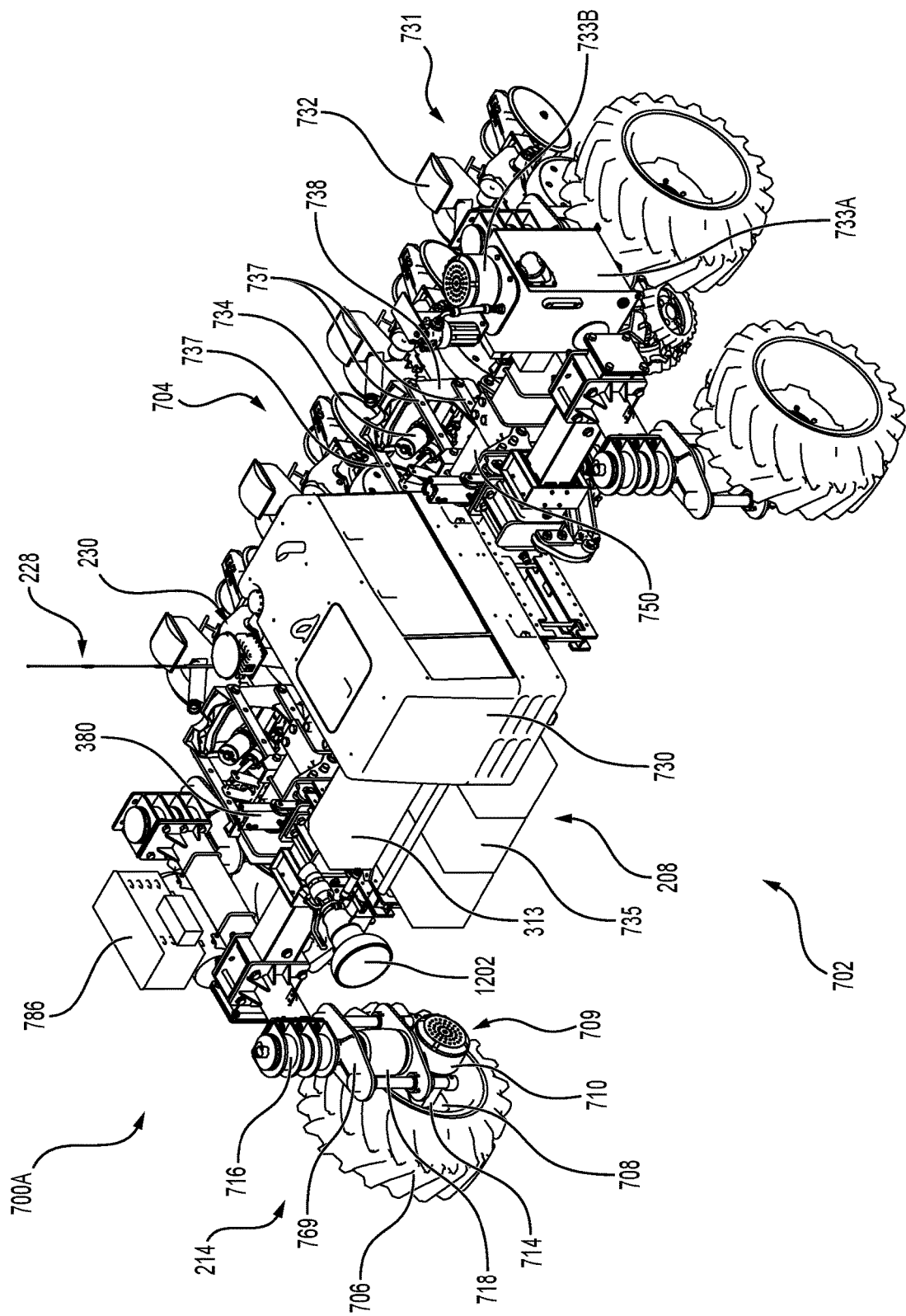
FIGS. 7A-7C depict other exemplary autonomous planters and/or components thereof, according to certain embodiments.
Figure 7B:
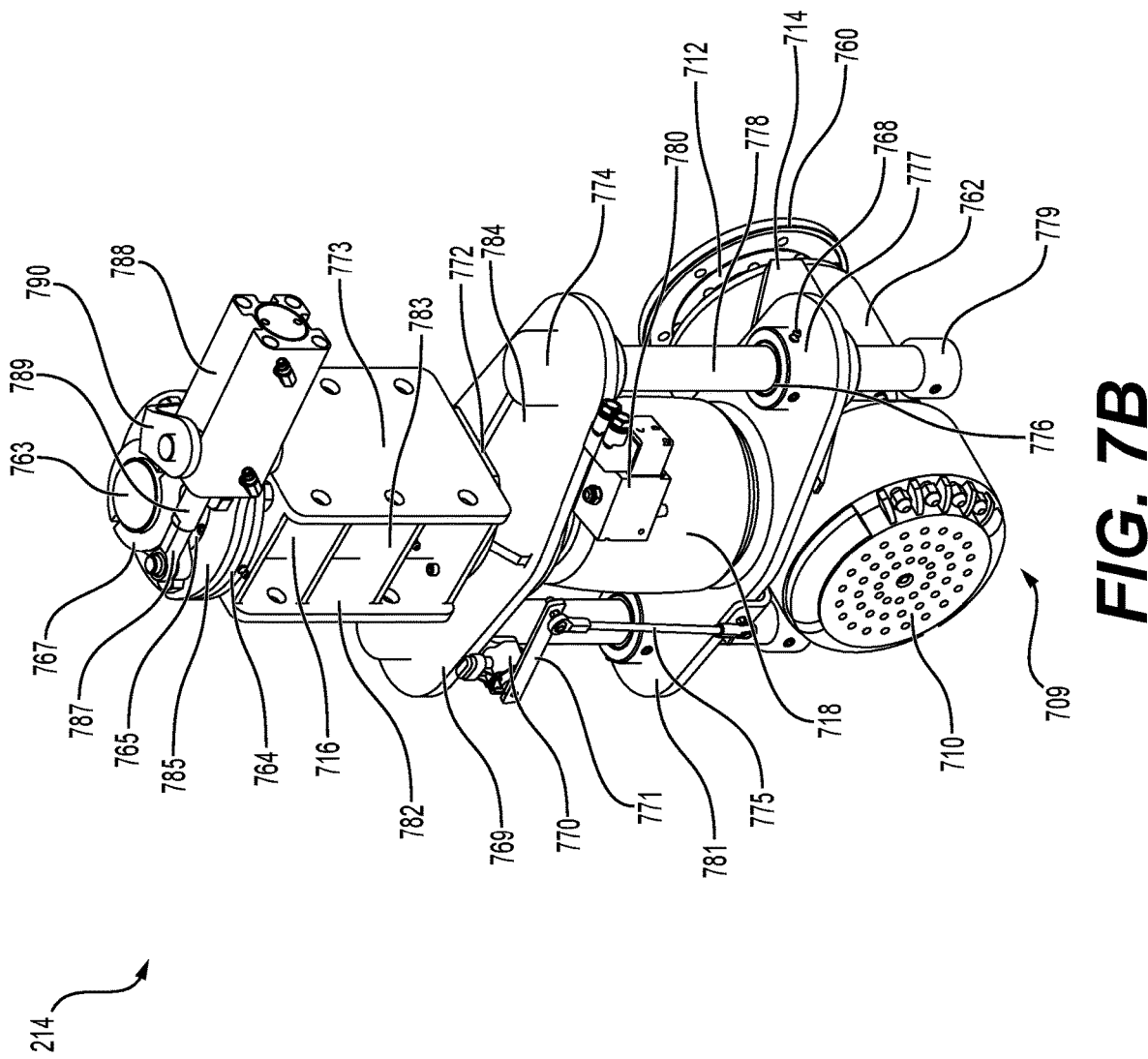
Figure 7C:
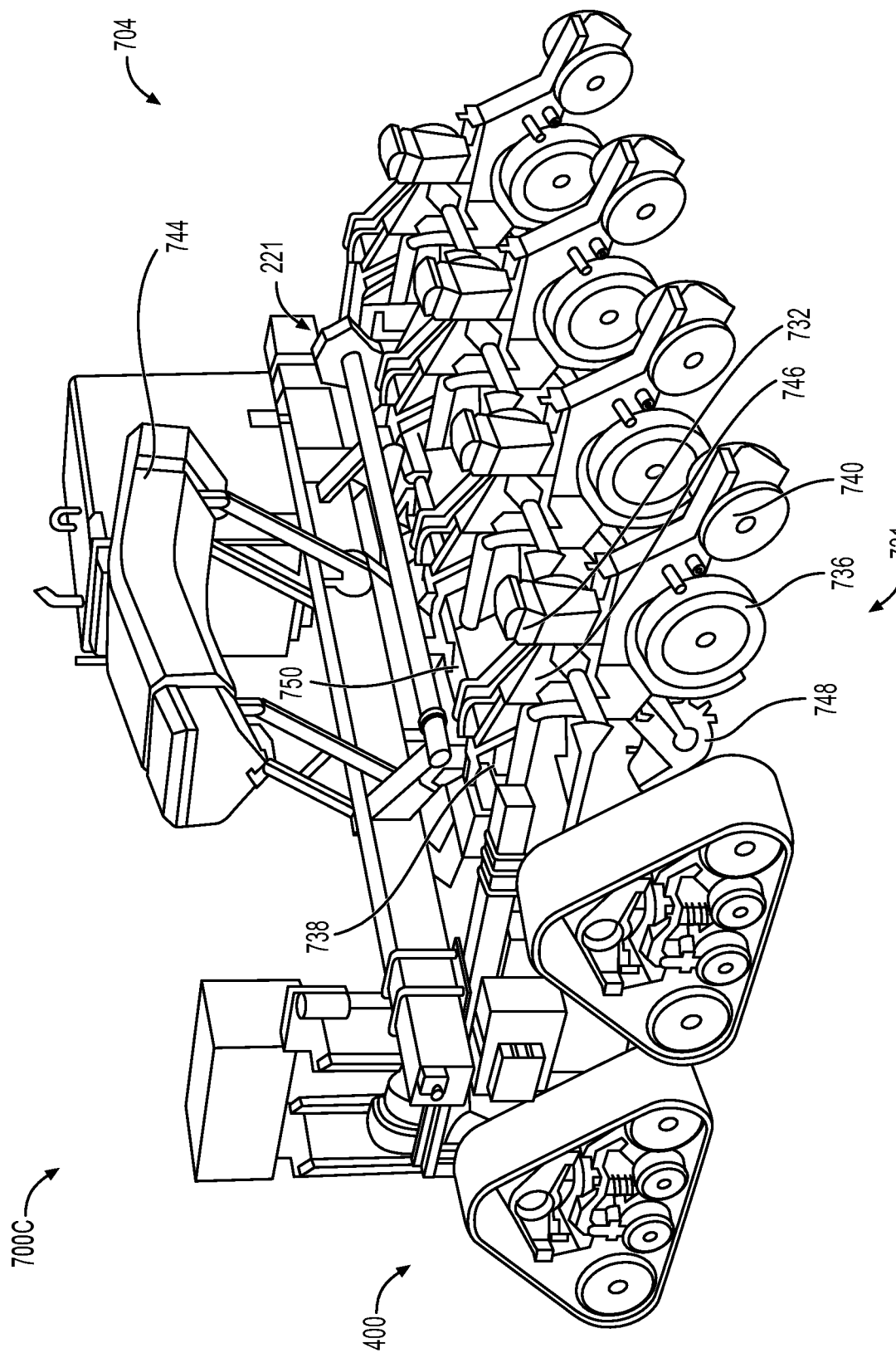

FIGS. 7A and 7C depict additional examples of autonomous planters 700A, 700C and/or components thereof. FIG. 7A is an isometric view of the autonomous planter 700A. The autonomous planter 700A may include a third configuration 702 of the drive unit 110, and a planter implement 704 removably attached to the toolbar 301 of the drive unit 110.

The drives assemblies of the third configuration 702 of the drive unit 110 may include wheels comprised of a rim 708 and a tire 706 surrounding the rim 708. A motor assembly 709 having a motor 710 may be coupled to each drive assembly. The motor assembly 709 may be attached to the suspension system 214. FIG. 7B depicts an exemplary motor assembly 709 and suspension system 214. Referring to FIG. 7B, the motor assembly 709 may include the motor 710, a gearbox 712, an adapter (not shown) connecting the gearbox 712 to the motor, a bracket 714 connecting the gearbox 712 to the inner drive leg 718 of the suspension system 214, and an adapter 760 for connecting the gearbox to the drive assembly. A gearbox frame tube 762 may enclose one or more components of the gearbox 712.

The inner drive leg 718 of the suspension system 214 may rotate about the outer drive leg 716 for steering. The inner drive leg 718 may be fixed to the outer drive leg 716 with a thrust bearing that is at a top of the outer drive leg 716 (e.g., covered by a rubber end cap 763) and secured by a thrust end cap 764. A gasket cover 765 may be positioned between the thrust end cap 764 and one or more other components of the suspension system 214.

The suspension system 214 may also include a steering transfer tube (not shown) positioned beneath the end cap 763, a steering knuckle 767, a steering actuator rod end 787, a steering actuator 788, and a steering actuator rod 789. A steering actuator bottom bracket 785 to which the steering actuator rod end 787 is attached may be positioned above the thrust end cap 764. The steering actuator rod end 787 may be attached to the steering actuator 788 via the steering actuator rod 789. The steering actuator rod end 787 may also be attached to the steering knuckle 767, and the steering knuckle 767 may be attached to the steering transfer tube. A steering actuator top bracket 790 may attach the steering actuator bottom bracket 785 to the steering actuator 788. In some examples, a hydraulic cylinder or linear actuator may be attached to the steering knuckle 767. In other examples, the steering knuckle 767 may be replaced by an electric motor and gearbox or a hydraulic helical actuator that is attached to the steering transfer tube.

The suspension system may further include an upper primary plate 769 having one or more guide arm brackets 774 for receiving a corresponding one or more guide arms 778. Each of the guide arms 778 may extend through a guide arm bushing 776 within a guide arm bushing bracket 777 formed on a bottom primary plate 781 such that each of the guide arms 778 extends entirely through the bottom primary plate 781 and includes a guide arm end cap 779. In some examples, the guide arm end cap 779 may include a rubber bumper. Each guide arm 778 may be attached to a corresponding guide arm bracket 774 via a fixation mechanism (not shown), such as a set screw, a bolt, or other similar mechanism, and the guide arm bracket 774 may be mounted to the upper primary plate 769. The bottom primary plate 781 and attached components (e.g., the motor assembly 709) move along the guide arms 778 as the air bag(s) of the suspension system 214 are compressed or deflated. The air bag(s) may be compressed or deflated through the operation of valves that are automatically controlled via height stability software, or software associated with the transport loading or implement loading. Additionally or alternatively, the air bag(s) may be compressed or deflated in response to an interaction of the drive assemblies with the ground (e.g., when bumps or the like are encountered). The bottom primary plate 781 and attached components move along the guide arms 778 via the guide arm bushings 776 seated in the guide arm busing brackets 777. The guide arm end cap 779 provides a stop at a full extension of the bottom primary plate 781 along the guide arms 778. A compressor assembly 786 (FIG. 7A) may provide compressed air to drive the movement.

The suspension system 214 may further include a rotary sensor 770 attached to the upper primary plate 769 and mounted on a rotary sensor arm 771 that is attached to the bottom primary plate 781 via a rotary sensor rod 775. A bottom end cap 772 may be positioned between a lateral beam bracket plate 773 and the upper primary plate 769. The lateral beam bracket plate 773 may be used to attach the suspension system 214 and thus the motor assembly 209 to one of the chassis beams of the toolbar 301. In some examples, an auxiliary bracket bolt plate 782 parallel to the lateral beam bracket plate 773 may be included to attach other external components, such as a suitcase weight bracket for weight ballasting or cross-frame pieces to increase a stiffness of the drive unit 110, among other examples. The suspension system 214 may also include an outer tube gusset 783 to strengthen the lateral beam bracket plate 773 and/or the auxiliary bracket bolt plate 782, as well as an upper primary plate gusset 784.

In other examples not shown herein, the inner drive leg 718 and outer drive leg 716 may be telescoping drive legs, where the inner drive leg 718 configured to extend and retract relative to the outer drive leg 716. In such examples, an enclosed airbag or spring configuration may be configured to control a position of the inner telescoping drive leg.

In addition to steering functionality, the suspension system 214 may be configured to provide automated height stabilization. For example, air bags of the suspension system 214 may be inflated or deflated to adjust a height of the drive unit 110. In one exemplary scenario, to mitigate tipping and/or rollover as fluid is being emptied from a tank of an attached implement 114 and thus a weight of the implement 114 is decreased, the air bags may extend (e.g., inflate) to adjust the height of the drive unit 110. Additionally or alternatively, the air bags of the suspension system 214 may be deflated to maintain the same height of the drive unit 110 and any attached implement 114 (or component thereof) at the same height with respect to ground. As one specific and non-limiting example, for the planter implement 704, the air bags of the suspension system 214 may be utilized to maintain parallel arms 737 (discussed below) parallel to the ground if a combined weight of the drive unit 110 and the planter implement 704 differs between operations (e.g., one configuration has 4 rows of planter units 731 and another configuration has 7 rows of planter units 731).

Returning to FIG. 7A, the power configuration system 206 may include a generator 730 and a hydraulic power unit 733A having a hydraulic pump enclosed in the unit and a motor 733B. The battery system 208 may include a modular battery pack 735 mounted to the toolbar 301 that is capable of being re-charged onboard the drive unit by the generator 730. Additionally or alternatively, the battery pack 735 may be removed by the docking station 116 and replaced with another modular battery pack 735 (e.g., that is fully charged). The battery system 208 may include a battery coupler (not shown) to enable connection and disconnection of the modular battery pack 735 from the battery system 208.

The navigation system 230 system may include the antenna 502 and receiver 504 described with reference to FIG. 5 to obtain positional data associated with the drive unit 110. The electronics enclosure 313 may include the computing device 232 of the drive unit 110 that may be configured to exchange data with components of the drive unit 110 and/or other components of the platform via the one or more other communication systems 228 described above with reference to FIG. 2.

Figure 12:
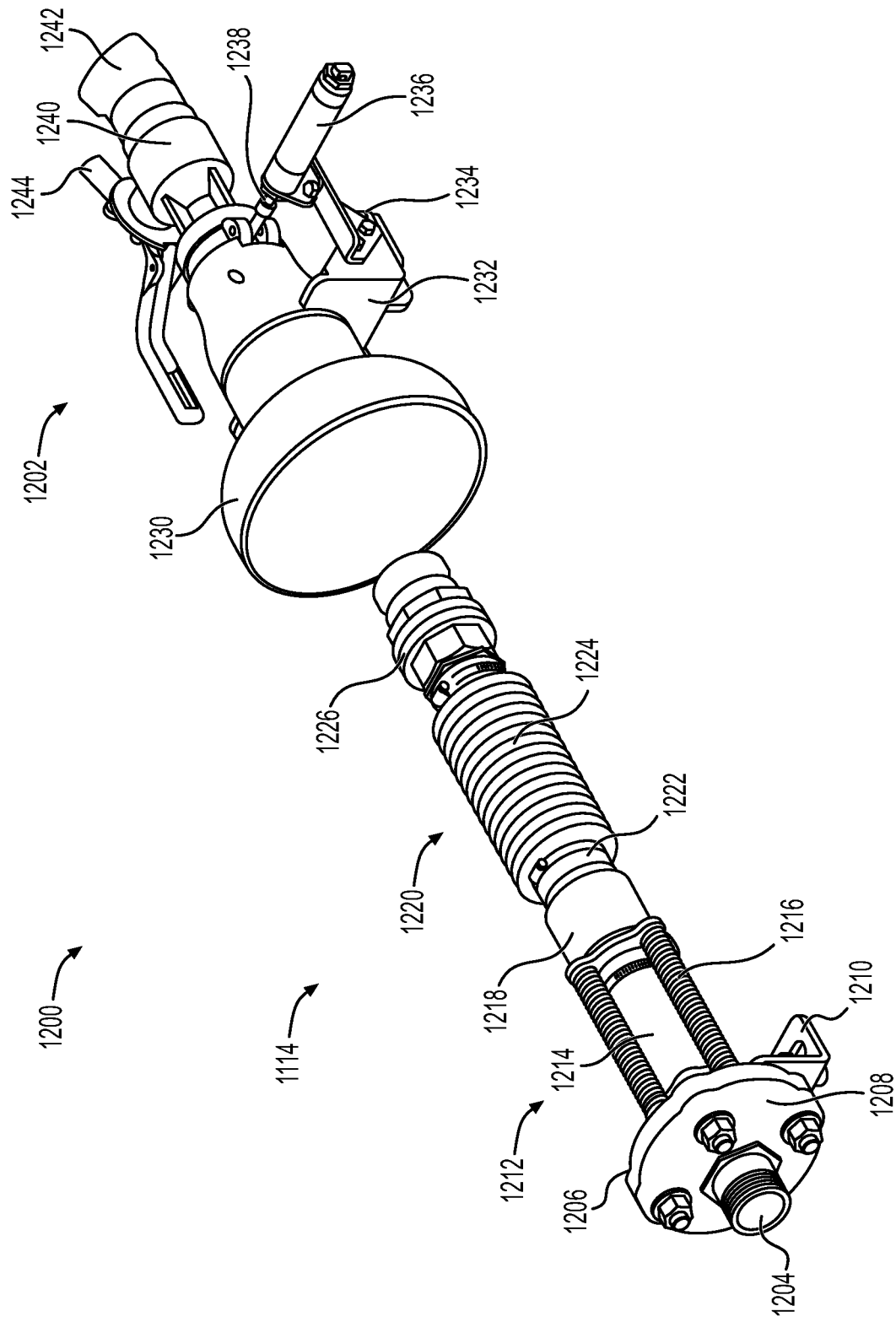
FIG. 12 depicts an exploded view of a fluid refill coupling assembly, according to certain embodiments.

Further, the latching actuator 380 of the implement coupler assembly 220 described above with reference to FIG. 3C, and a fluid refill female coupler 1202 described below with reference to FIG. 12 are shown in the third configuration 702 of the drive unit 110 depicted in FIG. 7A.

FIG. 7C is an isometric view of the autonomous planter 700C. The autonomous planter 700C may include the second configuration 400 of the drive unit 110 described with reference to FIG. 4, and the planter implement 704 removably attached to the toolbar 301 of the drive unit 110.

Referring to both FIGS. 7A and 7C, the planter implement 704 may include a plurality of row units 731 attached to a shank 738. Similar to the planter implement 602 of the autonomous planter 600, each row unit 731 may include a seed meter 732, a gauge wheel 736, a double disk opener (not shown in these orientations as the double disk opener is behind gauge wheel 736), a closing system with press wheels 740, and a row cleaner 748, as well as a downforce assembly 734. However, instead of individual seedboxes, each row unit 731 of the planter implement 704 may include a miniature seedbox 746 that is fed from a central seed storage system 744. Additionally, for each row unit 731, two sets of parallel arms 737 (FIG. 7A) may connect the shank 738 to a w-bracket (not shown) attached to the implement toolbar 750. The arms 737 may allow the planter implement 704 to articulate (e.g., move up and down) while maintaining parallel to the ground as the drive unit 110 is driving the planter implement 704. Similar to the autonomous planter 600, the vacuum assembly 221 of the drive unit 110 of the autonomous planters 700A, 700C may facilitate the distribution of the seeds by the seed meters 732. The planter implement 704 may be attached to the drive unit 110 via an implement toolbar 750.

Figure 8:
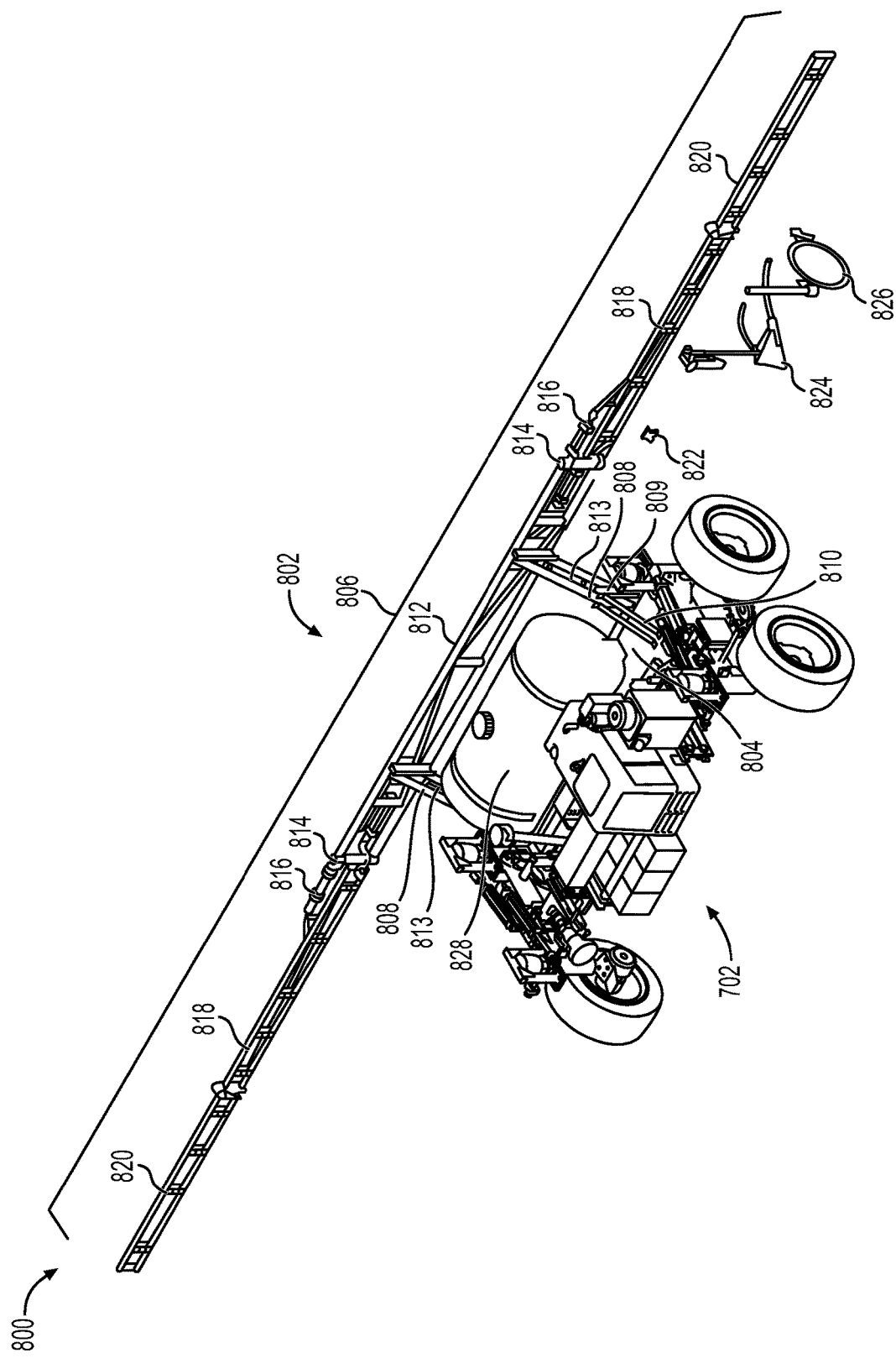
FIG. 8 depicts an exemplary autonomous fluid applicator, according to certain embodiments, according to certain embodiments.

FIG. 8 depicts an isometric view of an autonomous fluid applicator 800 configured to apply liquid products to fields pre-plant or post-emerge (i.e., apply to the growing crops). The autonomous fluid applicator 800 may include the third configuration 702 of the drive unit 110 described with reference to FIG. 7A, and a fluid applicator implement assembly 802 (hereinafter implement assembly 802) attached to the drive unit 110. The implement assembly 802 may include a frame 804 for supporting one or more other components of the implement assembly 802. The implement assembly 802 may also include a boom 806 attached to the frame 804 via an attachment assembly. The attachment assembly may include parallel arms 808, a parallel arm bracket 809, and a gusset 810. The gusset 810 may be attached to the frame 804 and the parallel arm bracket 809. The parallel arms 808 may then extend from the parallel arm bracket 809 and attach to the boom 806.

The boom 806 may include a boom center section 812 to which the parallel arms 808 are attached, and a boom height adjustment cylinder 813 that is configured to increase or decrease a height of the boom 806. Additionally, on each side of the boom center section 812, the boom may include (e.g., as mirror images) a boom wing adjustment cylinder 814 that is attached to the end of the boom center section 812 and configured to adjust a position of a boom wing 818 and/or a secondary boom wing 820 attached to the boom wing 818. For example, the boom wing 818 and/or secondary boom wing 820 on either side of the boom center section 812 may be folded in vertically or horizontally to, e.g., decrease width dimensions for transport. Further, a boom leveling cylinder 816 may be attached to the boom wing adjustment cylinder 814. Boom leveling cylinder 816 may be configured to fold in the boom wing 818 and/or the secondary boom wing 820 vertically or horizontally. Additionally, boom leveling cylinder 816 may perform boom leveling functions to, for example, account for terrain geometry of the field.

The implement assembly 802 may also include an applicator for dispensing liquid products that may be attached at various locations along the boom wing 818 and/or the secondary boom wing 820. The type of applicator may be based on a type of liquid product being dispensed (or a task being performed) and/or a stage of the crops when the application is to occur (e.g., pre-plant or post-emerge). In some examples, the applicator may be a sprayer. In such examples, the applicator may be a spray nozzle 822 for applying liquid herbicides, insecticides, fungicides, pesticides, fertilizer, or other similar liquids. In other examples, the applicator may be for nitrogen sidedressing. In such examples, the applicator may be a Y-drop 824 to stream liquid nitrogen on top of the soil. Alternatively, the applicator may be a coulter injector 826 for injecting liquid nitrogen into the soil. In some examples, the various types of applicators may be interchangeably attached and detached from the boom 806 such that a single implement assembly 802 may be used for either spraying or nitrogen dressing. In other examples, each implement assembly 802 may be either a dedicated sprayer implement assembly or a dedicated nitrogen dressing implement assembly.

The implement assembly 802 may further include one or more tanks 828 supported by the frame 804. Each tank 828 may store the liquid to be applied by the applicator (e.g., one of the applicators 822, 824, 826). A pump (not shown) may be in fluid communication with the tank 828 to pump the liquid from the tank 828 and into the boom 806 via one or more conduits (not shown) to be dispensed via the applicator. In some examples, the conduits may be attached to and run parallel to the frame 804. To monitor and control a rate of flow of the liquid as it is being pumped from the tank 828 into the boom 806 and/or as it is being dispensed from the applicator, the implement assembly 802 may also include one or more flowmeters (not shown).

Figure 9:
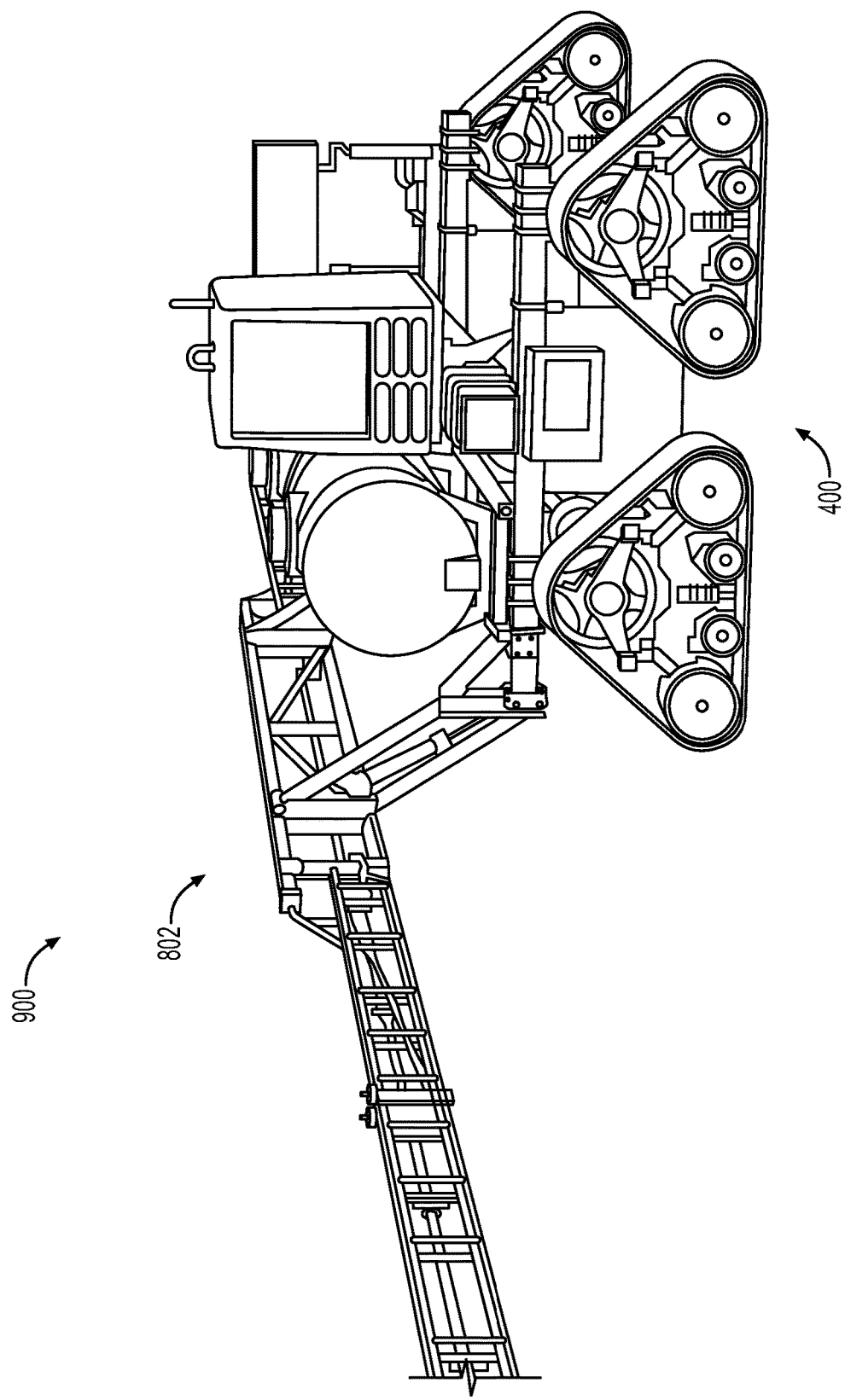
FIG. 9 depicts another exemplary autonomous fluid applicator, according to certain embodiments.

FIG. 9 depicts a side view of another autonomous fluid applicator 900. The autonomous fluid applicator 900 may be similar to the autonomous fluid applicator 800 described with reference to FIG. 8, except for a configuration of the drive unit 110. For example, the autonomous fluid applicator 900 may include the second configuration 400 of the drive unit 110 described with reference to FIG. 4 with the implement assembly 802 attached thereto.

Figure 10:
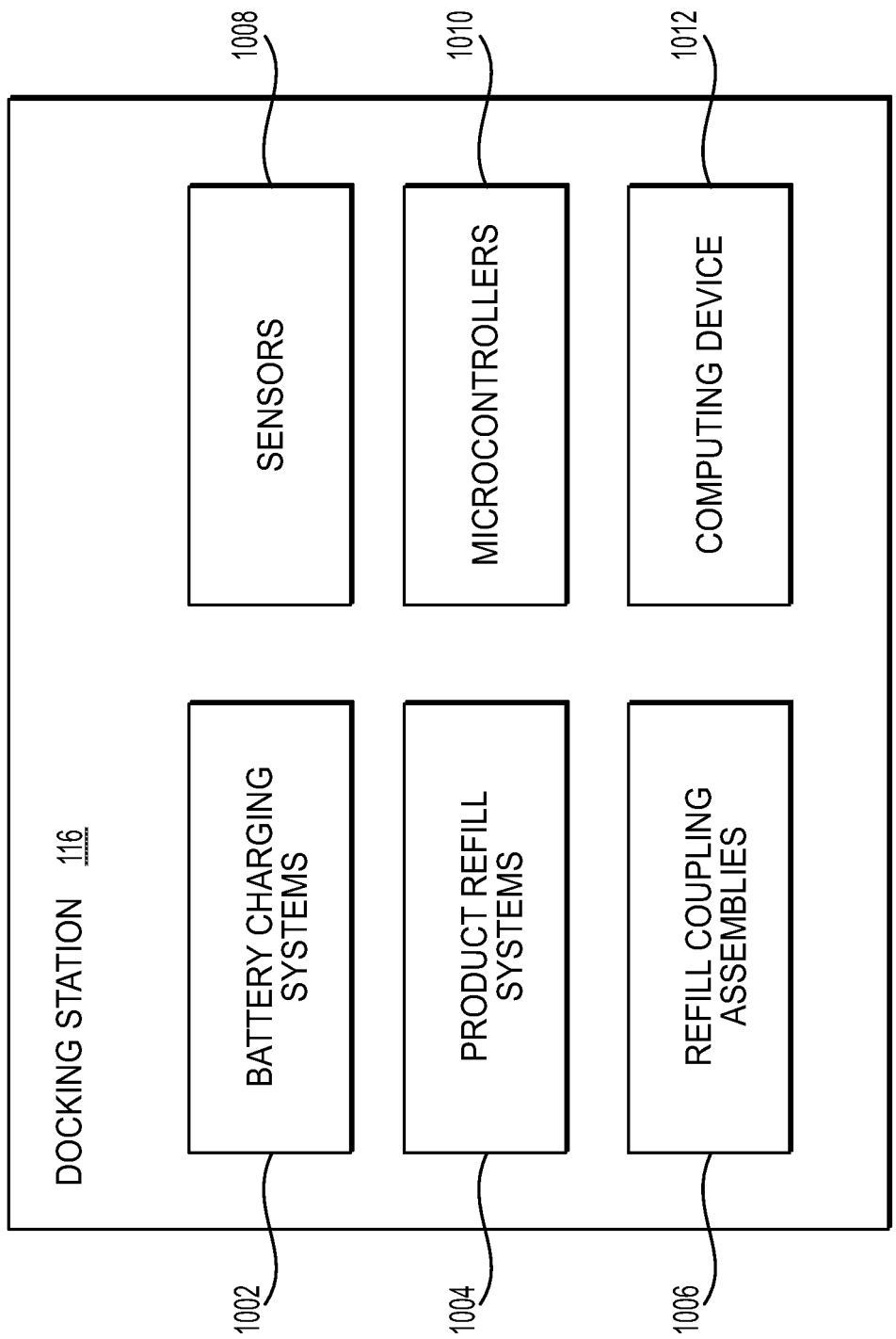
FIG. 10 depicts a block diagram of components of an exemplary docking station, according to certain embodiments.

FIG. 10 depicts a block diagram of the components of the docking station 116. The docking station 116 may include one or more battery charging systems 1002, one or more product refill systems 1004, one or more refill coupling assemblies 1006, one or more sensors 1008, one or more microcontrollers 1010, and a computing device 1012.

In some examples, the battery charging systems 1002 may include a battery swapping system. The battery swapping system may be configured to automatically remove a depleted first battery of the drive unit 110 docked to the docking station 116 and replace the depleted first battery with a fully charged second battery. For example, the depleted first battery may roll or be lifted from the drive unit 110 onto a turntable or other similar structure that also holds the fully charged second battery. Guides may ensure alignment of the depleted first battery with respect to the docking station 116. The turntable may rotate the depleted first battery to a charging position. Correspondingly, the fully charged second battery may be rotated to a deployment position to be rolled or lowered onto the drive unit 110. The guides ensure alignment of the fully charged second battery with respect to a frame or mount for the battery on the toolbar 301. The fully charged second battery may connect to the electronics on the drive unit 110 via a coupler device. Once the battery swap is completed, the drive unit 110 may undock and return to navigating according to a field path plan, for example.

Additionally or alternatively, the battery charging systems 1002 may include a battery charging station. The battery charging station may be separate from or integrated with the battery swapping system. The battery charging station may include a charger that couples to the battery of the drive unit 110 (e.g., without removing the battery from the drive unit 110) to recharge the battery of the drive unit 110 as the drive unit 110 is docked to the docking station 116.

The product refill systems 1004 may include a seed refill system, a liquid product refill system, and/or a dry product refill system configured to refill seed, liquid, or dry products, respectively, of the drive unit 110 and/or the implement 114 attached to the drive unit 110. For example, the seed refill system may be configured to enable autonomous refilling of seed for a planter implement. The liquid product refill system may be configured to enable: autonomous refueling of the generator or engine of the drive unit 110; autonomous refilling of pesticide active ingredient (i.e., herbicide, insecticide, fungicide, etc.) and carrier (i.e., water) for a fluid applicator implement, such as a post-emerge sprayer; and/or autonomous refilling of liquid fertilizer for a fluid applicator implement, such as a liquid fertilizer applicator. The dry product refill system may be configured to enable autonomous refilling of dry fertilizer for a dry fertilizer applicator implement.

The refill coupling assemblies 1006 may be configured to connect components of the product refill systems 1004 to components of the drive unit 110 and/or implement 114 to facilitate the refilling of seed, liquid products, or dry products. For example, the refill coupling assemblies 1006 may include a seed refill coupling assembly, a liquid product refill coupling assembly, and/or a dry product refill coupling assembly.

The sensors 1008 of the docking station 116 may monitor various data associated with the docking station 116 and the components thereof. For example, one or more of the sensors 1008 may monitor a docking status and position of the drive unit 110 relative to the docking station 116. As another example, one or more of the sensors 1008 may be integrated with the liquid product refill system to monitor a pressure and a temperature associated with the system and/or particular components of the system, such as a chemical mixture subsystem described with reference to FIG. 11. As a further example, one or more of the sensors 1008 may be configured to monitor a weight and/or level of seed, liquid product, or dry product that is available in the respective seed refill system, liquid product refill system, or dry product refill system to be distributed as part of the autonomous refilling process.

The microcontrollers 1010 may control various components of the product refill systems 1004. For example, the microcontrollers 1010 may include a motor speed controller configured to control operations of a motor-driven auger of the seed refill system for refilling seed. The microcontrollers 1010 may also include a motor speed controller to control a liquid flow rate within the liquid product refill system. Additionally, a portion of the microcontrollers 1010 may control the opening and closing of various valves of the product refill systems 1004 and/or refill coupling assemblies 1006, described with reference to FIG. 11. The microcontrollers 1010 may be communicatively coupled to the computing device 1012 to exchange data with the computing device 1012.

The computing device 1012 may be configured to receive, process, and transmit data to and from other systems and devices of the docking station 116, as well as devices external to the docking station 116. For example, the computing device 1012 may be configured to receive data from internal components, such as the microcontrollers 1010 and the sensors 1008, as well as external components, such as the drive unit 110 and/or the implement 114 attached to the drive unit 110 via one or more communication interfaces of the computing device 1012.

The memory of the computing device 1012 may store one or more programs or applications (e.g., software) that are accessible and executable by one or more processors of the computing device 1012 to process the data. Data processing may include generating commands for transmission to one or more of the microcontrollers 1010 and/or external devices to execute the commands. Additionally, the computing device 1012 may be configured to exchange data with the one or more remote systems 106 over the network 104 via at least one of the communication interfaces.

One exemplary program may include software for generating location and orientation information for the docking station 116 that may be communicated to the drive unit 110 and/or used to facilitate other operations such as autonomous docking. Another exemplary program may include software for the autonomous docking of drive unit(s) 110 to the docking station 116, where inching capability may be provided. A further exemplary program may include software for positioning the refill coupling assemblies 1006 for refilling, along with controlling and monitoring the product refill systems 1004 during the refill process. Additionally, the computing device 1012 may store and execute a program that provides the docking station 116 with return to home capability. For example, the return to home capability may instruct the drive unit 110 to return to the docking station 116. In some examples, the drive unit 110 may be instructed to stop a current field operation and return immediately to the docking station 116. In other examples, the drive unit 110 may be instructed to return to the docking station 116 upon completion of a current field operation or one or more additional field operations the drive unit 110 is or will be performing.

Figure 11:
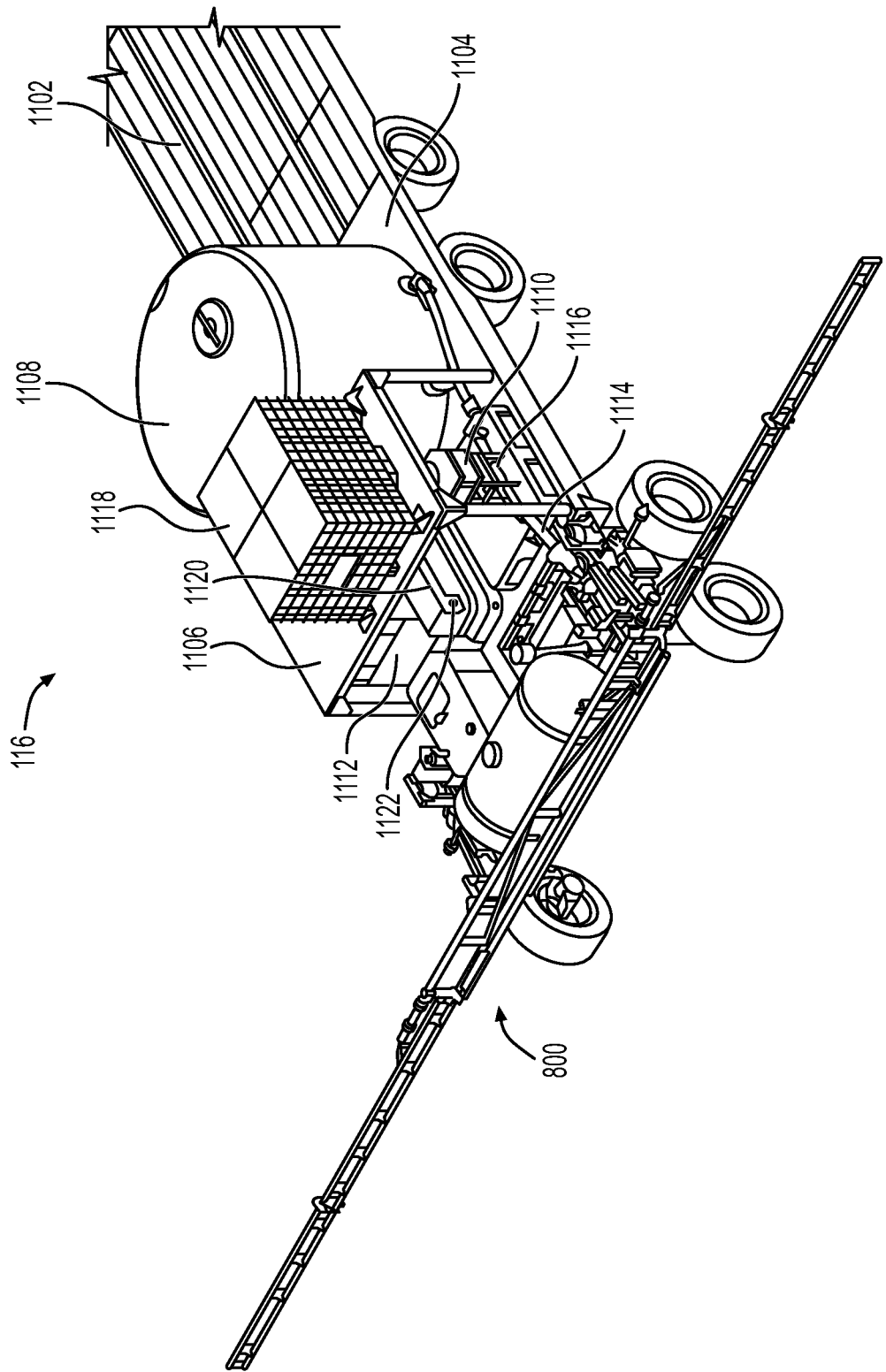
FIG. 11 depicts an isometric view of the autonomous fluid applicator of FIG. 8 docked to an exemplary docking station, according to certain embodiments.

FIG. 11 depicts an isometric view of an exemplary docking station 116 having the autonomous fluid applicator 800 described with reference to FIG. 8 docked to the docking station 116. The docking station 116 may include a wheeled trailer 1102 to facilitate transport of the docking station 116. At least a portion of the trailer 1102 may form a base 1104 to structurally support one or more other components of the docking station 116. A frame 1106 may extend upward from the base to form, e.g., a shelf structure on which additional components of the docking station 116 may be positioned to maximize space.

The product refill systems 1004 may include liquid product refill systems and dry product refill systems. Similarly, the refill coupling assemblies 1006 may include liquid refill coupling assemblies and dry product coupling assemblies that respectively connect the liquid product refill systems and dry product refill systems to a receiving component on the drive unit 110 and/or the implement 114 attached to the drive unit 110.

Exemplary components of the liquid product refill systems may include a water tank 1108, a chemical mixing subsystem 1110, a chemical tank 1112, and one or more valve-controlled plumbing systems for connecting these components. For example, the chemical mixing subsystem 1110 may receive water from the water tank 1108 via a first plumbing system when a valve of the first plumbing system is open and chemical from the chemical tank 1112 via a second plumbing system when a valve of the second plumbing system is open. The chemical mixing subsystem 1110 may receive the water and the chemical simultaneously or sequentially to create a liquid mixture in which the water dilutes the chemical. A predefined amount of water and a predefined amount of chemical received by the chemical mixing subsystem 1110 may be based on a particular dilution ratio, which may be based on the type of chemical being applied. In some examples, a Venturi device 1116 may be used to mix the chemical and the water (e.g., active and inactive ingredients respectively), where a tip of the Venturi device 1116 may measure a particular amount of active ingredient per time independent of pressure. Each of the valve-controlled plumbing systems may also include a flowmeter to monitor a flow rate of the liquids from the respective tanks 1108, 1112 to the chemical mixing subsystem 1110. The flow rate may be used to determine an amount of water and chemical that has been provided to chemical mixing subsystem 1110. When the amount reaches the predefined amount for each of the water and the chemical, the valve(s) of the respective plumbing systems may be closed to prevent further water and chemical from being received at the chemical mixing subsystem 1110. Each of the water tank 1108 and the chemical tank 1112 may include a tank latch that can be opened and closed to refill the respective tanks when the liquids therein fall below a predefined level (e.g., detected by a sensor 1008).

As described in more detail with reference to FIG. 12, exemplary components of a liquid refill coupling assembly may include a fluid refill male coupler 1114 that is configured to receive the liquid mixture from the chemical mixing subsystem 1110. One or more valves may control the flow of the liquid mixture form the chemical mixing subsystem 1110 to the fluid refill male coupler 1114.

Exemplary components of the seed refill system may include a seedbox 1118 for storing seed, an auger 1120 for distributing the seed, and a chute (not shown) to deliver the seed from the seedbox 1118 to the auger 1120. The seedbox 1118 may include a latch (not shown) that may be opened and closed in order to refill the seedbox with seed when, e.g., the amount of seed remaining falls below a predefined level (e.g., detected by a weight sensor from sensors 1008 positioned in the seedbox 1118). The seedbox 1118 may also include a seedbox valve (not shown) connected to the chute that is opened to cause seed to be delivered to the auger 1120. The auger 1120 may include an auger valve 1122, and a motor (not shown) to rotate the auger. In some examples, a pivot bracket (not shown) may be attached to the auger 1120 to enable the auger 1120 to extend from the trailer 1102 during use and retract (e.g., fold in) for transport. One of the microcontrollers 1010 may be configured to control the seedbox valve to, e.g., open the seedbox valve to cause seed to be delivered to the auger 1120 upon receipt and execution of corresponding commands from the computing device 1012. A motor speed controller (another one of the microcontrollers 1010) may then receive and execute commands from the computing device 1012 to control the motor to rotate the auger 1120 to cause distribution of the seed into a container of a planter implement configured to hold the seed, such as a central seed storage system and/or individual seed boxes. The seed refill system may also include a position sensor (one of sensors 1008) to determine a position of the auger 1120 relative to the container of the planter implement to ensure that the seed is properly distributed into the desired container.

To facilitate the autonomous seed refilling, the planter implement of the may also include a position sensor to help with the alignment of the planter implement to the docking station 116. The central fill and/or individual seedboxes on the planter implement may include seedbox valves (e.g., controlled by microcontrollers of the planter implement), which may be opened to allow the seed to be distributed from the auger 1120, and one or more sensors (e.g., load cells) for detecting the amount of seed contained therein. The valves may be closed after a predetermined amount of seed is contained in the respective seedboxes. In some examples, data from these sensors indicating the seed is below a predefined threshold level may trigger the navigation of the autonomous planter to the docking station 116 to initiate the seed refilling.

The autonomous seed refills provided by the seed refill system may enable complete automation of planting operations and reduces a total seed refill time, which in turn reduces a duration that the autonomous planter is halted from performing the planting operations in order to undergo refilling.

FIG. 12 depicts an exploded view of a fluid refill coupling assembly 1200. The fluid refill coupling assembly may be one of the refill coupling assemblies 1006 of the docking station 116. The fluid refill coupling assembly 1200 may include the fluid refill male coupler 1114 that is attached to the docking station 116 and a fluid refill female coupler 1202 that is attached to a drive unit 110 and/or an implement 114 attached to the drive unit 110.

The fluid refill male coupler 1114 may include a female outlet 1204 and a plurality of female flanges 1206, 1208 to enable attachment of the fluid refill male coupler 1114 to e.g., tubing from the chemical mixing subsystem 1110. Additionally, a docking station bracket 1210 may connect the fluid refill male coupler 1114 to a structural component of the docking station 116. A first section 1212 of the fluid refill male coupler 1114 may include inner tubing 1214 surrounded by springs 1216. The springs 1216 may self-center the fluid refill male coupler 1114 in a default position. In other examples, spring back tubing may be utilized instead of the springs 1216. A tubing coupler 1218 may couple the inner tubing 1214 of the first section 1212 to a first end of a second section 1220 of the fluid refill male coupler 1114. The second section 1220 may include an outer tubing 1222 enclosed within bellows 1224 (e.g., a flexible enclosure having a volume that can be change by compression or expansion), where the inner tubing 1214 of the first section 1212 is received by the outer tubing 1222 of the second section 1220. The bellows 1224 may self-center the second section 1220. In some examples, the outer tubing 1222 may include springs (not shown) in addition to or alternatively from the bellows 1224. A second end of the second section 1220 may be attached to a female coupler 1226. The first section 1212 and the second section 1220 provide flex such that the female coupler 1226 may be seated fully in the male coupler 1240 (discussed below) even when a position and/or angle of the female coupler 1226 and the male coupler 1240 are misaligned. The female coupler 1226 may be configured to be received by the fluid refill female coupler 1202.

The fluid refill female coupler 1202 may include a reducer 1230 that is configured to receive the female coupler 1226 of the fluid refill male coupler 1114. A reducer bracket 1232 may connect the reducer 1230 to an actuator 1236 via an actuator bracket 1234. The actuator 1236 may include an actuator cap 1238. The actuator 1236 and the actuator cap 1238 may be configured to lock the female coupler 1226 when the female coupler 1226 is fully received in a male coupler 1240 during a refilling or refueling operation. The lock prevents water pressure from pulling apart the female coupler 1126 and the male coupler 1240 and causing leaks. In an exemplary configuration, one end of the actuator 1236 may be a threaded end, and the actuator cap 1238 may be attached to the actuator 1236 via the threaded end. The actuator cap 1238 may provide a seat on a portion of the female coupler 1226 that includes, for example, a depressed ring around a circumference of the female coupler 1226.

When the female coupler 1226 is fully received and seated in the male coupler 1240, the actuator 1236 may be actuated (e.g., may be advanced from a neutral position), which allows liquid product from the fluid refill male coupler 1114 to flow through the fluid refill female coupler 1202 and to a receiving component of the drive unit 110 and/or implement 114. For example, the male coupler 1240 connects a male inlet 1242 to the receiving component of the drive unit 110 and/or implement 114. In some examples, the male coupler 1240 may include a valve that is typically in an open position. However, a manual shut-off device 1244 may be connected to the male coupler 1240 that, when manually operated by a user, may cause the valve within the male coupler 1240 to close to stop the flow of liquid product to the male inlet 1242.

The male inlet 1242 may be connected to a receiving component of a fluid applicator implement, such as the tank 828 of the autonomous fluid applicator 800 described with reference to FIG. 8. In some examples, the tank 828 may include one or more sensors such as a flowmeter, a liquid level height sensor, and/or a load cell, to monitor the refilling of the liquid product as it is received into the tank 828. Once the refilling operation is complete, the actuator 1236 may retract back to the neutral position, which allows the female coupler 1226 to become unseated from the male coupler 1240 as the drive unit 110 navigates away from the docking station.

The autonomous liquid product refills for components of the drive unit 110 and/or implement 114 that are provided by the fluid refill coupling assembly 1200 in conjunction with the fluid refill system may enable complete automation of field operations, while reducing user exposure to chemicals and reducing a total liquid refill time, which in turn reduces a duration that the drive unit 110 and attached implement 114 are halted from performing pre-planting, planting, and/or post-emergent operations in order to undergo refilling.

Figure 13:
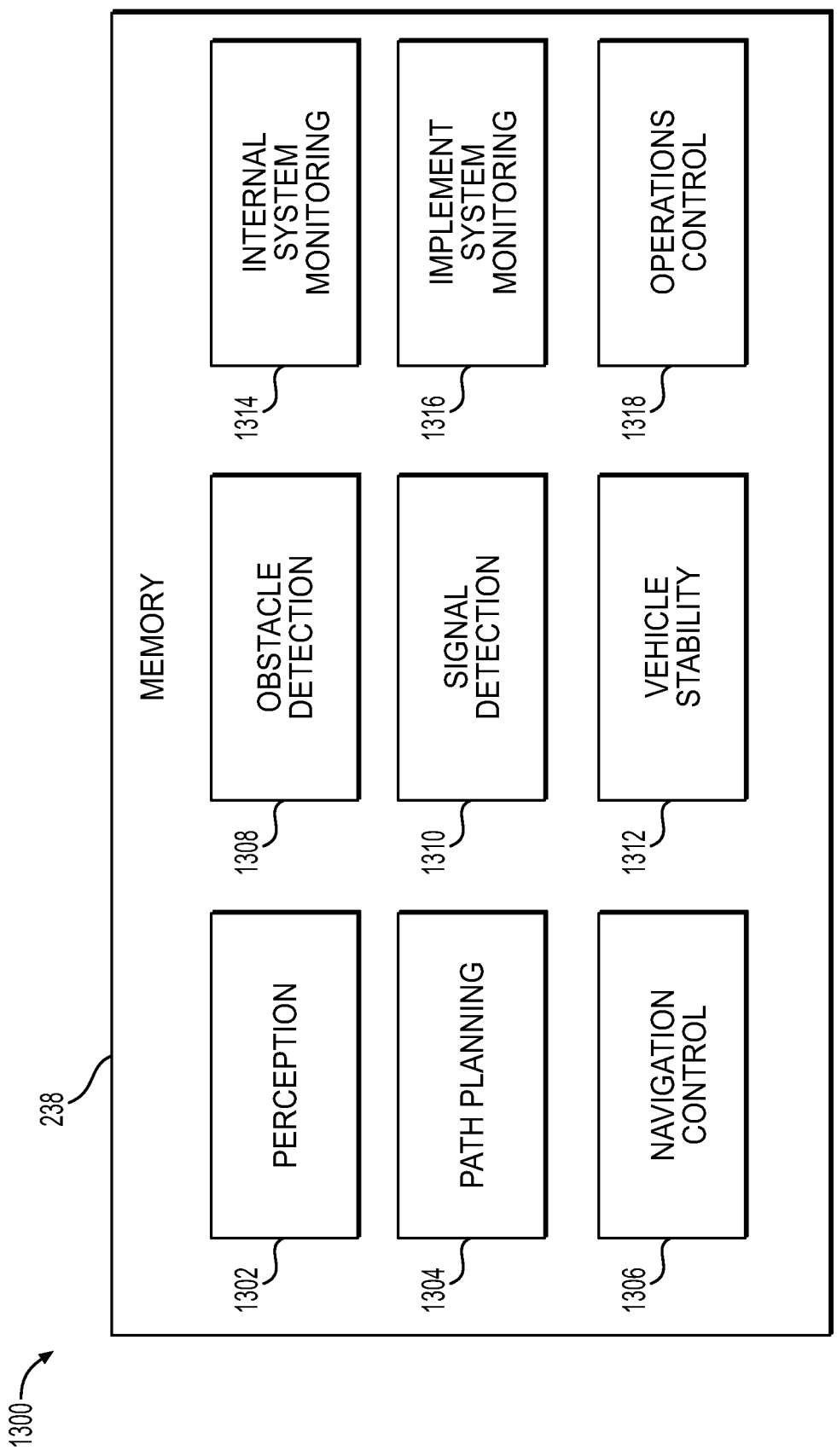
FIG. 13 depicts exemplary programs stored and executed by a computing device of a drive unit, according to certain embodiments.

FIG. 13 depicts a block diagram 1300 of exemplary programs 1302-1318 that may be stored in the memory 238 of the computing device 232 of the drive unit 110. Each program may include instructions that when executed by the processors 236 of the computing device 232 (shown in FIG. 2) may cause the drive unit 110 to perform corresponding actions.

A first set of programs may be associated with navigation functionalities of the drive unit, including a perception program 1302, a path planning program 1304, and a navigation control program 1306. The perception program 1302 may be configured to perform object detection and tracking using data collected by one or more sensors (e.g., of the sensor systems 224) of the drive unit 110. The data collected may include radio detection and ranging (RADAR) data, light detection and ranging (LIDAR) data, and/or camera data. In some examples, the data collected may be provided as input to a trained machine learning model executed by the perception program 1302. The machine learning model may be trained by the perception program 1302 or by a third party system that provides the trained machine learning model to the computing device 232 for execution. The machine learning model may be trained using supervised and/or unsupervised learning.

Additionally or alternatively, the perception program 1302 may be configured to implement a sensor fusion algorithm to generate a model or image of an environment around the drive unit 110 that, e.g., localizes the drive unit 110 in the field with sub-inch accuracy. For example, data collected from the sensors, such as camera data and LIDAR data, as well as GPS data and IMU data from the navigation system 230, may be provided as input to a machine learning model executed by the perception program 1302 that is trained to output the model or image of the environment. The machine learning model may be trained by the perception program 1302 or by a third party system that provides the trained machine learning model to the computing device 232 for execution. The machine learning model may be trained using supervised and/or unsupervised learning.

The path planning program 1304 may be configured to define a field path plan and generate a mission (e.g., a sequence of actions of the drive unit 110) associated with the field path plan. In some examples, both global and local path plans may be generated, where the local path plan may account for obstacles and/or other barriers that are encountered as the mission is running. Variables of the plan may be based on field data, including row width, a number of end rows, and a number of in-field rows. The path plan may define a type of turn and one or more parameters for the turn that is to be made by the drive unit 110 at the end of rows. Exemplary turn types may include keyhole turns, point turns, and pivot turns. Exemplary parameters for the turn may include a turn radius and a turn speed.

The path planning program 1304 may operate in a custom path mode or a default mode. In some examples, the mode selected for operation may be based on input received from a user (e.g., through the platform application 128 running on the user device 120 or the controller device 121). The custom path mode may be configured to establish custom AB lines as the path. The default path mode may be configured to generate a path for an entirety of the field using the specified parameters. In some examples, the path generated may be a forward moving-path only (e.g., the drive unit 110 is only moved in a forward direction as the drive unit 110 travels along the path). In other examples, the path generated may be forward and backward moving (e.g., the drive unit 110 may also be reversed to move backward as the drive unit 110 travels along the path).

The path planning program 1304 may capture waypoints of field boundaries, generate field boundaries based on the captured waypoints, and generate the path based on the generated field boundaries. The path may also include navigation for particular turn types and navigation to guide the drive unit 110 to the docking station 116, if needed. The path planning program 1304 may then generate a mission that includes a plurality of actions to be performed by the drive unit 110 to cause the drive unit 110 to navigate in accordance with the defined path. In some examples, the path may incorporate a diversion of the drive unit 110 to the docking station 116 and subsequent return based on a predicted need for recharging and/or product refills. In other examples, as described in more detail with reference to FIG. 14A-14B, the path planning program 1304 may implement a trained machine learning system to define the path and/or generate the mission. In some examples, the defined path may be provided as input to one or more other programs, such as the navigation control program 1306 and/or the internal system monitoring program 1314.

The navigation control program 1306 may be configured to monitor and/or cause adjustment of navigation of the drive unit 110 as it travels in accordance with the path. For example, the navigation control program 1306 may include one or more path tracking algorithms to monitor a navigation performance of the drive unit 110 relative to the path defined by the path planning program 1304. The path tracking algorithms may provide for variable speed path tracking and/or multi-stage path tracking. As one example of variable speed path tracking, a cruise speed may be implemented as the drive unit 110 travels along the path in the rows with deceleration at an end of each row prior to the drive unit 110 turning and acceleration at a beginning of each row subsequent to the turning to get the drive unit 110 up to the cruise speed. The navigation control program 1306 may also be configured to provide machine learning-based, vision-control navigation based on image data received from camera sensors (of sensor systems 224). Supervised machine learning, reinforcement learning, and/or imitation-based machine learning may be implemented to train a machine learning system configured to receive and process the image data provided as input in order to generate and/or adjust a previously generated plan for the drive unit 110 to follow.

A second set of programs may be associated with safety functionalities of the drive unit 110, including an obstacle detection program 1308, a signal detection program 1310, and a vehicle stability program 1312. The obstacle detection program 1308 may be configured to detect obstacles and, based on the obstacles detected, cause the drive unit 110 to perform one or more actions, such as lowering a speed or automatically powering down. In some examples, one or more cameras (e.g., of sensor systems 224) may be mounted on the drive unit 110 to capture video data of the environment. The cameras may be 360 degree cameras. The video data may be provided as input to a trained obstacle detection model that is configured to identify objects in the environment, such as persons, animals, equipment, etc., including a distance between the identified object and the drive unit 110. Based on the identification of an object within a predefined threshold distance of the drive unit 110, the computing device 232 may send commands to the motor speed controller 222 for each of the drive to slow down and/or stop the drive unit 110.

The object detection model may be trained using supervised learning. For example, labeled training images may be fed into the model. The model may output a predicted one or more objects within the training image and a distance of the object. The output may be compared with the corresponding label (e.g., the ground truth) for the training image that includes each of one or more objects in the image and a distance to each object to determine an error, which may then be back-propagated through the model to adjust the values of the variables.

The signal detection program 1310 may be configured to detect signal activity associated with the navigation system 230, and based on the signal activity detected, cause the drive unit 110 to lower a speed and/or automatically power down. For example, the signal detection program 1310 may monitor signals received by the navigation system 230 of the drive unit 110 and from the navigation system 506 of the base station 112 (e.g., as part of the base corrections data). Based on a determination that the ability to implement RTK GPS techniques has been disrupted due to the signal activity (or a lack thereof) for a predefined time period, the computing device 232 may send commands to the motor speed controller 222 for each of the drive assemblies to slow down and/or stop the drive unit 110.

The vehicle stability program 1312 may be configured to detect a probability that the drive unit 110 and/or the implement 114 attached to the drive unit 110 is unstable and at risk to tip or fall over. Pitch (e.g., front to back) and/or roll (side to side) risk may be determined for various configurations of drive units 110 and/or implements 114 attached to drive units 110 to define critical angles for each configuration. IMU data collected by the navigation system 230 of drive unit 110 may be used to determine a pitch angle and/or a roll angle of the drive unit 110 and attached implement 114. If the pitch angle is above the predefined critical angle for the given drive unit 110, the drive unit 110 may be automatically stopped and/or powered off. Additionally, a warning or error message may be sent to an operator via the application 128 executing on the user device 120 and/or the controller device 121. Alternatively, the drive unit 110 may be automatically rerouted to complete the operation from a different approach or direction, for example, that will not present the pitch or roll risk.

A third set of programs may be associated with monitoring functionalities of the drive unit 110, including an internal system monitoring program 1314 and an implement monitoring program 1316.

The internal system monitoring program 1314 may monitor various types of system performance for the drive unit 110. For example, the navigation performance may be monitored using navigation error data that is captured at, e.g., 10 Hertz (Hz) based on GPS coordinates obtained from the navigation system 230 and the coordinates of the navigation path (e.g., the path defined by the path planning program 1304). Additionally, a temperature and a current of the motor speed controllers 222 may be monitored, along with a state of charge of the battery (of battery system 208).

Also, signal activity associated with the navigation system 230 of the drive unit 110 and/or the navigation system 506 of the base station 112 may be monitored. Further, visual monitoring may be implemented utilizing cameras (of the sensor systems 224) that are mounted at various positions on the drive unit 110 to provide forward, backward, and/or 360 degree views.

The internal system monitoring program 1314 may also monitor system malfunctions using sensor data from the sensor systems 224. A machine learning model may be trained to identify the malfunctions using supervised learning. For example, labeled training images may be fed into the model. The model may output a predicted malfunction indicated by the training image. The output may be compared with the corresponding label (e.g., the ground truth) for the training image that includes a malfunction, if any, indicated by the training image to determine an error, which may then be back-propagated through the model to adjust the values of the variables.

The implement monitoring program 1316 may be configured to monitor the implement 114 attached to the drive unit 110. For example, the implement monitoring program 1316 may be configured to visually monitor a performance of the implement 114 and/or hazards approaching the implement 114 using, e.g., cameras or other sensors (from sensor systems 224) of the drive unit 110 that provide a backward view and/or a 360 degree view. Additionally, in some examples, the implement 114 may include its own sensors and computing device configured to collect and/or analyze data associated with the implement's performance. This data may be provided to, e.g., one of the third party services systems 134 over the network 104. The data may then be downloaded when the drive unit 110 and the attached implement 114 are off-line (e.g., are done operating). Alternatively, the data may be directly provided to the computing device 232 as the drive unit 110 and attached implement 114 are being operated.

A fourth set of programs may include operations control programs 1318 that are configured to control operations of the drive unit 110 and/or the implement 114. For example, one of the operations control programs 1318 may control the extension and/or retraction of the telescoping chassis beams 316 and/or telescoping drive legs, which in turn may raise and lower the drive unit and/or attached field implement 114, as discussed above in detail.

Additionally, another of the operations control programs 1318 may control the automatic loading and unloading of the drive unit 110 onto or off of the transport equipment 118. For example, first location data for the drive unit 110 to be loaded onto the transport equipment 118 (i.e., a transport trailer) may be received along with second location data and heading data of the transport equipment 118. A loading path may be derived from a current location of the drive unit 110 to the heading of the transport equipment 118 using the first location data, the second location data, and the heading data. Instructions may then be generated to cause the drive unit 110 to move according to the derived loading path to autonomously load the drive unit 110 onto the transport equipment 118. Optionally, image data from the drive unit 110 may be received as the drive unit is moving according to the derived loading path. The image data may be processed and the derived loading path may be updated based on the processed image data to cause the drive unit 110 to move according to the updated loading path.

In some examples, when a plurality of drive units are to be sequentially loaded onto the transport equipment 118, a schedule for loading each of the plurality of drive units (e.g., a sequence) may be determined and the drive unit 110 may be moved to the transport equipment 118 via the loading path relative to other drive units in accordance with the sequence. Location and heading data, as well as optional image data for accurate unloading may be similarly used for automatically unloading the drive unit 110.

In some examples, the operations control programs 1318 may also be enabled to control select operations of the implement 114 attached to the drive unit 110.

The programs described above with reference to FIG. 13 are a non-limiting, non-exhaustive list of exemplary programs that may be stored and executed by the computing device 232 of the drive unit 110. The programs may be separate or integrated with one or more other programs. Additionally or alternatively, one or more of the above programs or portions thereof may be operated by a computing devices of the platform services system 130 that then provides output of the programs to the computing device 232 of the drive unit 110 for execution.

Figure 14A:
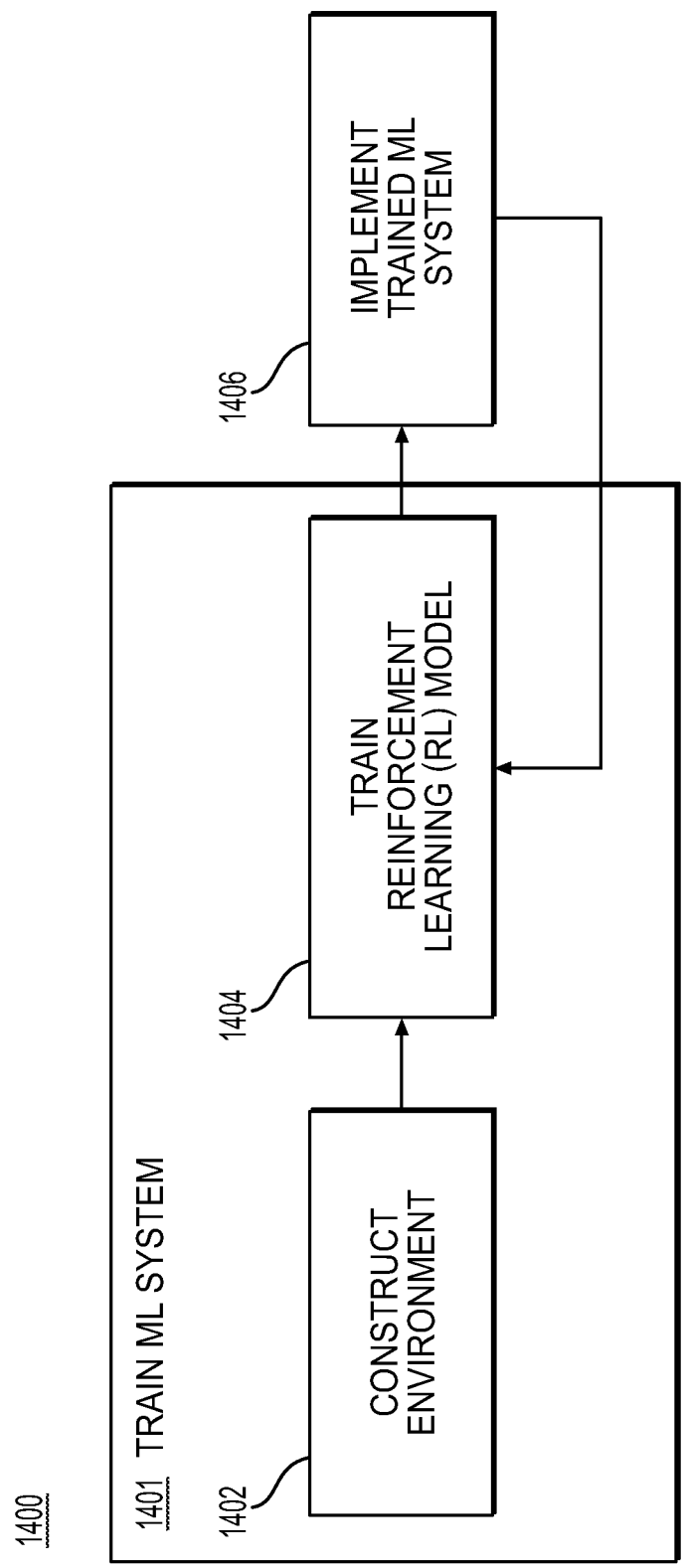
FIGS. 14A and 14B depict block diagrams of an exemplary process for training and using a machine learning model for autonomous navigation of a drive unit, according to certain embodiments.
Figure 14B:
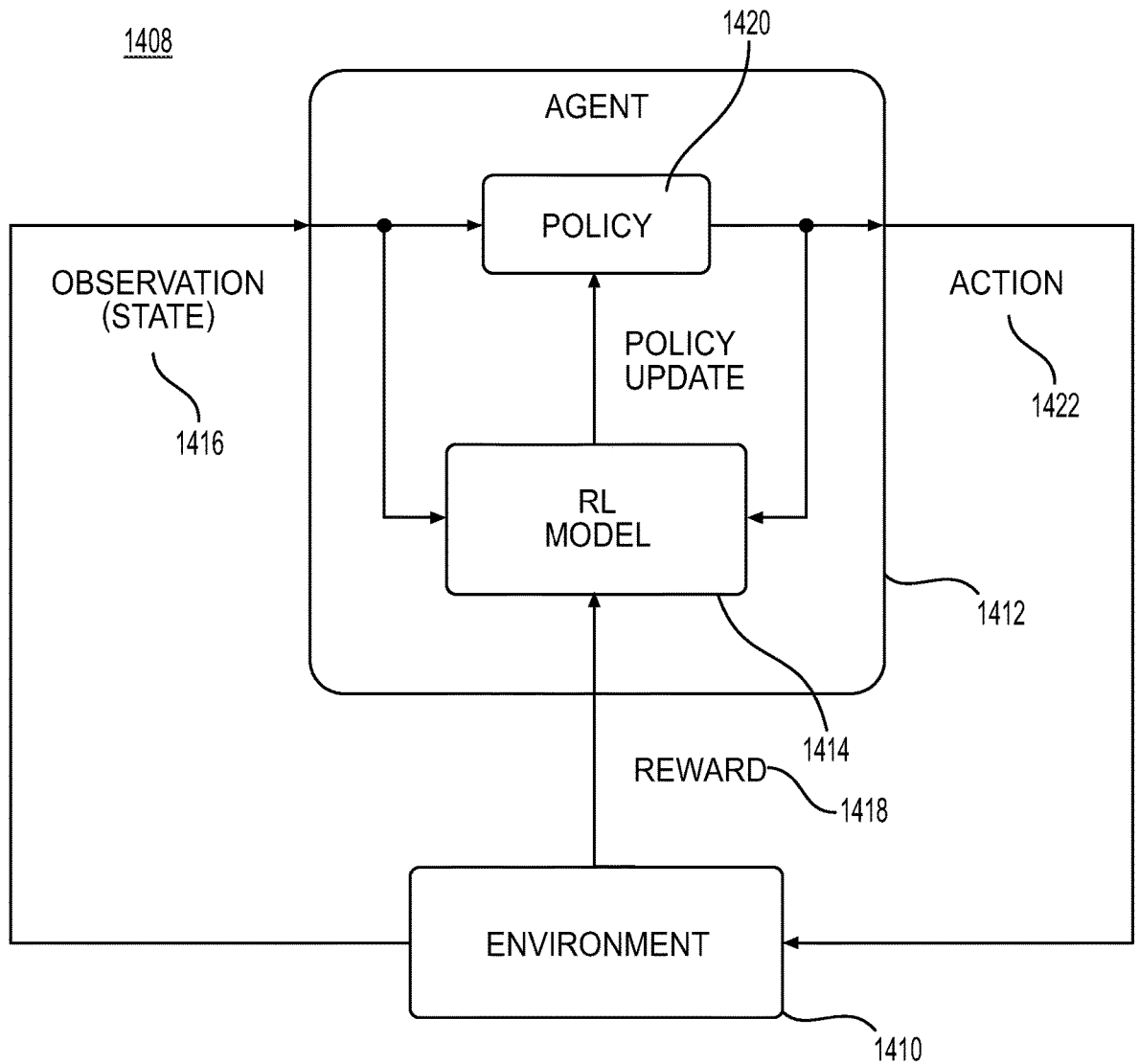

FIG. 14A is a block diagram 1400 depicting processes for training and implementation of a machine learning system for autonomous navigation of the drive unit 110. The machine learning system may be implemented by one of the navigational programs stored and executed by the computing devices, such as the path planning program 1304. In some examples, the training may be performed by the computing device 232 of the drive unit 110. In other examples, the training may be performed by a different system (e.g., one of third party services systems 134) and provided to the computing device 232 for execution. The machine learning system may be trained using reinforcement learning. FIG. 14B is a diagram depicting an exemplary reinforcement learning scenario 1408.

Referring concurrently to FIGS. 14A and 14B, at process 1401, the machine learning systems may be trained. The process 1401 may include a plurality of sub-processes associated with training. For example, initially at process 1402, a reinforcement learning environment 1410 may be constructed. In one example, the environment 1410 may be a simulation of a field built using a 3D photorealistic simulator, for example. The field simulation may include field boundaries, drainage intakes, terraces, grass waterways, undriveable areas, crop row layouts, and/or other fixed artificial or natural features of the site.

As part of the construction, one or more agents 1412 may be defined. A first example agent 1412 may include an algorithm, such as a reinforcement learning (RL) model 1414, for autonomous operation of the drive unit 110 having one of the implements 114 attached. For the first agent, operational capacities, a maximum speed of operation, a crop input payload capacity, and energy requirement, and/or a battery size may be defined. The operational capacities and crop input payload capacity may be based on the type of implement 114 attached to the drive unit 110. For example, for a planter implement, the operational capacities defined may include a number of rows and a width of each row, and the crop input payload capacity may be a number of units of seed. As another example, for a fluid applicator implement, such as a post-emerge sprayer implement or a nitrogen side dress implement, the operational capacities defined may include a boom width and application rates, and the cop input payload capacity may be a liquid capacity. A second example agent (e.g., that interacts with the first agent) may be the docking station 116. For the second agent, refill rates for seed, refill rates for dry product, refill rates for liquid product, battery swapping specifications, and/or battery charging specifications may be defined.

Additionally, one or more observation states 1416, an action space comprising one or more actions 1422, and one or more rewards 1418 may be defined as part of the construction. An exemplary observation state 1416 may be a field operation completion state. The action space may include actions 1422 associated with turning parameters for the drive unit 110 and/or speed parameters for the drive unit 110. The rewards 1418 may include rewards associated with energy cost, crop input depletion cost (e.g., cost of running out of seed, fertilizer, pesticide, etc.), battery life depletion cost (e.g., cost of running out of battery), collision with other objects, crop input completion (e.g., the implement 114 achieving its intended task), and/or a time cost.

Once the environment 1410 has been built, and the agents 1412, observation states 1416, actions 1422, and rewards 1418 have been defined, the environment may then be tested.

At process 1404, RL model 1414 may then be trained. For example, a model type and parameters for the RL model 1414 may be selected. Exemplary model types may include Proximal Policy Optimization (PPO), Deep Deterministic Policy Gradient (DDPG), or Advantage Actor Critic (A2C), among other similar algorithms. In some examples, multiple different model types may be trained and evaluated through testing to determine an optimal model type. Similarly, different model parameters and reward functions may be evaluated. The model may be trained to e.g., learn one or more policies 1420 to be applied by the RL model 1414 to determine a next action 1422 to perform in the environment 1410 based on a current observation state 1416 of the environment 1410. Rewards 1418 resulting from the performance of the next action may be provided as feedback to the RL model 1414 as part of the training process to facilitate the learning of the policies 1420. The trained RL model 1414 may be tested and/or validated. The trained RL model 1414 may then be stored in the memory 238 of the computing device 232 for subsequent execution in the actual environment (e.g., as opposed to the simulation of the environment 1410 constructed at process 1402).

At step 1406, the trained machine learning system may be implemented when, e.g., the drive unit 110 is operating in autonomous navigation mode. In some examples, the drive unit 110 may operate in autonomous navigation mode based on a user selection through the platform application 128 executing on the user device 120 and/or the controller device 121 to start autonomous navigation. When implemented, the trained machine learning system may iteratively determine a next action 1422 to perform based on a current observation state from the actual environment (e.g., a current field operation completion state of the field on which the drive unit 110 is operating) based on one of the learned policies 1420 applied by the RL model 1414. Factors contributing to the current observation state may be derived directly or indirectly from data collected by various sensors of the sensor systems 224 of the drive unit 110 and/or sensors of the implement 114, as well as any third party sensors. As one example, GPS coordinates obtained from the sensors in the navigation system 130 may be used to indicate a position of the drive unit 110 in the field. As another example, a level of seed, dry, or liquid product remaining in a given container or vessel of an attached implement 114 detected by the sensors of the implement 114 may be used to determine the completion state of the operation, among other factors. The iterative next actions 1422 may form an action plan (e.g., a mission) that is communicated to appropriate components of the drive unit 110 to cause the drive unit 110 to navigate in accordance with the commands. For example, actions associated with speed and/or turning parameters may be communicated to the motor speed controllers 222. Any rewards 1418 resulting from the performance of the actions 1422 may be provided as feedback to re-train the RL model 1414.

Figure 15A:
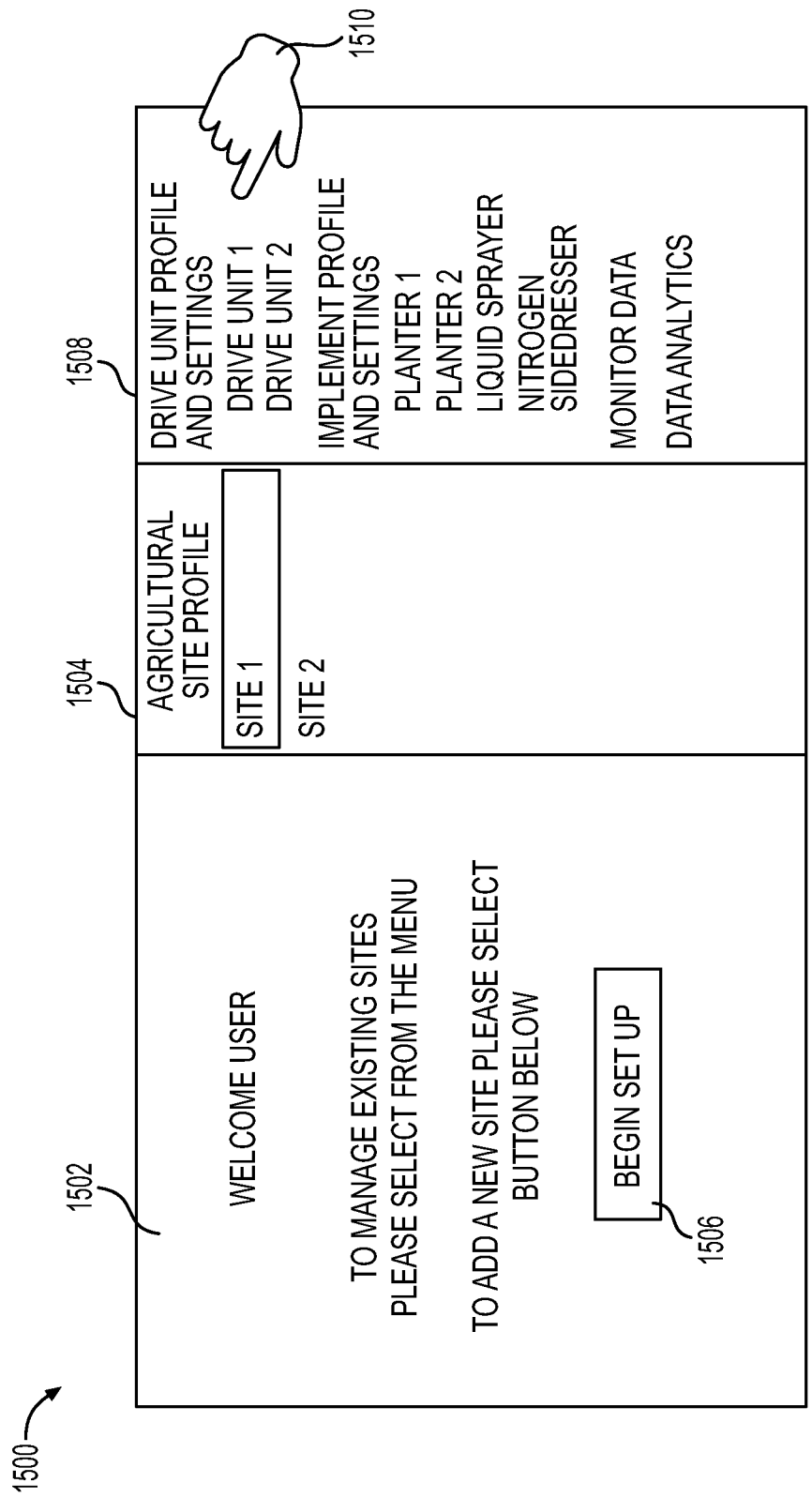
FIGS. 15A and 15B depict exemplary graphical user interfaces, according to certain embodiments.
Figure 15B:
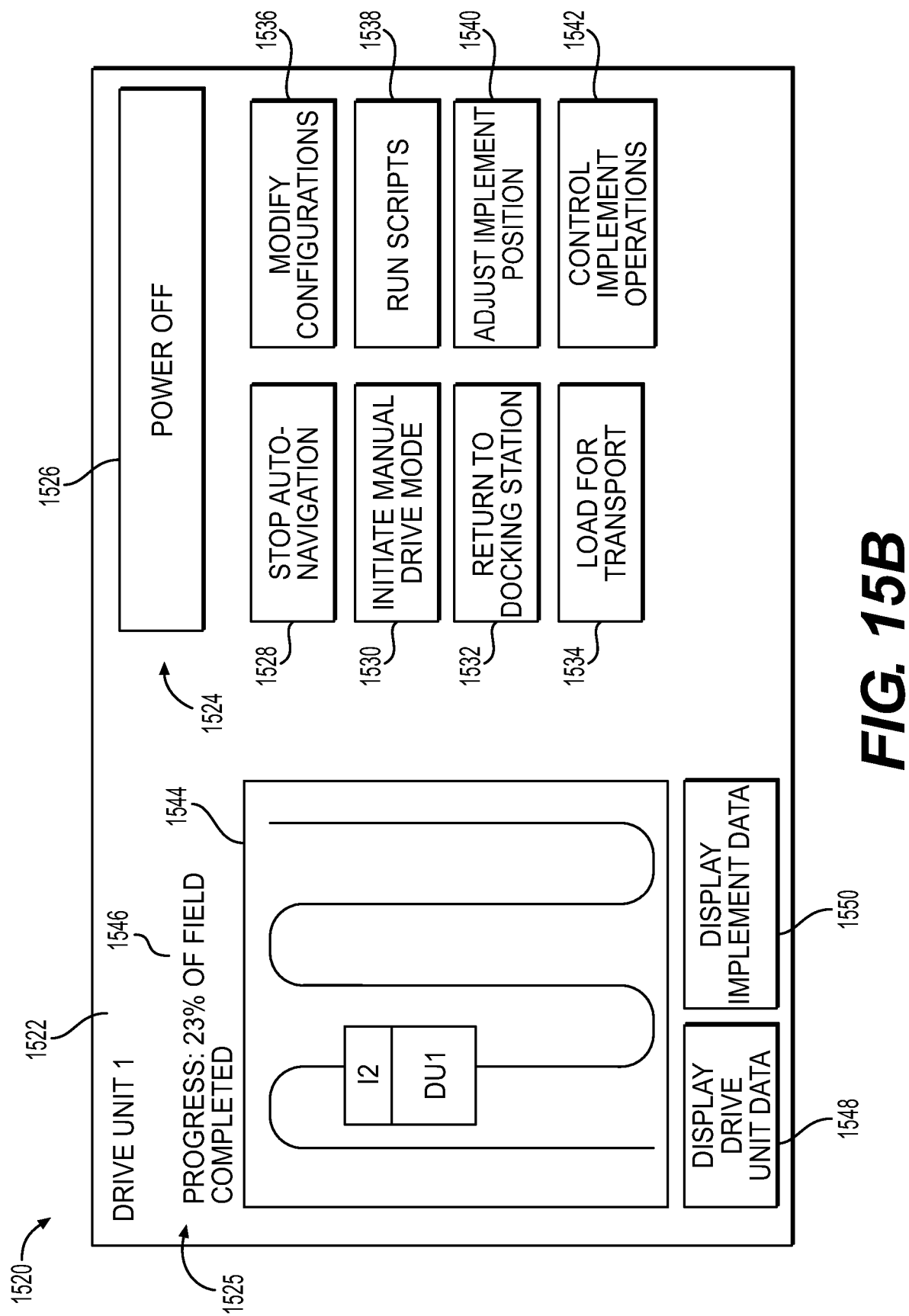

FIGS. 15A and 15B depict exemplary user interfaces 1500, 1520 of the platform application 128. The user may launch the platform application 128 on the user device 120 (e.g., either through a local application or a web application), and a first user interface 1500 representing a homepage 1502 of the platform application 128 may be displayed, as shown in FIG. 15A. The homepage 1502 may prompt the user to select from a first menu 1504 to manage existing sites (e.g., agricultural sites that already have profiles set up) and/or to select a "begin set up" control element 1506 to add a new site (e.g., to set up a profile for a new agricultural site). The agricultural site profiles may include an identification of the site, a definition and attributes of one or more fields of the site, and an identification of any obstacles within the one or more fields of the site.

When a user selects a site from the first menu 1504, such as site 1, other features associated with the profile of the selected site may be displayed and selected in a second menu 1508. For example, a profile and/or settings of each of one or more drive unit(s) 110 that are operated at the selected site (e.g., drive unit 1 and drive unit 2) may be selected from the second menu 1508 for viewing, editing, etc. The profile and/or settings may include an identification of the drive unit 110, one or more attributes of the drive unit 110, as well as an identification of the operations to be performed by the drive unit 110 and the attributes of the operations. Similarly, a profile and/or setting of each implement 114 operating in conjunction with one of the drive unit(s) 110 at the selected site (e.g., planter 1, planter 2, liquid sprayer, and nitrogen sidedresser) may be selected from the second menu 1508 for viewing, editing, etc. The profile and/or settings may include an identification of the implement 114, one or more attributes of the implement 114, as well as an identification of the operations to be performed by the implement 114 and the attributes of the operations.

The second menu 1508 may also include options for the user to monitor data and/or view data analytics. For example, the user may be enabled to monitor operations data associated with each of the drive unit(s) 110 and/or operations data associated with each of the implements 114. The operations data may be uploaded from the computing device 232 of the drive unit 110 (and in some instances from a computing device of the implement 114) to the platform services system 130 over the network 104, time stamped, and stored in data storage system 132. The platform services system 130 may then provide the operations data (e.g., upon user selection to monitor data from the second menu 1508) to the platform application 128 for display.

Additionally, the user may be enabled to view and/or interact with data analytics. The platform services system 130 may be configured to process and analyze the monitoring data received from the drive unit(s) 110 and/or implements 114 to determine a navigation performance of the drive unit 110, an operational performance of the implement 114, and/or an impact of the drive unit 110 with implement attached 114 on soil compaction, among other examples. The platform services system 130 may store the performance and/or impact data generated in the data storage system 132, and then provide the performance and/or impact data (e.g., upon user selection to view the data analytics from the second menu 1508) to the platform application 128 for display.

In some examples, the user may also be able to control each of the drive unit(s) 110 via the platform application 128. For example, upon user selection 1510 of a drive unit 110 from the second menu 1508 (e.g., drive unit 1), a second user interface 1520 of the platform application 128 may be displayed, as shown in FIG. 15B. The second user interface 1520 may be a control page 1522 for the drive unit 110. The control page 1522 may provide control functions 1524 and real-time monitoring features 1525.

The control functions 1524 may include a "power off" control element that when selected 1526 causes the battery of the drive unit 110 to discontinue power supply to the motor speed controllers 222 and thus halts the drive unit 110. If the drive unit 110 is autonomously navigating (e.g., using the trained machine learning system described with reference to FIGS. 14A-B), the control functions 1524 may include a "stop auto-navigation" control element 1528. Alternatively, if the drive unit 110 is not autonomously navigating, the control functions 1524 may instead include a "start auto-navigation" control element (not shown).

For particular operations, the user may desire to manually control the driving of the drive unit 110. Therefore, the control functions 1524 may also include an "initiate manual drive mode" control element 1530 that, when selected, switches the drive unit 110 to a manual drive mode controlled by the user via the platform application 128 and/or the controller device 121. A "return to docking station" control element 1532 may cause the drive unit 110 to divert from its current path for navigation and alternatively navigate to the docking station for a battery swap (or charge) and/or a product refill for the drive unit 110 or the implement 114 attached to the drive unit 110. A "load for transport" control element 1534 may be selected to cause the drive unit 110 to be automatically loaded onto the transport equipment 118. Alternatively, if the drive unit 110 is currently loaded on the transport equipment 118, the control functions 1524 may instead include an "unload from transport" control element (not shown).

The control functions 1524 may further include a "modify configurations" control element 1536 that may selected to adjust a profile and/or setting of the drive unit 110, including a speed of the drive unit 110, as well as a "run scripts" control element 1538 that may include the running of pre-mission scripts and mission scripts. Pre-mission scripts may include any instructions for enabling autonomous navigation to be performed, such as localization, global path planning, and/or camera-based safety systems. Mission scripts may include the local path planning and path tracking utilized to facilitate the autonomous navigation when in operation. Additionally, a subset of the control functions 1524 may be associated with the implement 114 attached to the drive unit 110. For example, an "adjust implement position" control element 1540 may be selected to raise and/or lower the implement 114 relative to the drive unit 110. A "control implement operations" element 1542 may be selected to set a speed, turn type, and/or application rates, as well as to control a coupling of the implement 114 to the drive unit 110.

The real-time monitoring features 1525 may include a map 1544 of the site that shows a position of the drive unit 110 with the attached implement 114 (e.g., a pose) overlaid on a representation of the path for the drive unit 110 (e.g., generated by the path planning program 1304) for navigating the site, and/or a progress indicator 1546 defining a percentage of completion. Additionally, a "display drive unit data" control element 1548 may be selected to display monitored data of the drive unit 110, such as a battery charge status, a status of the receiver 504, a temperature and/or current for each motor speed controller 222, and/or a speed of the drive unit 110. Further, a "display implement data" control element 1550 may be selected to display monitored data of the implement 114.

The user interfaces 1500, 1520 described above are provided merely as an example, and may include additional, fewer, different, or differently arranged information and/or interactive control elements than depicted in FIGS. 15A-15B.

In general, any process or operation discussed in this disclosure that is understood to be computer-implementable may be performed by one or more processors of a computer system, such any of the systems or devices in the platform 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Figure 16:
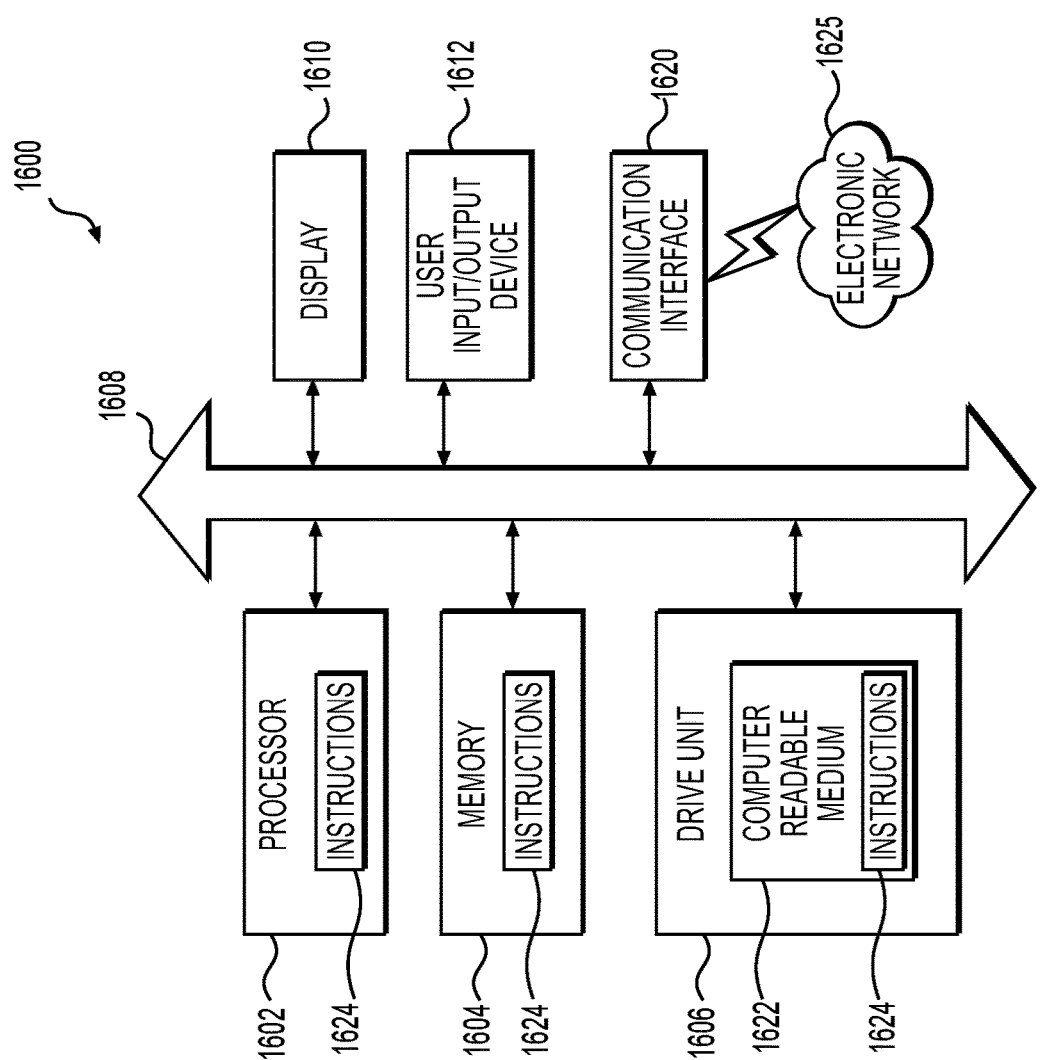
FIG. 16 depicts an example of a computer, according to certain embodiments.

FIG. 16 depicts an example of a computer 1600, according to certain embodiments. FIG. 16 is a simplified functional block diagram of a computer 1600 that may be configured as a device for executing processes or operations depicted in, or described with respect to, FIGS. 2-15B, according to exemplary embodiments of the present disclosure. For example, the computer 1600 may be configured as one of the user device 120, the controller device 121, the computing device 232 of the drive unit 110, the computing device 1012 of the docking station 116, one of the remote systems 106, and/or another device according to exemplary embodiments of this disclosure. In various embodiments, any of the systems herein may be a computer 1600 including, e.g., a data communication interface 1620 for packet data communication. The computer 1600 may communicate with one or more other computers 1600 using the electronic network 1625. The electronic network 1625 may include a wired or wireless network similar to the network 104 depicted in FIG. 1.

The computer 1600 also may include a central processing unit ("CPU"), in the form of one or more processors 1602, for executing program instructions 1624. The program instructions 1624 may include instructions for running the platform application 128 (e.g., if the computer 1600 is the user device 120 or the controller device 121). The program instructions 1624 may include instructions for running one or more of the programs 1302-1318 (e.g., if the computer 1600 is the computing device 232 of the drive unit 110). The program instructions 1624 may include instructions for running one or more docking station operations (e.g., if the computer 1600 is the computing device 1012 of the docking station 116). The program instructions 1624 may include instructions for running one or more operations of the remote systems 106 (e.g., if the computer 1600 is a server device or other similar computing device of one or more of the respective remote systems 106). The computer 1600 may include an internal communication bus 1608, and a drive unit 1606 (such as read-only memory (ROM), hard disk drive (HDD), solid-state disk drive (SDD), etc.) that may store data on a computer readable medium 1622, although the computer 1600 may receive programming and data via network communications. The computer 1600 may also have a memory 1604 (such as random access memory (RAM)) storing instructions 1624 for executing techniques presented herein, although the instructions 1624 may be stored temporarily or permanently within other modules of computer 1600 (e.g., processor 1602 and/or computer readable medium 1622). The computer 1600 also may include user input and output ports 1612 and/or a display 1610 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

The following are example non-limiting and non-exhaustive specifications of exemplary drive unit(s) 110 with attached implements 114:

EXAMPLE 1

A drive unit with a planter implement includes four 30-inch row units, two XT UR tracks, two 5-kilowatt (kW) DC brushless electric motors, two AD140 planetary 20:1 gearboxes, a 5-kW-hour (kWh) battery, planter implement software, seed meters and seed drives, a seed tube, gauge wheel load pin sensors, seed firmer sensors, a custom vacuum system, a fully autonomous navigation system, a multi-sensor high precision localization system, and real-time obstacle detection. This drive unit showed greatly reduced soil compaction compared to the heavy tractors and planting equipment typically used.

EXAMPLE 2

A drive unit with a planter implement includes four 30-inch row units (or alternatively seven 15-inch row units), four custom designed tracks, four 5-kW DC brushless electric motors, four AD140 planetary 10:1 gearboxes, two 6-kWh batteries, planter implement software, seed meters and seed drives, a seed tube, gauge wheel load pin sensors, seed firmer sensors, a custom vacuum system, a custom row unit lift, a custom central seed system, a fully autonomous navigation system, a multi-sensor high precision localization system, and real-time obstacle detection. This drive unit leads to greatly reduced soil compaction compared to the heavy tractors and planting equipment typically used. The use of four tracks allows for high-clearance spraying while providing good stability.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning models for autonomous navigation, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A device for autonomous agricultural operations, the device comprising:
    a toolbar to which a plurality of implements are interchangeably coupled;
    a pair of parallel chassis beams mounted perpendicularly on an underside of the toolbar, wherein at least a portion of each of the chassis beams are telescopic and configured to be extended outward from, and retracted inward towards, the toolbar;
    a plurality of drive assemblies each mounted on one of the chassis beams;
    a plurality of motors corresponding to the plurality of drive assemblies and configured to drive the corresponding drive assemblies in accordance with one or more drive parameters to move the device throughout a site; and
    a computing device comprising at least one memory storing instructions, and at least one processor operatively connected to the at least one memory and configured to execute the instructions to perform operations, including automatically determining the one or more drive parameters, and causing the plurality of motors to drive the corresponding drive assemblies in accordance with the one or more drive parameters.

2. The device of claim 1, wherein one or more of the plurality of drive assemblies include a track assembly.

3. The device of claim 2, wherein the track assembly includes:
    a bottom track frame;
    a top track frame;
    a sprocket;
    one or more rollers;
    one or more idlers; and
    a track, and wherein each of the plurality of motors are part of a motor assembly connected to each of the plurality of drive assemblies, the motor assembly including:
    the respective motor;
    a gearbox;
    a first adapter for connecting the gearbox to the respective motor;
    a second adapter for connecting the gearbox to the sprocket of the respective drive assembly; and
    a bracket positioned between the respective motor and the first adapter for connecting the motor assembly and the respective drive assembly to the one of the chassis beams.

4. The device of claim 1, wherein one or more of the plurality of drive assemblies each include a rim and a tire surrounding the rim.

5. The device of claim 4, wherein each of the plurality of motors are part of a motor assembly connected to each of the plurality of drive assemblies, the motor assembly including:

the respective motor;

a gearbox;

a first adapter for connecting the gearbox to the respective motor;

a second adapter for connecting the gearbox to the rim of the respective drive assembly; and a bracket for connecting the motor assembly and the respective drive assembly to an inner drive leg of a suspension system of the device.

6. The device of claim 5, wherein the device further comprises a plurality of drive leg pairs, and the motor assembly is further configured to connect the rim of the respective drive assembly to an inner telescoping drive leg of a respective drive leg pair that is configured to extend and retract relative to an outer telescoping drive leg of the respective drive leg pair to raise and lower the device.

7. The device of claim 1, wherein each of the chassis beams is comprised of:

a main chassis beam mounted to the toolbar and having a first end forward from the toolbar and a second end rearward from the toolbar, a front chassis beam connected to the first end of the main chassis beam, and a telescoping chassis beam connected to the second end of the main chassis beam.

8. The device of claim 7, further comprising:

a cylinder assembly attached to the main chassis beam and the telescoping chassis beam and configured to extend and retract the telescoping chassis beam relative to the main chassis beam.

9. The device of claim 7, wherein one of a drive assembly from the plurality of drive assemblies or a caster wheel is mounted to a distal portion of the telescoping chassis beam.

10. The device of claim 1, further comprising an implement coupler assembly mounted to the toolbar that is configured to interchangeably couple the plurality of implements to the toolbar, wherein at least a first implement and a second implement of the plurality of implements are different types of implements, and the implement coupler assembly is configured to couple each of the first implement and the second implement.

11. The device of claim 1, further comprising a vacuum system mounted to the toolbar and configured to provide suction when an implement from the plurality of implements coupled to the toolbar is a planter implement.

12. The device of claim 1, further comprising:

a rechargeable battery to supply power to the device; and a battery management system configured to monitor at least a charge level of the battery, wherein when the charge level is determined to be below a predefined threshold level, the device is caused to dock to a docking station configured to one of replace the battery or recharge the battery.

13. The device of claim 1, further comprising a navigation system and one or more sensors configured to enable the device to navigate along a predefined path determined for the device, wherein the determined one or more drive parameters facilitate the navigation of the device along the predefined path.

14. The device of claim 1, wherein the one or more drive parameters include at least one of speed parameters or turning parameters.

15. The device of claim 1, wherein the one or more drive parameters are received as output of a machine learning system trained to predict the one or more drive parameters.

16. An autonomous vehicle for performing agricultural operations:

an implement for performing agricultural operations at a site; and a drive unit comprising:

a toolbar to which the implement is coupled;

a pair of parallel chassis beams mounted perpendicularly on an underside of the toolbar, wherein at least a portion of each of the chassis beams are telescoping and configured to be extended outward from and retracted inward towards the toolbar to raise and lower the implement;

a plurality of drive assemblies each mounted on one of the chassis beams;

a plurality of motors corresponding to the plurality of drive assemblies and configured to drive the corresponding drive assemblies in accordance with one or more drive parameters to move the autonomous vehicle throughout the site along a predefined path; and a computing device comprising at least one memory storing instructions, and at least one processor operatively connected to the at least one memory and configured to execute the instructions to perform operations, including automatically determining the one or more drive parameters, and causing the plurality of motors to drive the corresponding drive assemblies in accordance with the one or more drive parameters.

17. The autonomous vehicle of claim 16, wherein the drive unit further comprises an implement coupler assembly mounted to the toolbar, and the implement is removably coupled to the toolbar of the drive unit via the implement coupler assembly.

18. The autonomous vehicle of claim 17, wherein the implement coupler assembly is a universal assembly configured to receive any type of implement.

19. The autonomous vehicle of claim 18, wherein the implement coupler assembly includes an implement pin plate, a coupler pin plate, and a coupler plate that form a universal bracket configured to receive any type of implement.

20. The autonomous vehicle of claim 18, wherein automatically determining the one or more drive parameters comprises:

providing, as input to a machine learning system trained using reinforcement learning to predict the one or more drive parameters, a current operation completion state of the site on which the autonomous vehicle is being moved, wherein the machine learning system is configured to predict the one or more drive parameters based on the current operation completion state of the site and one or more learned policies, and wherein the current operation completion state is determined based at least in part on sensor data received from one or more sensors of the drive unit or the implement; and receiving, as output of the machine learning system, the one or more drive parameters.

* * * * *